United States Patent
Mochizuki et al.

(10) Patent No.: US 8,673,431 B2
(45) Date of Patent: Mar. 18, 2014

(54) INK SET FOR FORMING MULTILAYER, INK JET RECORDING METHOD, AND PRINTED MATERIAL

(75) Inventors: Kyohei Mochizuki, Ashigarakami-gun (JP); Yusuke Fujii, Ashigarakami-gun (JP); Kenjirou Araki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/596,702

(22) Filed: Aug. 28, 2012

(65) Prior Publication Data

US 2013/0065027 A1    Mar. 14, 2013

(30) Foreign Application Priority Data

Sep. 9, 2011  (JP) ................................. 2011-197566
Jan. 20, 2012  (JP) ................................. 2012-009628

(51) Int. Cl.
*B32B 3/10* (2006.01)
*C09D 4/02* (2006.01)
*C09D 11/10* (2006.01)

(52) U.S. Cl.
USPC ........... 428/195.1; 523/161; 524/548; 347/37

(58) Field of Classification Search
USPC ........... 428/195.1; 523/160; 524/548; 347/37
See application file for complete search history.

(56) References Cited

U.S. PATENT DOCUMENTS

2012/0277340 A1* 11/2012 Thillo et al. .................... 522/46

FOREIGN PATENT DOCUMENTS

| JP | 2007-131755 A | 5/2007 |
| JP | 2008-100501 A | 5/2008 |
| JP | 2010-000788 A | 1/2010 |

* cited by examiner

*Primary Examiner* — Vu A Nguyen
(74) *Attorney, Agent, or Firm* — Sughrue Mion, PLLC

(57) ABSTRACT

An ink set for forming a multilayer of the present invention includes a group of coloring ink compositions which include a yellow, a magenta, a cyan and a black ink composition, and a clear ink composition, wherein each of the coloring ink compositions contain a (component A) radical polymerizable compound, a (component B) radical polymerization initiator and a (component D) coloring agent, and the component A contains a (component A-1) N-vinyl compound and a (component A-2) specific ethylenic unsaturated compound (CTFA), the clear ink composition contains a (component A) radical polymerizable compound, a (component B) acylphosphine oxide-based photoinitiator and a (component C) surfactant, and the relation of $0.1 \leq (Y/X) < 1$ is satisfied when the content of the radical polymerization initiator in the clear ink composition is X, the content of the radical polymerization initiator in the magenta ink composition is Y.

13 Claims, 10 Drawing Sheets

INK SET FOR FORMING MULTILAYER, INK JET RECORDING METHOD, AND PRINTED MATERIAL

BACKGROUND OF THE INVENTION

1. Field of the Invention

The present invention relates to an ink set for forming a multilayer, an ink jet recording method, and a printed material.

2. Description of the Related Art

As an image recording method in which an image is formed on a recording medium such as paper based on image data signals, there are an electrophotographic method, a sublimation type and a melt type thermal printing method, an ink jet recording method, and the like.

In ink jet methods, printing devices are low-priced, no plates are needed when printing, and ink compositions may be efficiently used since an image is directly formed on a recording medium by discharging the ink composition to only necessary image parts, therefore, running costs are low especially in the case of small-lot productions. In addition, ink jet methods have low noise and are excellent imaging recording methods, and as a result, have been receiving attention in recent years.

Among these, an ink composition for ink jet recording which is curable by irradiation of radiation such as ultraviolet light (a radiation curable ink composition for ink jet recording) is an excellent method in terms that it has an excellent drying property comparing to a solvent-based ink composition since most of the components of the ink composition are cured by irradiation of radiation such as ultraviolet light and can be printed on various recording media since the image is not readily bleed.

So far, various radiation curable ink compositions for ink jet recording have been proposed and, JP2007-131755A discloses an active energy ray curable ink for ink set in which the polymerizable monomers contain 80 mass % to 99.99 mass % of a monofunctional monomer and 20 mass % to 0.01 mass % of a polyfunctional monomer with regard to the total monomers and also, the mass change ratio is 30 mass % or less when a cured film of the ink is immersed in the ink for 30 seconds.

High speed, high image quality and fixability to a recording medium when ink is ejected and printed on a non-absorbent recording medium such as a plain paper, plastic or the like by an ink jet printer have currently become an important issue.

For the purpose of image uniformity improvement between various recording media, JP2008-100501A discloses an ink set for ink jet recording which includes at least a coloring liquid composition containing at least a polymerizable compound, a photopolymerization initiator and a coloring agent, and an undercoat liquid composition containing at least a polymerizable compound, a photopolymerization initiator, wherein the polymerizable compound included in the coloring liquid composition is made of at least one type of monofunctional monomer and at least one type of polyfunctional monomer, and the amount of the monofunctional monomer in the total coloring liquid composition is 10 mass % to 70 mass % and the amount of the polyfunctional monomer is 10 mass % to 50 mass %.

Improving durability of printed materials has also been an issue.

JP2010-000788A discloses an ink jet printed material in which a transparent protective layer is formed on the surface for the purpose of obtaining an ink jet printed material with excellent weather resistance and durability and which includes a substrate and a pattern layer formed by an ink jet printing on the substrate, wherein the transparent protective layer is formed on the pattern layer, the pattern layer is made of ultraviolet ray curable resin ink cured by ultraviolet irradiation, and the transparent protective layer is made of an electron beam curable resin cured by irradiation of electrons.

SUMMARY OF THE INVENTION

An object of the present invention is to provide an ink set for forming a multilayer which has excellent image quality and glossiness, gives a satisfactory surface condition, has excellent blocking resistance, and may form an image without basic color changes, to provide an ink jet recording method with a high productivity using the ink set, and to provide a printed material recorded by the ink jet recording method. In particular, up to now, in an ultraviolet ray curable ink jet ink printer using clear ink, gloss differences have sometimes occurred since a satisfactory surface condition cannot be obtained in a feeding width (swath) cycle of a substrate for a multi-path mode of a shuttle scan type printer.

The object was accomplished by means described in the following <1>, <9> or <13>. They are shown below with <2> to <8> and <10> to <12> which are preferable embodiments.

<1> An ink set for forming a multilayer including a group of coloring ink compositions which include a yellow ink composition, a magenta ink composition, a cyan ink composition and a black ink composition, and a clear ink composition, wherein each of the coloring ink compositions contain a (component A) radical polymerizable compound, a (component B) radical polymerization initiator and a (component D) coloring agent, and contain a (component A-1) N-vinyl compound and a (component A-2) compound represented by Formula (a-2) as the component A, the clear ink composition contains a (component $A^2$) radical polymerizable compound, a (component $B^2$) acylphosphine oxide-based photoinitiator and a (component C) surfactant, and the relation of Formula (1) is satisfied when the content of the radical polymerization initiator in the clear ink composition is X and the content of the radical polymerization initiator included in the magenta ink composition is Y.

[Chem. 1]

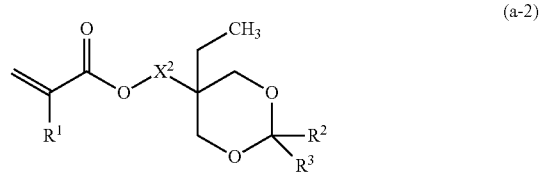

(a-2)

(In Formula (a-2), $R^1$, $R^2$ and $R^3$, each independently, represent a hydrogen atom, a methyl group, or an ethyl group, $X^2$ represents a single bond or a divalent linking group.)

[Equation 1]

$$0.1 \leq \frac{Y}{X} < 1 \qquad (1)$$

<2> The ink set for forming a multilayer according to <1>, wherein the relation of Formula (2) is satisfied when the content of the radical polymerization initiator in the clear ink composition is X and the content of the radical polymerization initiator included in the magenta ink composition is Y.

[Equation 2]

$$0.3 \le \frac{Y}{X} < 1 \qquad (2)$$

<3> The ink set for forming a multilayer according to <1> or <2>, wherein the component A-1 is N-vinyl caprolactam.

<4> The ink set for forming a multilayer according to any one of <1> to <3>, wherein the content of the initiator in the magenta ink composition is greater than or equal to 3 mass % and less than 12 mass % with regard to the total amount of the magenta ink composition and the content of the initiator in the clear ink composition is greater than or equal to 12 mass % and less than 20 mass % with regard to the total amount of the clear ink composition.

<5> The ink set for forming a multilayer according to any one of <1> to <4>, wherein each of the coloring ink compositions includes 50 mass % to 90 mass % of the monofunctional radical polymerization compound with regard to the total amount of the (component A) radical polymerization compound.

<6> The ink set for forming a multilayer according to any one of <1> to <5>, wherein the magenta ink composition contains a bisacylphosphine oxide or a monoacylphosphine oxide as the (component B) radical polymerization initiator and the clear ink composition contains a monoacylphosphine oxide as the (component $B^2$) radical polymerization initiator.

<7> The ink set for forming a multilayer according to any one of <1> to <6>, wherein the surface tension of all the coloring ink compositions is 32 mN/m, to 40 mN/m.

<8> The ink set for forming a multilayer according to any one of <1> to <7>, wherein the clear ink composition contains 10 mass % to 80 mass % of a polyfunctional (meth)acrylate compound which contains one or more of an alkylene oxy group in a structural unit of the polyfunctional (meth)acrylate compound.

<9> An ink jet recording method using the ink set for forming a multilayer according to any one of <1> to <8> including an image forming step for applying each of the coloring ink compositions on the recording medium and forming color images and a clear ink layer applying step for applying the clear ink composition and forming a clear ink layer in this order.

<10> The ink jet recording method according to <9>, further including a scanning step for moving an ink jet head having a plurality of nozzle arrays including a first nozzle array with a plurality of nozzles discharging each of the coloring ink compositions are arranged and a second nozzle array with a plurality of nozzles discharging the clear ink composition are arranged toward a first direction with regard to the recording medium, a relative moving step for reciprocatively moving the recording medium toward a second direction which is not parallel to the first direction, a discharge control step for dividing the nozzle arrays in a plurality of areas toward the second direction and controlling the ink discharge of the ink jet head in each of the divided nozzle areas formed by the dividing of the nozzle arrays, and an active ray irradiating step for irradiating active rays on the ink discharged from the ink jet head by the discharge control step and adhered on the recording medium, wherein the active ray irradiating step is a step in which the irradiation range of the active rays is divided into a plurality of areas corresponding to each of the divided nozzle areas divided, light intensity of the divided irradiation area formed by the dividing of the irradiation range is controlled for each area, and irradiation of the active rays is carried out.

<11> The ink jet recording method according to <10>, wherein the irradiation range of the active rays is divided into two areas, intensity of the irradiation light source in the first area is 100 mW/cm$^2$ to 800 mW/cm$^2$ and intensity of the irradiation light source in the second area is 800 mW/cm$^2$ to 1,600 mW/cm$^2$.

<12> The ink jet recording method according to <10> or <11>, wherein a minimum droplet volume of the nozzle discharging each of the coloring ink compositions is greater than or equal to 5 pL and less than 20 pL, and a minimum droplet volume of the nozzle discharging the clear ink composition is greater than or equal to 20 pL and less than or equal to 60 pL.

<13> A printed material obtained using the method according to any one of <9> to <12>.

According to the present invention, an ink set for forming a multilayer which has excellent image quality and glossiness, gives a satisfactory surface condition, has excellent blocking resistance, and may form an image with small color changes when the clear ink layer is prepared may be provided, and furthermore, an ink jet recording method with a high productivity using the ink set and a printed material recorded by the ink jet recording method may be provided.

DESCRIPTION OF THE PREFERRED EMBODIMENTS

An ink set for forming a multilayer of the present invention includes a group of coloring ink compositions which include a yellow ink composition, a magenta ink composition, a cyan ink composition and a black ink composition, and a clear ink composition, and each of the coloring ink compositions contain a (component A) radical polymerizable compound, a (component B) radical polymerization initiator and a (component D) coloring agent, and contain a (component A-1) N-vinyl compound and a (component A-2) compound represented by Formula (a-2) as the component A, the clear ink composition contains a (component $A^2$) radical polymerizable compound, a (component $B^2$) acylphosphine oxide-based photoinitiator and a (component C) surfactant, and the relation of Formula (1) is satisfied when the content of the radical polymerization initiator in the clear ink composition is X, the content of the radical polymerization initiator included in the magenta ink composition is Y.

[Chem. 2]

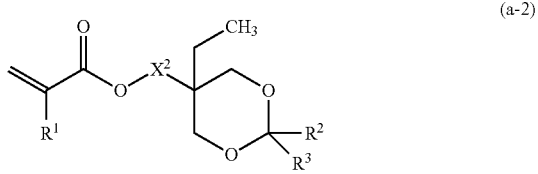

(a-2)

(In Formula (a-2), $R^1$, $R^2$ and $R^3$, each independently, represent a hydrogen atom, a methyl group, and an ethyl group, $X^2$ represents a single bond or a divalent linking group.)

[Equation 3]

$$0.1 \leq \frac{Y}{X} < 1 \quad (1)$$

In the present invention, a description of "X to Y" representing a numerical range has a same meaning as "greater than or equal to X and less than or equal to Y". Also, the "(composition A-1) N-vinyl compound" and the like is referred to as "component A-1". When referring to both or either one of "acrylate" and "methacrylate", they are also described as "(meth)acrylate".

"Clear ink composition" and the like are also described as just "clear ink".

In addition, "mass %" has the same meaning as "weight %" and "parts by mass" has the same meaning as "parts by weight".

Hereinafter, the present invention will be described in detail.

1. Ink Set for Forming Multilayer

An ink set for forming a multilayer of the present invention forms an image layer by a group of coloring ink compositions which includes a yellow ink composition, a magenta ink composition, a cyan ink composition and a black ink composition, and forms a clear ink layer by a clear ink composition.

Figure 1:
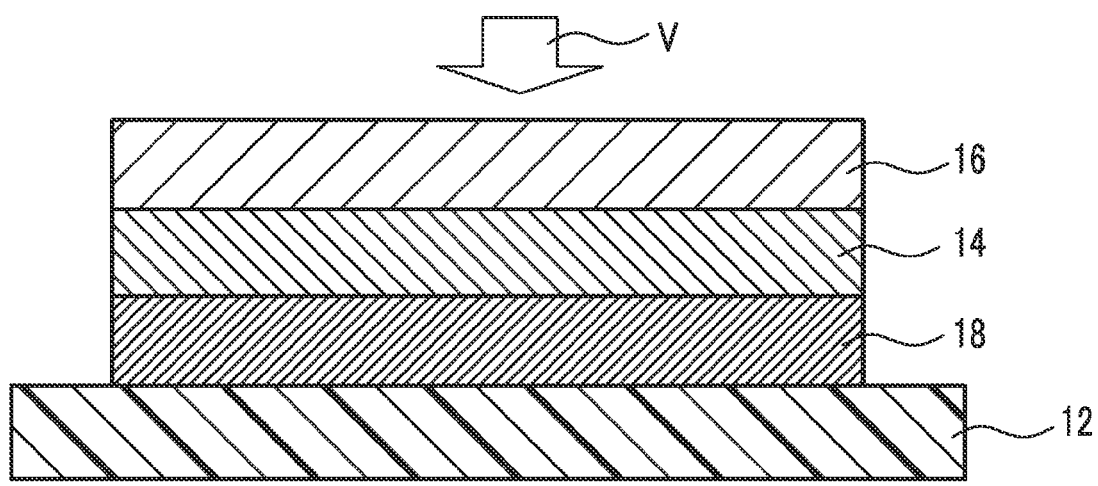
FIG. 1 is a schematic diagram which shows a cross-sectional view of one example in which an image layer and a clear ink layer are formed on a recording medium using an ink set for forming a multilayer of the present invention.

FIG. 1 is a cross-sectional diagram which schematically shows one example in which an image layer 14 and a clear ink layer 16 are formed on a recording medium (supporting body or a substrate) 12 using an ink set for forming a multilayer of the present invention. In addition, an arrow V in the diagram represents a viewing direction (an observing direction) of an image.

In FIG. 1, the image layer 14 may be formed after a white layer 18 is formed on the recording medium 12 when the recording medium 12 is transparent. The white layer 18 is not necessary when the recording medium 12 is reflective such as paper.

In the present invention, the recording medium 12 is preferably light reflective and includes paper and synthetic paper as an example.

In addition, it is preferable that the clear ink layer be at least prepared in an area in which the image is formed and preferably prepared as an approximately uniform layer in an area in which the image is formed or in a wider area.

The present invention is not limited to an aspect in which two layers are formed and, for example, an aspect in which four layers of a white layer 18, an image layer 14, and two clear ink layers 16 and 16' are prepared on a recording medium 12 in this order, or an aspect with a structure of five layers in which a plurality of image layers 14 and a plurality of clear ink layers 18 are prepared on a reflective recording medium 12 in this order is exemplified.

A compound represented by Formula (a-2) (also referred to as "CTFA" in the present invention) is the optimal monofunctional monomer as a component of the ink set for forming a multilayer of the present invention from the viewpoint of surface tension and polarity. CTFA has a low surface tension and serves to help wet spreading of the clear ink composition. There are other monofunctional monomers with a low surface tension besides CTFA, however, many of them have a low polarity, therefore, are significantly susceptible to polymerization inhibition by oxygen on the surface of the image layer. As a result, defects in surface curing easily occur. In addition, if the clear ink layer is prepared at the second layer, it is preferable that a surfactant which causes splashing of the clear ink be not included in ink of an undercoat image layer since the clear ink composition is required to reveal high gloss by sufficient wet spreading. From this point of view, suppression of the generation of swath line or craters shaped like orange peel is effective since wet spreading of the clear ink layer is secured by the component A-2 represented by CTFA included in color ink.

When a double layer of the image layer and the clear ink layer is formed, it is preferable that a first layer be formed and then a second layer be formed after a short time (for example, after a few seconds) from the viewpoint of productivity. In addition, a double layer may be formed by rewinding after drawing the image layer, and then drawing the clear ink layer, however, satisfactory surface (gloss) may not be obtained sometimes since a possibility of dust adhering during the rewinding step is increased. In general, it is estimated that image quality or glossiness of the second layer is affected by a cured profile and the cured condition of the first layer.

According to the ink set of the present invention, when the double layer is formed, an image with excellent adhesion between substrate-ink and ink-ink, and also with excellent image quality, glossiness, and surface condition is obtained.

Although a detailed mechanism of action is unknown, it is postulated to be as follows.

A coloring ink composition used in the present invention contains an N-vinyl compound and CTFA. The N-vinyl compound and CTFA has a moderate polarity and CTFA gives a low surface tension to the coloring ink composition. The coloring ink composition, however, does not yet have a sufficiently low polarity as a whole. As a result, surface curing by irradiation is not sufficient. On the other hand, polymerization inhibition by oxygen of the coloring ink composition may be prevented by lowering the polarity of the clear ink composition and overprinting this clear ink.

In addition, by optimizing the amount of initiator, wet spreading of the ink composition on the image layer is improved and banding is suppressed along with obtaining an image with glossiness. Banding is an uneven printing in a streak shape and refers to a phenomenon in which glossiness is different corresponding to a swath cycle by a multi-pass printing. If spread of the dots after an ink droplet ejection is insufficient, printing omission is not eliminated by the spread of dots resulting in an uneven printing in a streak shape.

In one aspect shown in FIG. 1, an image layer having a small amount of a polymerization initiator becomes a bottom layer and is wet and spread on the recording medium, and therefore, banding is suppressed. Also, the clear ink layer having a large amount of a polymerization initiator, therefore, having excellent curability is formed above the image layer, and the adhesion between ink-ink is improved.

(Ink Composition)

First of all, an ink composition including a component A and component B used in the present invention (hereinafter, also referred to as an "ink composition of the present invention") will be described in detail. When simply the term ink composition is used, it is a collective term for the coloring ink composition and the clear ink composition. The ink composition of the present invention is an oil-based ink composition curable by active radiation. "Active radiation" is radiation which can create energy generating initiating species in the ink composition by the irradiation and includes α-rays, γ-rays, X-rays, visible light, infrared light, an electron beam and the like. Among them, ultraviolet light and an electron beam are preferable, and ultraviolet light is particularly preferable from the viewpoint a curing sensitivity and ease of availability of a device.

The ink composition of the present invention is a radiation curable ink composition and is preferably a non-solvent and does not containing a highly volatile solvent since the ink composition is applied on the recording medium and then cured. This is since solvent resistance is degraded or a problem of VOC (Volatile Organic Compounds) in the remaining solvent occurs if a highly volatile solvent remains in the cured ink image.

Hereinafter, components included in each of the coloring ink compositions which compose the ink set of the present invention will be described.

(Component A) Radical Polymerizable Compound

The ink composition of the present invention contains a (component A) radical polymerizable compound and the coloring ink composition contains the component A-1 and the component A-2 as the component A. In addition, it does not exclude the clear ink composition containing the component A-1 and the component A-2.

(Component A-1) N-Vinyl Compound

The coloring ink composition of the present invention contains a (component A-1) N-vinyl compound as the (component A) radical polymerizable compound.

As the N-vinyl compound, N-vinyl lactams are preferable and compounds represented by Formula (a-1) are more preferable.

[Chem. 3]

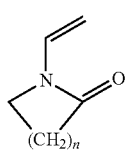

(a-1)

In Formula (a-1), n represents an integer of 1 to 5 and from the viewpoint of flexibility of the ink composition after being cured, adhesion to the recording medium, and availability of raw materials, n is preferably an integer of 2 to 4, n is more preferably 2 or 4, and n is particularly preferably 4, that is, N-vinyl caprolactam. N-vinyl caprolactam is preferable since it is excellent in safety, generally available with relatively low cost and satisfactory ink curability and adhesion of the cured film to the recording medium is obtained.

The content of the component A-1 in the coloring ink composition of the present invention is preferably 5 mass % to 60 mass % with regard to the total amount of the coloring ink composition and more preferably 15 mass % to 35 mass %. If the content is 5 mass % or more, adhesion to the recording medium is excellent and if the content is 60 mass % or less, preservation stability is excellent.

(Component A-2) Compound Represented by Formula (a-2)

The coloring ink composition of the present invention contains a (component A-2) compound represented by Formula (a-2) as the (component A) radical polymerizable compound. If the coloring ink composition does not contain the component A-2, adhesion to the recording medium (polyvinyl chloride and polyethylene terephthalate (PET), and an acrylic resin, in particular) is reduced. The compound represented by Formula (a-2) has a low surface tension and is presumed to improve the wet spreading of the clear ink composition. In addition it has a moderate polarity and it is difficult for defects in surface curing to occur, therefore, cured substances (the image layer and the clear ink layer) with excellent adhesion are obtained.

[Chem. 4]

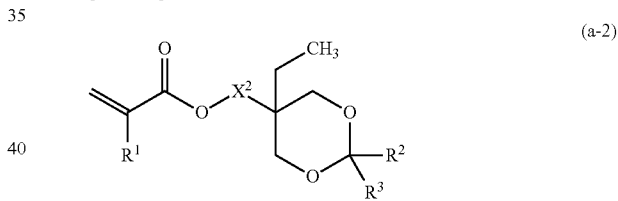

(a-2)

In Formula (a-2), $R^1$, $R^2$ and $R^3$, each independently, represent a hydrogen atom, a methyl group, or an ethyl group, $X^2$ represents a single bond or a divalent linking group.

As $R^1$, a hydrogen atom or a methyl group is preferable and a hydrogen atom is more preferable.

As $R^2$ and $R^3$, each independently, a hydrogen atom or a methyl group is preferable, a hydrogen atom is more preferable, and a case in which both $R^2$ and $R^3$ are hydrogen atoms is the most preferable.

The divalent linking group in $X^2$ is not particularly limited as long as it does not impair the effects of the present invention, however, a divalent hydrocarbon group or a divalent group combining a hydrocarbon group and an ether bond is preferable, a divalent hydrocarbon group, a poly(alkylene oxy) group, or a poly(alkylene oxy) alkyl group is more preferable. In addition, the number of carbon atoms in the divalent linking group is preferably 1 to 60 and more preferably 1 to 20.

As $X^2$, a single bond, a divalent hydrocarbon group or a divalent group combining a hydrocarbon group and an ether bond is preferable, a divalent hydrocarbon group having 1 to 20 carbon atoms is more preferable, a divalent hydrocarbon group having 1 to 8 carbon atoms is even more preferable, and a methylene group is particularly preferable.

Specific examples of the component A-2 are shown below, however, the present invention is not limited to these. Also, in the specific examples below, R represents a hydrogen atom or a methyl group.

[Chem. 5]

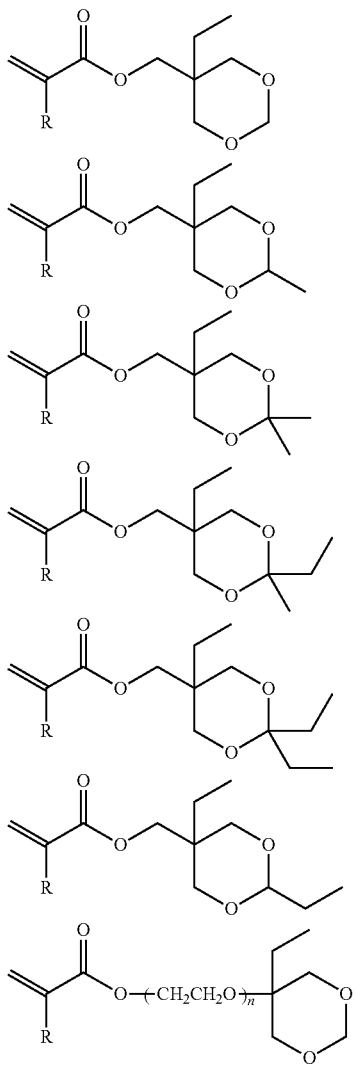

n = 1~30

Among these, cyclic trimethylolpropane formal (meth)acrylate is preferable, and cyclic trimethylolpropane formal acrylate is particularly preferable. The component A-2 may preferably be a commercially available product and specific examples of the commercially available product include SR531 (manufactured by SARTOMER Company).

The content of the component A-2 is preferably 1 mass % to 65 mass % with regard to the total mass of the coloring ink composition, more preferably 3 mass % to 60 mass %, even more preferably 5 mass % to 60 mass %, particularly preferably 5 mass % to 50 mass %, and most preferably 5 mass % to 40 mass % from the viewpoint of adhesion of the image with the recording medium.

(Component A-3) Trimethylolpropane Triacrylate

In the present invention, it is preferable that the ink composition (coloring ink composition and the clear ink composition) contain (component A-3) trimethylolpropane triacrylate as the (component A or component $A^2$) radical polymerizable compound. The component A-3 being contained is preferable from the viewpoint of balancing curability and roll paper suitability (flexibility) of the output sample of the roll substrate.

The content of the component A-3 is preferably 0.1 mass % to 10 mass % with regard to the total mass of the ink composition from the viewpoint of balancing curability and roll paper suitability (flexibility) of the output sample of the roll substrate.

<Other Monofunctional (Meth)Acrylates>

The ink composition of the present invention may contain other monofunctional (meth)acrylates besides the component A-2.

As the other monofunctional (meth)acrylates, a monofunctional (meth)acrylate having a (component A-4) aromatic hydrocarbon group may preferably be exemplified.

Monofunctional (Meth)acrylate Having (Component A-4) Aromatic Hydrocarbon Group

It is preferable that the ink composition of the present invention contain a monofunctional (meth)acrylate having a (component A-4) aromatic hydrocarbon group. A molecular weight of the component A-4 is preferably 500 or less, and more preferably 300 or less.

As the component A-4, an aromatic monofunctional radical polymerizable compound disclosed in paragraphs 0048 to 0063 of JP2009-096985A may be included. In the present invention, as the monofunctional (meth)acrylate having an aromatic hydrocarbon group, a compound represented by Formula (a-4) is preferable.

[Chem. 6]

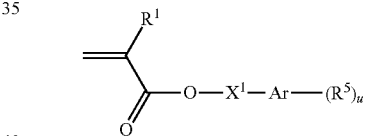

(a-4)

In Formula (a-4), $R^1$ represents a hydrogen atom or a methyl group, $X^1$ represents a divalent linking group, Ar represents an aromatic hydrocarbon group, $R^5$ represents a substituent, u represents an integer of 0 to 5, and u number of the $R^5$s may be the same as or different from each other.

In Formula (a-4), $R^1$ is preferably a hydrogen atom.

$X^1$ represents a divalent linking group and preferably an ether bond (—O—), an ester bond (—C(O)O— or —OC(O)—), an amide bond (—C(O)NR'— or —NR'C(O)—), a carbonyl group (—C(O)—), an amino group (—NR'—) or an alkylene group having 1 to 15 carbon atoms which may have a substituent, or a divalent group combining two or more of these. R' also represents a hydrogen atom, an alkyl group with a straight chain, a branched chain or a ring structure having 1 to 20 carbon atoms, or an alkylene group having 6 to 20 carbon atoms. As the substituent, a hydroxyl group or a halogen atom may be included.

The part ($H_2C$=$C(R^1)$—$C(O)O$—$X^1$—) including $R^1$ and $X^1$ may be bonded at an arbitrary position in the aromatic hydrocarbon structure. The end unit bonded to the aromatic hydrocarbon group of $X^1$ is preferably an oxygen atom and more preferably an etheric oxygen atom from the viewpoint of improving the affinity with a coloring agent. X1 in Formula (a-4) is preferably *-$(LO)_q$—. Here, * represents a bonding position with a carboxylate bond of Formula (a-4), q is an integer of 0 to 10, L represents an alkylene group having 2 to 4 carbon atoms. q is preferably an integer of 0 to 4, more preferably an integer of 0 to 2, and even more preferably an integer of 1 or 2. $(LO)_q$ is preferably an ethylene oxide chain or a propylene oxide chain.

Ar represents an aromatic hydrocarbon group. As the aromatic hydrocarbon group, a monocyclic or polycyclic aromatic hydrocarbon group having 1 to 4 rings and specifically, a group excluding one or more hydrogen atoms from benzene, naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, pleiadene or the like.

Among these, a phenyl group or a naphthyl group is preferable in the present invention and a monocyclic aromatic hydrocarbon group, that is, a phenyl group is more preferable.

$R^5$s which are present in u number, each independently, are preferably a halogen atom, a carboxyl group, an acyl group having 1 to 10 carbon atoms, a hydroxyl group, a substituted or unsubstituted amino group, a thiol group, a siloxane group, or a hydrocarbon group having the total number of carbon atoms of 30 or less which may have further substituents or a heterocyclic group. As the substituents, a hydroxyl group, an alkyl group having 1 to 10 carbon atoms, and an aryl group having 6 to 12 carbon atoms may be included.

u represents an integer of 0 to 5 and is preferably 0.

Specific examples of the component A-4 includes those in [L-1] to [L-65].

[Chem. 7]

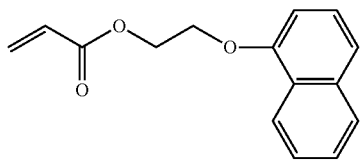
[L-1]

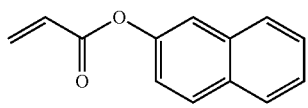
[L-2]

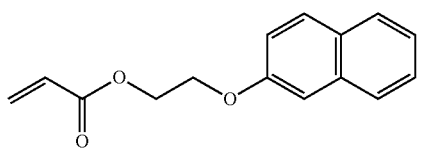
[L-3]

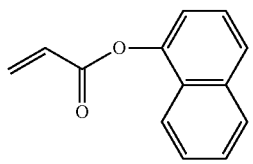
[L-4]

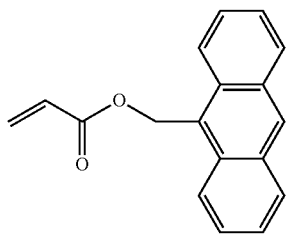
[L-5]

-continued

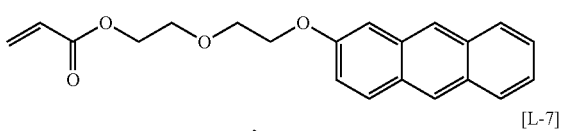
[L-6]

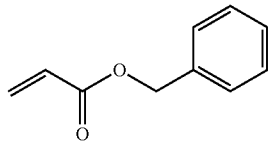
[L-7]

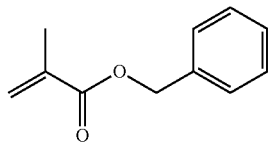
[L-8]

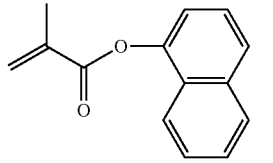
[L-9]

[Chem. 8]

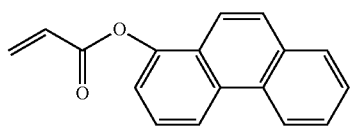
[L-10]

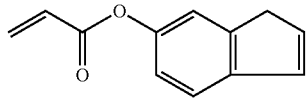
[L-11]

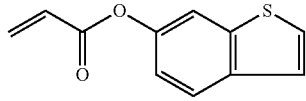
[L-12]

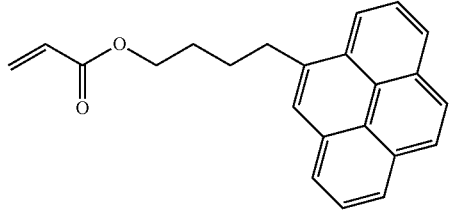
[L-13]

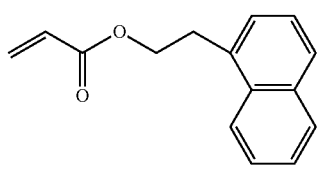
[L-14]

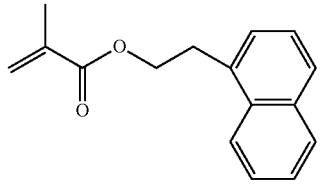
[L-15]

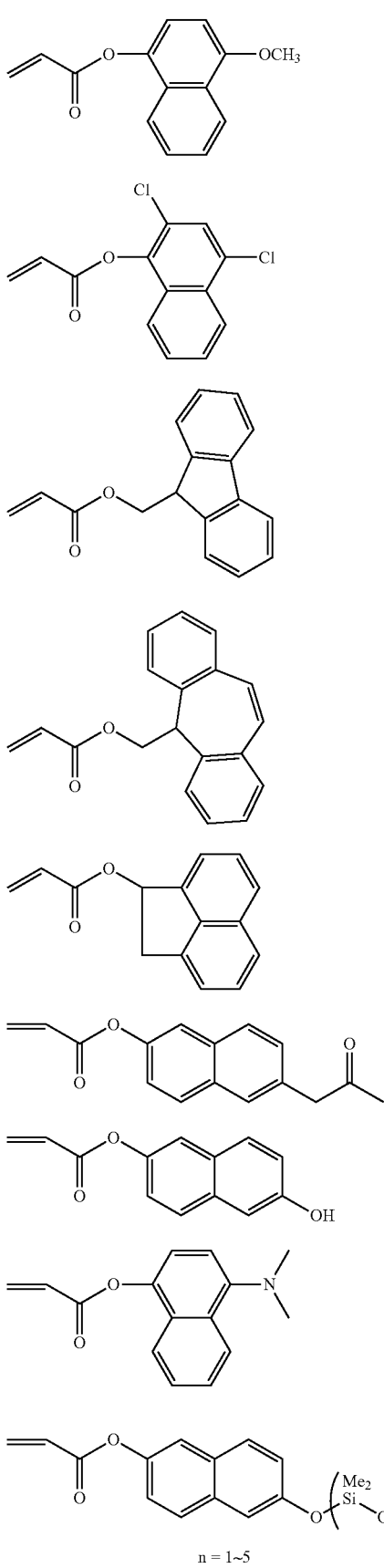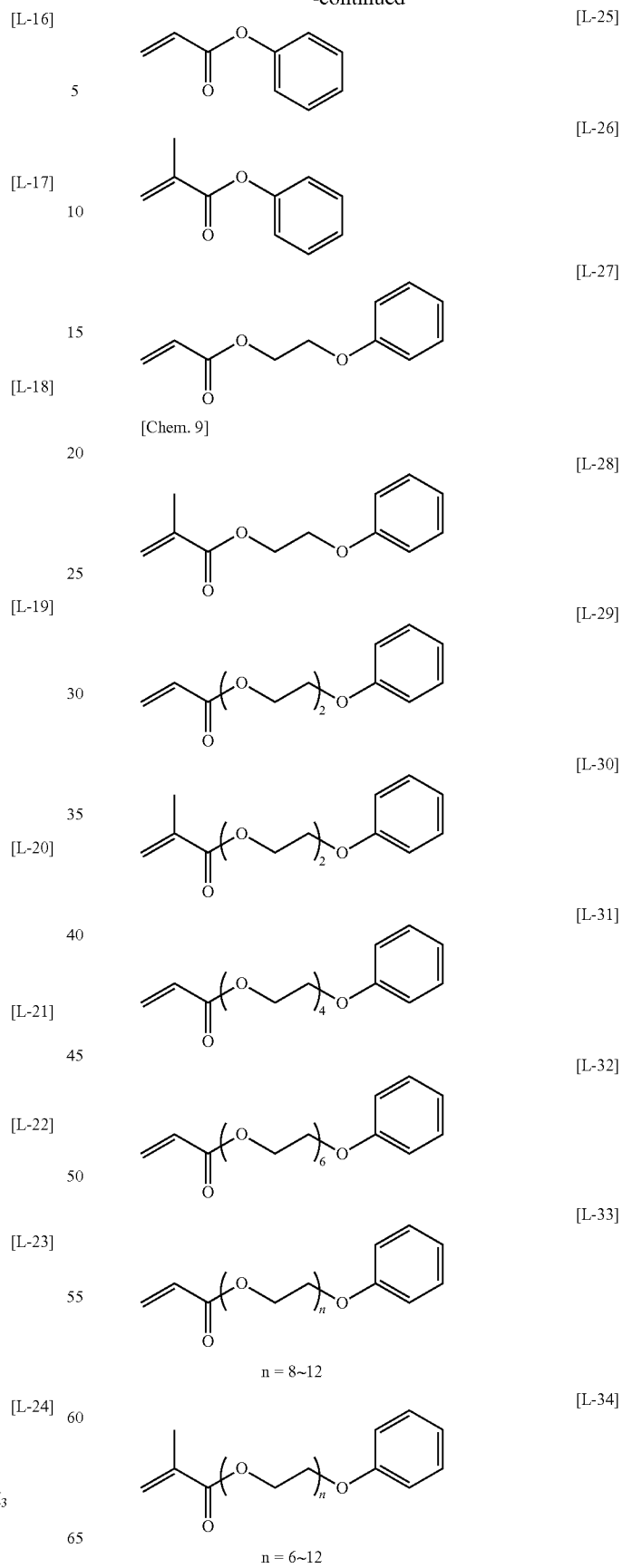

[L-35] 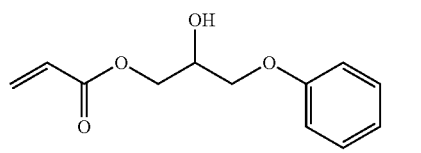
[L-36] 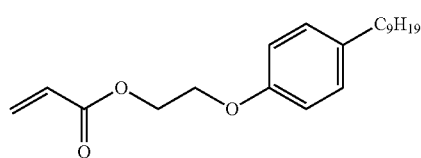
[L-37] 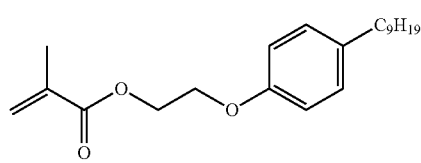
[Chem. 10]
[L-38] 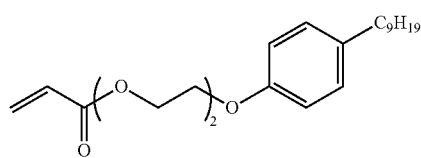
[L-39] 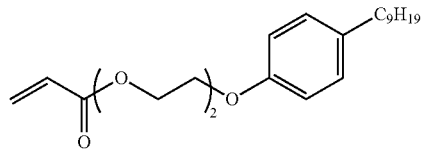
[L-40] 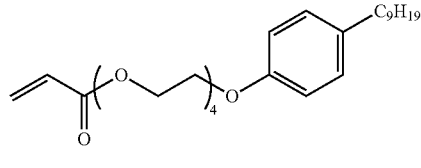
[L-41] 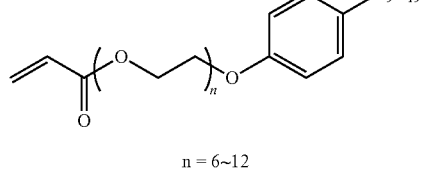
n = 6~12
[L-42] 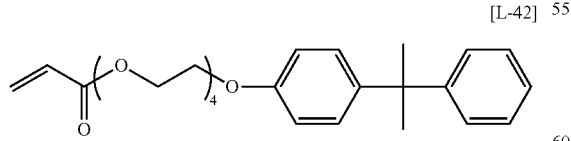
[L-43] 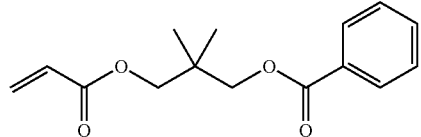
[L-44] 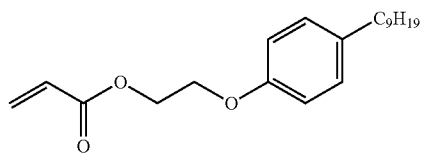
[L-45] 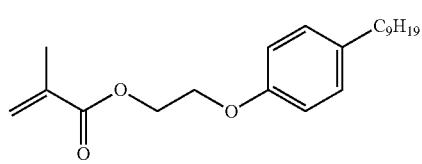
[Chem. 11]
[L-46] 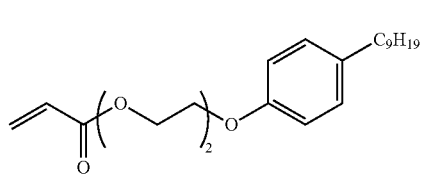
[L-47] 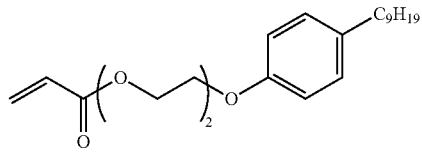
[L-48] 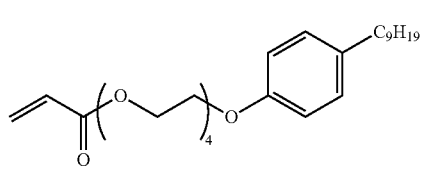
[L-49] 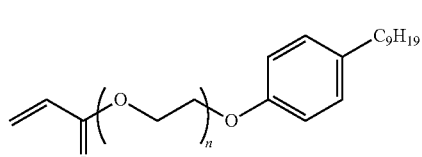
n = 6~12
[L-50] 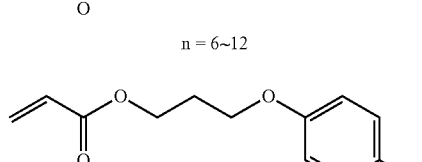
[L-51] 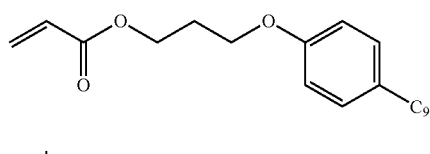
[L-52] 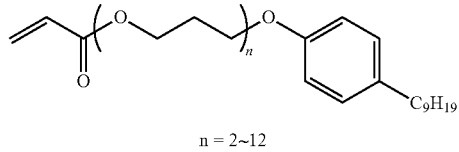
n = 2~12

-continued

[L-53]
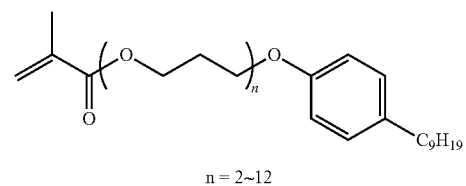
n = 2~12

[L-54]
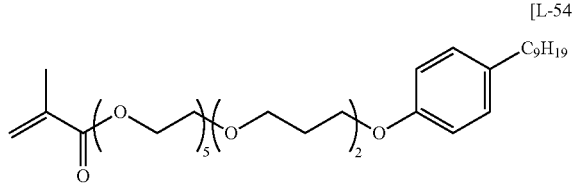

[L-55]
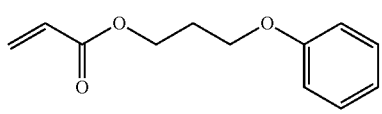

[L-56]
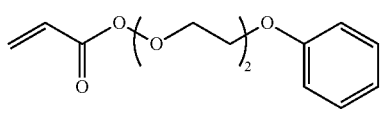

[L-57]
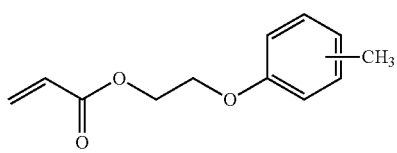

[L-58]
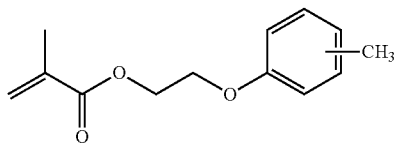

[L-59]
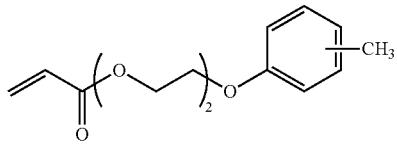

[Chem. 12]

[L-60]
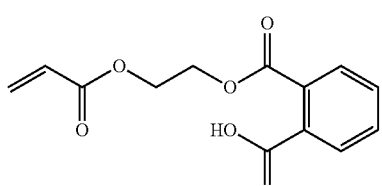

[L-61]
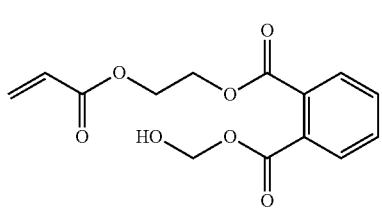

-continued

[L-62]
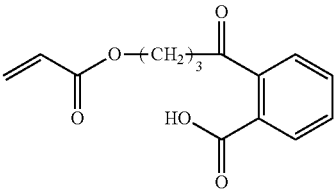

[L-63]
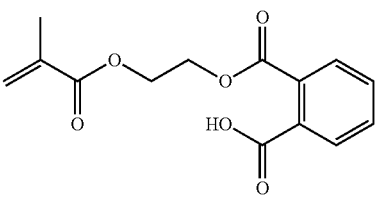

[L-64]
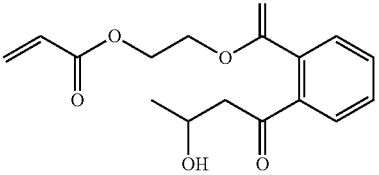

[L-65]
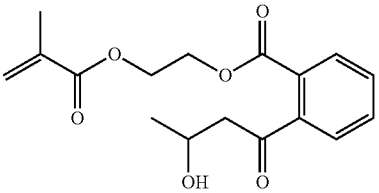

As the compound represented by Formula (a-4) in the present invention, a compound having a phenyl group is preferable, 2-phenoxyethyl (meth)acrylate, benzyl (meth)acrylate is more preferable, 2-phenoxyethyl (meth)acrylate is even more preferable, and 2-phenoxyethyl acrylate is particularly preferable.

The content of the component a-4 is preferably 1 mass % to 50 mass % with regard to the total mass of the ink composition, more preferably 3 mass % to 45 mass %, and even more preferably 5 mass % to 40 mass %.

The ink composition of the present invention may contain other monofunctional (meth)acrylates besides the component A-2 and the component A-4. As monofunctional (meth)acrylates besides the component A-2 and the component A-4, isoamyl (meth)acrylate, stearyl (meth)acrylate, lauryl (meth)acrylate, octyl (meth)acrylate, isooctyl (meth)acrylate, decyl (meth)acrylate, isoamylstearyl (meth)acrylate, isostearyl (meth)acrylate, 2-ethylhexyl diglycol (meth)acrylate, 2-hydroxybutyl (meth)acrylate, butoxyethyl (meth)acrylate, methoxy diethylene glycol (meth)acrylate, methoxy polyethylene glycol (meth)acrylate, methoxy propylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-(meth)acryloxyethyl succinate, 2-(meth)acryloxyethyl-2-hydroxyethyl phthalate lactone modified flexible (meth)acrylate, t-butylcyclohexyl (meth)acrylate, 2-(2-ethoxyethoxy)ethyl acrylate, cyclopentenyl acrylate, cyclopentenyloxyethyl acrylate, dicyclopentanyl acrylate or the like may be included. As other monofunctional (meth)acrylates included in the clear ink composition, isobornyl (meth)acrylate, cyclopentenyl acrylate, dicyclopentenyloxyethyl acrylate, and t-butylcyclohexyl acrylate is preferable.

In addition, in the coloring ink composition of the present invention, a total content of the monofunctional radical polymerizable compound including the component A-1 and A-2 is preferably 50 mass % to 90 mass % with regard to the total amount of the (component A) radical polymerizable compound. If the content of the monofunctional radical polymerizable compound is within the range described above, an image with excellent adhesion between substrate-ink and ink-ink, and also with excellent flexibility is obtained. The content of the monofunctional radical polymerizable compound in the coloring ink composition is more preferably 50 mass % to 90 mass % with regard to the total amount of the component A and even more preferably 60 mass % to 80 mass %.

In the monofunctional radical polymerizable compound, a monofunctional polymerizable compound such as the component A-4 and other monofunctional (meth)acrylates described above are also included.

Furthermore, in the clear ink composition, a total content of the monofunctional radical polymerizable compound is preferably 0 mass % to 30 mass % with regard to the total amount of the (component $A^2$) radical polymerizable compound, more preferably 0 mass % to 25 mass % and even more preferably 0 mass % to 20 mass %. If the content of the monofunctional radical polymerizable compound in the clear ink is within the range described above, curability and a blocking property are excellent.

<(Component A-5) Polyfunctional (Meth)Acrylate>

The ink composition of the present invention may contain (component A-5) other polyfunctional (meth)acrylates besides the component A-3.

An ink composition with high curability is obtained by the polyfunctional (meth)acrylate compound being contained.

Specific examples of the component A-5 include bis(4-acryloxy polyethoxy phenyl) propane, neopentyl glycol di(meth)acrylate, ethoxylated (2) neopentyl glycol di(meth)acrylate (a compound in which 2 mol adduct of neopentyl glycol ethylene oxide is diacrylated), propoxylated (2) neopentyl glycol di(meth)acrylate (a compound in which 2 mol adduct of neopentyl glycol propylene oxide is diacrylated), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, tricyclodecane dimethanol di(meth)acrylate, ethoxylated trimethylolpropane tri(meth)acrylate, pentaerythritol tetra(meth)acrylate, dipentaerythritol tetra(meth)acrylate, tetramethylolmethane tetra(meth)acrylate, tetramethylolmethane tri(meth)acrylate, dimethylol tricyclodecane di(meth)acrylate, modified glycerin tri(meth)acrylate, modified bisphenol A di(meth)acrylate, propylene oxide (PO) adduct of bisphenol A di(meth)acrylate, ethylene oxide (EU) adduct of bisphenol A di(meth)acrylate, dipentaerythritol hexa(meth)acrylate, caprolactone-modified dipentaerythritol hexa(meth)acrylate, propylene glycol di(meth)acrylate or the like.

It is preferable that the coloring ink composition contain propoxylated (2) neopentyl glycol di(meth)acrylate (a compound in which 2 mol adduct of neopentyl glycol propylene oxide is diacrylated) or tripropylene glycol di(meth)acrylate as the component A-5. It is preferable that the clear ink composition contain dipropylene glycol diacrylate or tricyclobutane dimethanol diacrylate as the component A-5.

As the preferable polyfunctional (meth)acrylate in the coloring ink composition, propoxylated (2) neopentyl glycol diacrylate, ethoxylated trimethylolpropane triacrylate, a combination of (component A-3) trimethylolpropane triacrylate and 1,6-hexanediol diacrylate, a combination of ethoxylated (3) trimethylolpropane triacrylate and 1,6-hexanediol diacrylate, or a combination of propoxylated (2) neopentyl glycol diacrylate and etholylated trimethylolpropane triacrylate may be included.

As the preferable polyfunctional (meth)acrylate in the coloring ink composition, a combination of (component A-3) trimethylolpropane tri(meth)acrylate, propoxylated (2) neopentyl glycol di(meth)acrylate (a compound in which 2 mol adduct of neopentyl glycol propylene oxide is diacrylated) and tripropylene glycol di(meth)acrylate is preferable. As a combination of the polyfunctional (meth)acrylates in the clear ink composition, a combination of (component A-3) trimethylolpropane tri(meth)acrylate, dipropylene glycol di(meth)acrylate and tricyclobutane dimethanol diacrylate is particularly preferable.

The ink composition of the present invention may contain an oligomer as the polyfunctional (meth)acrylate compound.

This "oligomer" is generally a polymer having a structural unit based on a finite number of monomers (generally 5 to 100). The weight average molecular weight of the oligomer is preferably 400 to 10,000 and more preferably 500 to 5,000.

The oligomer preferably has a (meth)acryloyl group as a functional group.

The number of functional groups included in the oligomer is preferably 1 to 15 per molecule, more preferably 2 to 6, even more preferably 2 to 4, and particularly preferably 2 from the viewpoint of a balance between flexibility and curability.

As the oligomer in the present invention, a polyester (meth)acrylate, an olefin (an ethylene oligomer, a propylene oligomer, a butene oligomer and the like), a vinyl-based compound (a styrene oligomer, a vinyl alcohol oligomer, a vinyl pyrrolidone oligomer, a (meth)acrylate oligomer and the like), a diene (a butadiene oligomer, chloroprene rubber, a pentadiene oligomer and the like), a ring-opening polymerization derived compound (di-, tri-, tetraethylene glycol, polyethylene glycol, polyethylene imine and the like), a polyaddition derived compound (an oligo ester (meth)acrylate, a polyamide oligomer, a polyisocyanate oligomer), an addition condensation oligomer (a phenol resin, an amino resin, a xylene resin, a ketone resin and the like), an amine-modified polyester oligomer, or the like may be included. Among these, an oligo ester (meth)acrylate is preferable, a urethane acrylate or a polyester (meth)acrylate is more preferable among these, and a urethane (meth)acrylate is particularly preferable since an ink composition with excellent curability and adhesion is obtained. The oligomer may be used either alone or as a combination of two or more.

As the urethane (meth)acrylate, an aliphatic urethane (meth)acrylate, an aromatic urethane (meth)acrylate or the like may be included. For detailed information, Oligomer Handbook (supervised by FURUKAWA Junji, The Chemical Daily Co., Ltd.) may be used for reference.

As the oligomer of urethane (meth)acrylate, U-2PPA, U-4HA, U-6HA, U-6LPA, U-15HA, U-324A, UA-122P, UA5201, UA-512 manufactured by Shin-Nakamura Chemical Co., Ltd. or the like; CN964A85, CN964, CN959, CN962, CN963J85, CN965, CN982B88, CN981, CN983, CN996, CN9002, CN9007, CN9009, CN9010, CN9011, CN9178, CN9788, and CN9893 manufactured by Sartomer Company, EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, and EB8800-20R manufactured by Daicel-Cytec Company, Ltd., or the like may be included.

As an amine-modified polyester oligomer, EB524, EB80, and EB81 manufactured by Daicel-Cytec Company, Ltd., CN550, CN501, and CN551 manufactured by Sartomer Company, GENOMER5275 manufactured by Rahn AG, or the like may be included.

The content of the oligomer is preferably 0.3 mass % to 10 mass % with regard to the total mass of the ink composition, more preferably 0.5 mass % to 8 mass %, and even more preferably 1 mass % to 7 mass % from the viewpoint of a balance between curability and adhesion.

The total content of the (component A-5) other multifunctional (meth)acrylates practically used is regarded from the viewpoint of improving thickening and curability when adjusting viscosity of the ink. Therefore, an appropriate mass % is different depending on the viscosity of each ink, however, is preferably 0 mass % to 30 mass % with regard to the total mass of the coloring ink composition, more preferably 0.5 mass % to 25 mass %, even more preferably 1 mass % to 20 mass %, and particularly preferably 3 mass % to 20 mass %.

In addition, the total content of the (component A-5) other multifunctional (meth)acrylates is preferably 30 mass % to 97 mass % with regard to the total mass of the clear ink composition, more preferably 40 mass % to 95 mass %, and even more preferably 50 mass % to 90 mass %.

The total content of the radical polymerizable compound is preferably 0 mass % to 30 mass % with regard to the total mass of the coloring ink composition, more preferably 1 mass % to 25 mass %, even more preferably 3 mass % to 20 mass %, and particularly preferably 5 mass % to 20 mass %.

The total content of the radical polymerizable compound is preferably 30 mass % to 97 mass % with regard to the total mass of the clear ink composition, more preferably 40 mass % to 95 mass %, even more preferably 50 mass % to 93 mass %, and particularly preferably 55 mass % to 90 mass %.

(Other Radical Polymerizable Compounds)

The ink composition in the present invention may contain a vinyl ether compounds as other radical polymerizable compounds. The vinyl ether compounds may be roughly divided into monovinyl ether compounds and di- or trivinyl ether compounds.

The clear ink composition preferably contains a vinyl ether compound and particularly, preferably contains a di- or trivinyl ether compound, and more preferably contains a divinyl ether compound.

As the vinyl ether compound suitably used, for example, a di- or trivinyl ether compound such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, trimethylolpropane trivinyl ether; a monovinyl ether compound such as ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether; hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, isopropenyl vinyl ether, dodecyl vinyl ether, and diethylene glycol monovinyl ether, or the like may be included.

The total content of the whole (component A) radical polymerizable compound in the ink composition is preferably 65 mass % to 99 mass % and more preferably 70 mass % to 90 mass %.

(Component B) Radical Polymerization Initiator

The ink composition of the present invention contains a radical polymerization initiator.

In addition, the ink set of the present invention satisfies the relation of Formula (1) when the content of the radical polymerization initiator included in the clear ink composition is X (mass %) and the content of the radical polymerization initiator included in the magenta ink composition is Y (mass %). Here, the content of the radical polymerization initiator means the total content of an acylphosphine oxide-based radical polymerization initiator and other radical polymerization initiators included in the clear ink composition as core components.

[Equation 4]

$$0.1 \leq \frac{Y}{X} < 1 \qquad (1)$$

If Y/X is less than 0.1, sufficient curability of the magenta ink composition may not be obtained or the initiator sometimes clogs the filter within the printer since solubility of the initiator in the clear ink composition is poor. In addition, sometimes, storage stability is weakened or the cured film turns yellow. If Y/X is 1 or more, filter clogging within the printer, worsening of the preservation stability, and defects on the cured film occur like the clear ink described above.

Y/X preferably satisfies $0.3 \leq (Y/X) < 1$, more preferably $0.4 \leq (Y/X) < 1$, and even more preferably $0.5 \leq (Y/X) < 1$.

In addition, in the present invention, the relation between the content of the radical polymerization initiator included in characteristic ink compositions (an ink composition of other colors excluding the clear ink composition such as a yellow ink composition, a cyan ink composition, and a black ink composition) and the content of the radical polymerization initiator included in the clear ink composition is not particularly limited as long as at least the content of the radical polymerization initiator included in the magenta ink composition and the content of the radical polymerization initiator included in the clear ink composition are within the range described above. From the viewpoint of internal absorption of the pigments used, it is preferable that the content of the radical polymerization initiator (Y/X) be approximately the same as the magenta ink composition for the cyan ink composition, and be larger than the relation of Formula (1) for the yellow ink composition and the black ink composition.

That is, when the content of the radical polymerization initiator included in the clear ink composition is X (mass %) and the content of the radical polymerization initiator included in the cyan ink composition is W (mass %), $0.1 \leq (W/X) < 1$ is preferable, $0.3 \leq (W/X) < 1$ is more preferable, $0.4 \leq (W/X) < 1$ is even more preferable, and $0.5 \leq (W/X) < 1$ is particularly preferable.

Also, when the content of the radical polymerization initiator included in the clear ink composition is X (mass %) and the content of the radical polymerization initiator included in the yellow ink composition and the black ink composition is W (mass %), $0.1 \leq (W/X) < 1$ is preferable and $0.4 \leq (W/X) < 1$ is more preferable.

The content of the radical polymerization initiator in the magenta ink composition is preferably greater than or equal to 3 mass % and less than 12 mass % and more preferably 5 mass % to 11 mass %.

The content of the radical polymerization initiator in the clear ink composition is preferably 12 mass % to 20 mass % and more preferably 12 mass % to 18 mass %.

If the content of the radical polymerization initiator in the magenta ink composition and the clear ink composition is within the range described above, an image with excellent glossiness is obtained.

The content of the radical polymerization initiator in the ink composition of other colors is preferably greater than or equal to 3 mass % and less than 12 mass % and more preferably 5 mass % to 11 mass %.

If the content of the radical polymerization initiator in the ink composition of other colors is within the range described above, an image with excellent glossiness is obtained.

As the radical polymerization initiator, well-known radical polymerization initiators may be used. The radical polymerization initiator which may be used in the present invention may be used either alone or as a combination of two or more. The radical polymerization initiator and a cationic polymerization initiator may also be used as a combination.

The radical polymerization initiator which may be used in the present invention is a compound generating a polymerization initiating species by absorbing external energy. The external energy used in order to initiate polymerization is roughly divided into thermal and active radiation, and a thermal polymerization initiator and a photopolymerization initiator are used, respectively. As the active radiation, γ-rays, β-rays, an electronic beam, ultraviolet light, visible light, and infrared light may be exemplified.

As the radical polymerization initiator which may be used in the present invention, (a) aromatic ketones, (b) an acylphosphine compound, (c) an aromatic onium salt compound, (d) an organic peroxide compound, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon halogen bond, (m) an alkylamine compound and the like may be included. These radical polymerization initiators may be used as one or as a combination of two or more of the compounds (a) to (m). The radical polymerization initiator in the present invention is suitably used either alone or as a combination of two or more.

As a component B in the present invention, a (component B-1) bisacylphosphine compound and a (component B-2) monoacylphosphine compound are preferable.

(Component B-1) Bisacylphosphine Compound

As the (component B) radical polymerization initiator in the present invention, the (component B-1) bisacylphosphine compound may be preferably included.

As the component B-1 and the component B-2 described later, bisacylphosphine oxide compounds and monoacylphosphine compounds disclosed in paragraphs 0080 to 0098 of JP2009-096985A may be included.

The component B-1 preferably has a partial structure represented by Formula (b-1-1) in the structure of the compound.

[Chem. 13]

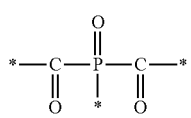

(b-1-1)

(In Formula (b-1-1), * represents a bonding position.)

As the component B-1, a compound represented by Formula (b-1-2) is particularly preferable.

[Chem. 14]

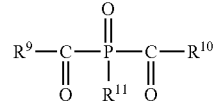

(b-1-2)

(In Formula (b-1-2), $R^9$, $R^{10}$, and $R^{11}$ represent an aromatic hydrocarbon group which may have a methyl group or an ethyl group as a substituent.)

In the bisacylphosphine oxide compound represented by Formula (b-1-2), it is preferable that $R^9$ to $R^{11}$ be a phenyl group which may have a methyl group as a substituent, and it is more preferable that $R^{11}$ be a phenyl group and $R^9$ and $R^{10}$ be a phenyl group having 1 to 3 methyl groups.

Among these, as the bisacylphosphine oxide compound represented by Formula (b-1-2), bis(2,4,6-trimethylbenzoyl)phenylphosphine oxide (IRGACURE819, manufactured by BASF Japan Ltd.) is preferable.

(Component B-2) Monoacylphosphine Oxide Compound

As the (component B) radical polymerization initiator in the present invention, the (component B-2) monoacylphosphine compound may be preferably included.

The component B-2 preferably has a partial structure represented by Formula (b-2-1) in the structure of the compound.

[Chem. 15]

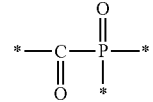

(b-2-1)

(In (b-2-1), * represents a bonding position.)

As the component B-2, a compound represented by Formula (b-2-2) is particularly preferable.

[Chem. 16]

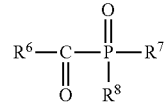

(b-2-2)

(In Formula (b-2-2), $R^6$, $R^7$, and $R^8$ represent an aromatic hydrocarbon group which may have a methyl group or an ethyl group as a substituent.)

In the monoacylphosphine oxide compound represented by Formula (b-2-2), it is preferable that $R^6$ to $R^8$ be a phenyl group which may have a methyl group as a substituent, and it is more preferable that $R^7$ and $R^8$ be a phenyl group and $R^6$ be a phenyl group having 1 to 3 methyl groups.

Among these, as the monoacylphosphine oxide compound represented by Formula (b-2-2), 2,4,6-trimethylbenzoyl diphenylphosphine oxide (Darocur TPO: manufactured by BASF Japan Ltd., Lucirin TPO: manufactured by BASF Group) is preferable.

It is preferable that the coloring ink composition in the present invention including the magenta ink composition contain the (component B-1) bisacylphosphine oxide compound and/or the (component B-2) monoacylphosphine oxide compound.

It is preferable that the coloring ink composition contain at least the (component B-1) bisacylphosphine oxide compound as the component B. By the component B-1 being contained, high sensitivity of the coloring ink composition may be obtained even when added in small amount. Also, bisacylphosphine oxide is capable of improving the sensitivity of the ink even when added in small amount compared to the monoacylphosphine oxide, however, is not suitable for the clear ink since the printed material turns yellow. Therefore, a combination of the bisacylphosphine oxide and the monoacylphosphine oxide is preferable in the color ink in which a color change to yellow is less noticeable compared to the clear ink.

In the coloring ink composition, the total amount of the component B-1 and B-2 is preferably 20 parts by mass or more when the total amount of the radical polymerization initiator is 100 parts by mass, more preferably 25 parts by mass or more, and even more preferably 30 parts by mass or more.

In addition, it is preferable that the clear ink composition in the present invention contain the (component B-2) monoacylphosphine oxide compound as the (component $B^2$) radical polymerization initiator.

By the clear ink composition containing the (component B-2) monoacylphosphine oxide compound as the (component $B^2$) radical polymerization initiator, excellent curability may be obtained and yellowing of the image is suppressed at the same time.

In the clear ink composition, 50 parts by mass or more of the monoacylphosphine oxide compound being contained is preferable when the total amount of the radical polymerization initiator is 100 parts by mass, 60 parts by mass to 100 parts by mass is more preferable, 70 parts by mass to 100 parts by mass is even more preferable, and practically, 100 parts by mass is preferable.

(Component B-3) Thioxanthone Compound and/or Thiochromanone Compound

It is preferable that the ink composition of the present invention contain a (component B-3) thioxanthone compound and/or a thiochromanone compound. Particularly, it is preferable that the coloring ink composition contain the component B-3 from the viewpoint of curability.

<Thioxanthone Compound>

The thioxanthone compound is preferably a compound represented by Formula (b-3-1).

[Chem. 17]

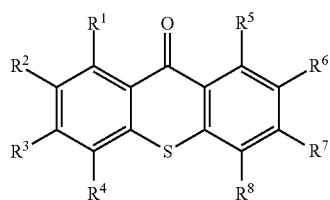

(b-3-1)

(In Formula (b-3-1), $R^1$ to $R^8$, each independently, represent a hydrogen atom, an alkyl group, a halogen atom, a hydroxy group, a cyano group, a nitro group, an amino group, an alkylthio group, an alkylamino group (including the case of monosubstituted or disubstituted), an alkoxy group, an alkoxycarbonyl group, an acyloxy group, an acyl group, a carboxyl group or a sulfo group.)

The number of carbon atoms of the alkyl part in the alkyl group, the alkylthio group, the alkylamino group, the alkoxy group, the alkoxycarbonyl group, the acyloxy group, and the acyl group is preferably 1 to 20, more preferably 1 to 8, and even more preferably 1 to 4.

In $R^1$ to $R^8$, each adjacent two groups are bonded to each other and may form a ring. As a ring structure when these form the ring, a five-membered or a six-membered aliphatic ring, an aromatic ring or the like may be included, a heterocyclic ring including elements besides a carbon atom may be included, or a ring with two nuclei by further combining the rings formed, for example, a condensed ring, may be formed. The ring structure of these may further have substituents. As the substituent, a halogen atom, a hydroxy group, a cyano group, a nitro group, an amino group, an alkylthio group, an alkylamino group, an alkoxy group, an alkoxycarbonyl group, an acyloxy group, an acyl group, a carboxyl group and a sulfo group may be included. As examples of the hetero atoms when the ring structure formed is a heterocyclic ring, N, O, and S may be included.

As the thioxanthone compound, thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboximide, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride may be exemplified.

Among these, 2,4-diethylthioxanthone, 2-isopropylthioxanthone, and 4-isopropylthioxanthone are more preferable from the viewpoint of the ease of availability and curability.

<Thiochromanone Compound>

The thiochromanone compound is preferably a compound represented by Formula (b-3-2).

[Chem. 18]

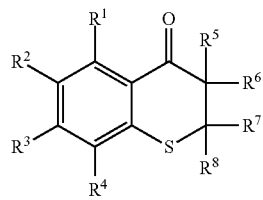

(b-3-2)

In Formula (b-3-2), $R^1$, $R^2$, $R^3$, $R^4$, $R^5$, $R^6$, $R^7$ and $R^8$, each independently, represent a hydrogen atom, an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxyl group or a sulfo group. The number of carbon atoms of the alkyl part in the alkyl group, the alkylthio group, the alkylamino group, the alkoxy group, the alkoxycarbonyl group, the acyloxy group, and the acyl group is preferably 1 to 20, more preferably 1 to 8, and even more preferably 1 to 4. In addition, the acyloxy group may be an aryloxycarbonyl group and the acyl group may be an arylcarbonyl group. In this case, the number of carbon atoms of the aryl part is preferably 6 to 14 and more preferably 6 to 10.

In $R^1$, $R^2$, $R^3$ and $R^4$, each adjacent two groups are bonded to each other, for example, condensed, and may form a ring.

As a ring structure when these form the ring, a five-membered or a six-membered aliphatic ring, an aromatic ring or the like may be included, a heterocyclic ring including elements besides a carbon atom may be included, or a ring with two nuclei by further combining the rings formed, for example, a condensed ring, may be formed. The ring structure of these may further substituents. As the substituent, those described in Formula (b-2-1) may be included. As examples of the hetero atoms when the ring structure formed is a heterocyclic ring, N, O, and S may be included.

In addition, the thiochromanone compound is preferably a compound having at least one substituent (an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxyl group, a sulfo group or the like) in the ring structure of thiochromanone. As the substituents, an alkyl group, a halogen atom, a hydroxy group, an alkylthio group, an alkylamino group, an alkoxy group or an acyloxy group is preferable, an alkyl group having 1 to 20 carbon atoms and a halogen atom is more preferable, and an alkyl group having 1 to 4 carbon atoms and a halogen atom is even more preferable.

Furthermore, the thiochromanone compound is preferably a compound having at least one substituent in each of the aromatic ring and the cyclohexanone ring.

Specific examples of the thiochromanone compound are preferably exemplified in the following (I-1) to (I-31). Among these, (I-14), (I-17) and (I-19) are more preferable, and (I-14) is particularly preferable.

[Chem. 19]

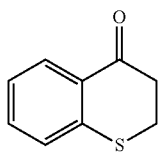
(I-1)

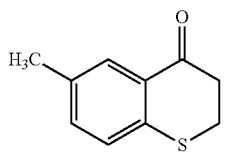
(I-2)

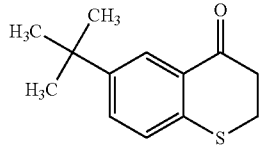
(I-3)

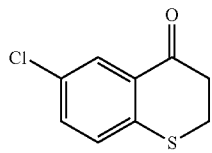
(I-4)

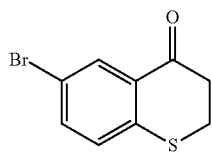
(I-5)

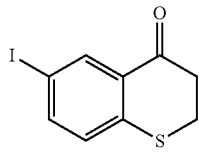
(I-6)

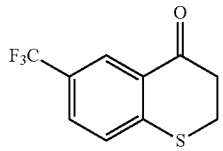
(I-7)

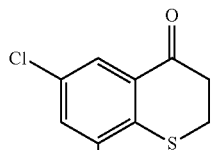
(I-8)

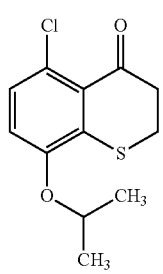
(I-9)

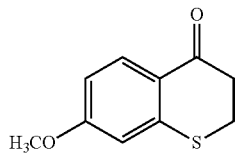
(I-10)

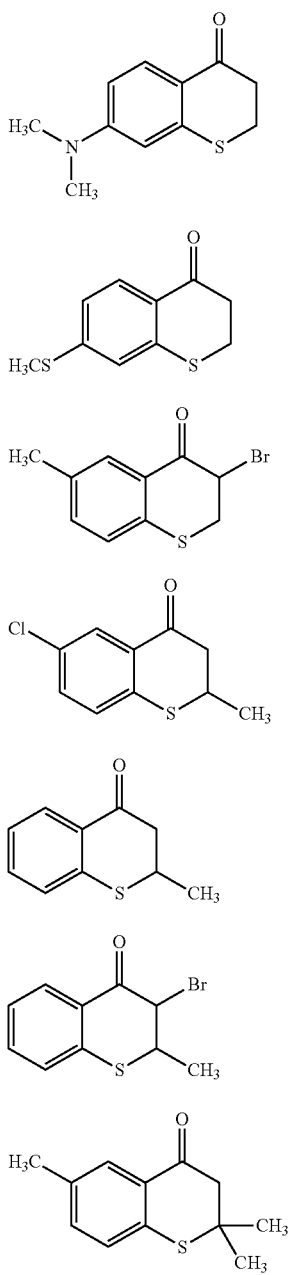
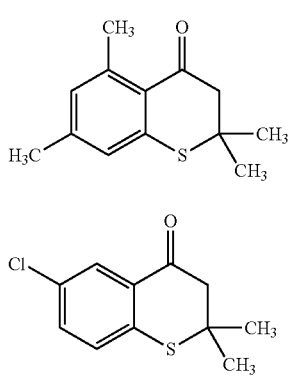
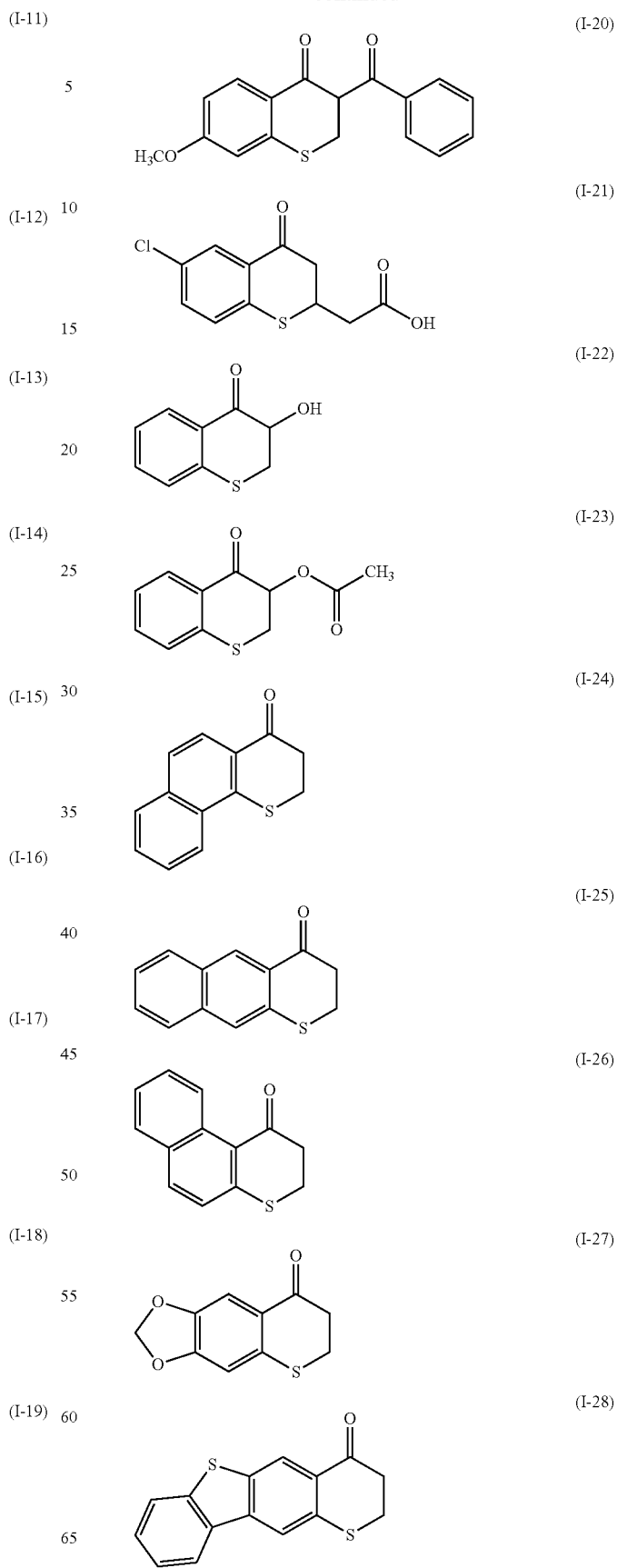

(I-29)

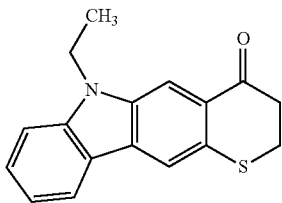

(I-30)

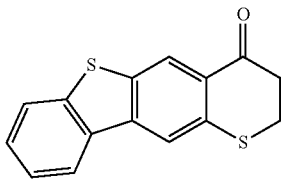

(I-31)

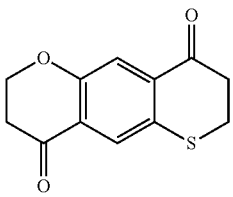

<Other Polymerization Initiators>

The ink composition of the present invention may contain other polymerization initiators besides the components B-1 to B-3. As the other polymerization initiators, a (component B-4) α-aminoalkylphenone compound is preferable.

(Component B-4) α-Aminoalkylphenone Compound

The ink composition of the present invention may contain the (component B-4) α-aminoalkylphenone compound. It is preferable that the coloring ink composition contain the component B-4. As the component B-4, a compound represented by Formula (b-4-1) is preferable.

[Chem. 21]

(b-4-1)

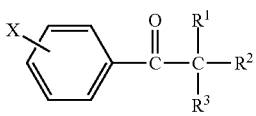

In Formula (b-4-1), $R^1$, $R^2$ and $R^3$, each independently, represent a hydroxyl group, an alkyl group which may have a substituent, an alkoxy group which may have a substituent, or an amino group which may have a substituent, X represents a hydrogen group, an amino group which may have a substituent, an alkylthio group which may have a substituent, or an alkyl group which may have a substituent. In addition, substituents may be bonded to each other and form a heterocyclic group when $R^1$, $R^2$, $R^3$ and X are amino groups. As the substituent, an alkyl group having 1 to 10 carbon atoms may be included.

As the component B-4, a compound represented by any of Formula (b-4-2) and Formula (b-4-3) is preferable.

[Chem. 22]

(b-4-2)

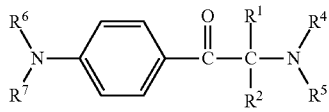

In Formula (b-4-2), $R^4$, $R^5$, $R^6$ and $R^7$ each represent an alkyl group which may have a substituent, and at least any of $R^4$ and $R^5$, and $R^6$ and $R^7$ may be bonded to each other and form a heterocyclic group. $R^1$, $R^2$ and a substituent are the same as $R^1$, $R^2$, and a substituent in Formula (b-4-1), respectively.

[Chem. 23]

(b-4-3)

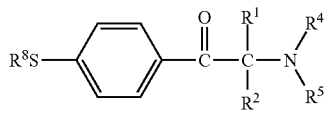

In Formula (b-4-3), $R^8$ represents an alkyl group which may have a substituent.
$R^1$, $R^2$ and a substituent are the same as $R^1$, $R^2$, and a substituent in Formula (b-4-1), and $R^4$ and $R^5$ are the same as $R^4$, $R^5$ in Formula (b-4-2).

The heterocyclic group is not particularly limited and is appropriately selected, however, for example, a morpholino group is preferable.

As the α-aminoalkylphenone compound, for example, commercially available IRGACURE 369 (manufactured by BASF Japan Ltd.), IRGACURE 907 (manufactured by BASF Japan Ltd.), or the like may be suitably included.

The content of the α-aminoalkylphenone compound in the ink composition is preferably 0.1 mass % to 15 mass %, more preferably 0.5 mass % to 10 mass %, and even more preferably 1 mass % to 5 mass %.

As the other polymerization initiators, aromatic ketones, an aromatic onium salt compound, an organic peroxide compound, a thio compound, a hexaarylbiimidazole compound, a ketoxime ester compound, a borate compound, an azinium compound, a metallocene compound, an active ester compound, a compound having a carbon halogen bond and the like may be included. The details of the polymerization initiator are well-known to those skilled in the art and, for example, are described in paragraphs 0090 to 0116 of JP2009-185186A.

(Component C) Surfactant

The clear ink composition in the present invention contains a surfactant. The coloring ink composition may contain a surfactant.

As the surfactant used in the present invention, the following surfactants may be exemplified. For example, those disclosed in each of JP1987-173463A (JP-S62-173463) and JP1987-183457A (JP-S62-183457) may be included. Specifically, for example, anionic surfactants such as dialkyl sulfosuccinate salts, alkylnaphthalene sulfonate salts, or fatty acids salts, nonionic surfactants such as polyoxyethylene alkyl ethers, polyoxyethylene alkyl allyl ethers, acetylene glycols, or polyoxyethylene-polyoxypropylene block copolymers, and cationic surfactants such as alkyl amine salts or quaternary ammonium salts, may be included. As the well-known surfactants, fluoro-organic compounds may also be used. The fluoro-organic compound is preferably hydrophobic. The fluoro-organic compounds include, for example, fluorine-based surfactants, oil-form fluorine-based compounds (for example, fluorine oil) and a solid-form fluorine compound resin (for example, a tetrafluoroethylene resin) and include those disclosed in each of JP1982-9053B (JP-S57-9053B) (paragraphs 8 to 17), JP1987-135826A (JP-S62-135826A).

Particularly, the surfactant used in the present invention is not limited to those described above and an additive which is capable of lowering the surface tension effectively with regard to the concentration after addition may be used.

Silicon compounds may also be exemplified as the surfactant. A silicon compound having an ethylenic double bond within the molecule is preferable among the silicon compounds. By using the polymerizable compound and the silicon compound having an ethylenic double bond within the molecule, adhesion with the image is more improved.

As the silicon compound, specifically, for example, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 manufactured by BYK-Chemie GmbH; TEGO-Rad2100, TEGO-Rad2200N, TEGO-Rad2250, TEGO-Rad2300, TEGO-Rad2500, TEGO-Rad2600, TEGO-Rad2700 manufactured by Degussa GmbH; GLANOL 100, GLANOL 115, GLANOL 400, GLANOL 410, GLANOL 435, GLANOL 440, GLANOL 450, B-1484, POLYFLOW-ATF-2, KL-600, UCR-L72, UCR-L93 manufactured by Kyoeisha Chemical Co., Ltd. and the like may be included. These may be used either alone or as a combination of two or more.

An added amount of the surfactant is not particularly limited, however, it is preferably 0.05 mass % to 5 mass % of the total ink, more preferably 0.1 mass % to 3 mass %, and particularly preferably 0.3 mass % to 2 mass %.

(Component D) Coloring Agent

The coloring ink composition of the present invention contains a (component D) coloring agent corresponding to each color.

The coloring agent which may be used in the present invention is not particularly limited and various well-known pigments and dyes are appropriately selected and used depending on the use. Among these the coloring agent included in the coloring ink composition is preferably a pigment from the viewpoint of excellent light resistance, in particular.

The pigment preferably used in the present invention will be described.

The pigment is not particularly limited and all commercially available organic pigments and inorganic pigments in general, and also those in which resin particles are dyed with a dye may be used. In addition, commercially available pigment dispersion products, surface-treated pigments, for example, those in which a pigment is dispersed by an insoluble resin or the like as a dispersion medium, those in which a pigment of which a surface is grafted with a resin or the like may also be used as long as the effects of the present invention are not impaired.

As these pigments, for example, pigments disclosed in "Encyclopedia of Pigments" edited by ITO Seishiro (published in 2000), "Industrial Organic Pigments" by W. Herbst, K. Hunger, JP2002-12607A, JP2002-188025A, JP2003-26978A, or JP2003-342503A, may be included.

Specific examples of the organic pigment and inorganic pigment which may be used in the present invention may include, for example, as pigments which exhibit yellow color, a monoazo pigment such as C. I. Pigment Yellow 1 (First Yellow G or the like) or C. I. Pigment Yellow 74; a disazo pigment such as C. I. Pigment Yellow 12 (disazo yellow AAA or the like), C. I. or Pigment Yellow 17; a non-benzidine-based azo pigment such as C. I. Pigment Yellow 180; an azo lake pigment such as C. I. Pigment Yellow 100 (tartrazine yellow lake); a condensed azo pigment such as C. I. Pigment Yellow 95 (condensed azo yellow GR or the like); an acidic dye lake pigment such as C. I. Pigment Yellow 115 (quinoline yellow lake or the like); a basic dye lake pigment such as C. I. Pigment Yellow 18 (thioflavin lake or the like); an anthraqinone-based pigment such as flavanthrone yellow (Y-24); an isoindolinone pigment such as isoindolinone yellow 3RLT (Y-110); a quinophthalone pigment such as quinophthalone yellow (Y-138); an isoindoline pigment such as isoindoline yellow (Y-139); a nitroso pigment such as C. I. Pigment Yellow 153 (nickel nitroso yellow or the like); an azomethine metal complex salt pigment such as C. I. Pigment Yellow 117 (copper azomethine yellow or the like); or the like may be included.

As pigments which exhibit red or magenta color, for example, a monoazo-based pigment such as C. I. Pigment Red 3 (toluidine red or the like); a disazo pigment such as C. I. Pigment Red 38 (pyrazolone red B or the like); an azo lake pigment such as C. I. Pigment Red 53:1 (lake red C or the like) or C. I. Pigment Red 57:1 (brilliant carmine 6B); a condensed azo pigment such as C. I. Pigment Red 144 (condensed azo red BR or the like); an acidic dye lake pigment such as C. I. Pigment Red 174 (phloxin B lake or the like); a basic dye lake pigment such as C. I. Pigment Red 81 (rhodamine 6G' lake or the like); an anthraqinone-based pigment such as C. I. Pigment Red 177 (dianthraquinonyl red or the like); a thioindigo pigment such as C. I. Pigment Red 88 (thioindigo bordeaux or the like); a perinone pigment such as C. I. Pigment Red 194 (perinone red or the like); a perylene pigment such as C. I. Pigment Red 149 (perylene scarlet or the like); a quinacridone pigment such as C. I. Pigment Violet 19 (unsubstituted quinacridone), C. I. Pigment Red 122 (quinacridone magenta or the like); an isoindolinone pigment such as C. I. Pigment Red 180 (isoindolinone red 2BLT or the like); an alizarin lake pigment such as C. I. Pigment Red 83 (madder lake or the like); or the like may be included.

As pigments which exhibit blue or cyan color, for example, a disazo-based pigment such as C. I. Pigment Blue 25 (dianisidine blue or the like); a phthalocyanine pigment such as C. I. Pigment Blue 15 (phthalocyanine blue or the like); an acidic dye lake pigment such as C. I. Pigment Blue 24 (peacock blue lake or the like); a basic dye lake pigment such as C. I. Pigment Blue 1 (Victoria pure blue BO lake or the like); an anthraquinone-based pigment such as C. I. Pigment Blue 60 (indanthrone blue or the like); an alkali blue pigment such as C. I. Pigment Blue 18 (alkali blue V-5:1); or the like may be included.

As pigments which exhibit green color, for example, a phthalocyanine pigment such as C. I. Pigment Green 7 (phthalocyanine green) or C. I. Pigment Green 36 (phthalocyanine green); an azo metal complex pigment such as C. I. Pigment Green 8 (nitroso green); or the like may be included.

As pigments which exhibit orange color, for example, an isoindoline-based pigment such as C. I. Pigment Orange 66 (isoindoline orange); an anthraquinone-based pigment such as C. I. Pigment Orange 51 (dichloropyranthrone orange) may be included.

As pigments which exhibit black color, for example, carbon black, titanium black, aniline black or the like may be included.

As specific examples of white pigments, basic lead carbonate ($2PbCO_3Pb(OH)_2$, so-called silver white), zinc oxide (ZnO, so-called zinc white), titanium oxide (TiO$_2$, so-called titanium white), strontium titanate (SrTiO$_3$, so-called titanium strontium white) or the like may be used.

Here, since titanium oxide has a low specific gravity compared to other white pigments, a large refractive index, and is chemically and physically stable, masking abilities or tinting power is large as a pigment, and also resistance to acids, alkalis, and other environments is also excellent, as the white pigment, titanium oxide is preferably used. Naturally, other white pigments (including pigments besides the white pigments listed above) may be used as necessary.

For dispersion of the coloring agent, a dispersing device such as, for example, a ball mill, a sand mill, an attritor, a roll mill, a jet mill, a homogenizer, a paint shaker, a kneader, an agitator, a Henschel mixer, a colloid mill, an ultrasonic homogenizer, a pearl mill, a wet jet mill may be used.

When dispersion of the coloring agent is carried out, a dispersing agent such as a surfactant or the like may be added.

When the coloring agent is added, a synergist depending on various coloring agents may be used as a dispersing aid when necessary. It is preferable that 1 parts by mass to 50 parts by mass of the dispersing aid be added with regard to the 100 parts by mass of the coloring agent.

As a dispersion medium of the various components such as the coloring agent in the coloring ink composition, a solvent may be added or a polymerizable compound which is a low molecular weight component may be used with no solvent as the dispersion medium, however, the coloring ink composition is preferably an active energy ray curable ink composition and is preferably a non-solvent in order to cure after the coloring ink composition is applied on the recorded medium. This is since solvent resistance is degraded or a problem of VOC (Volatile Organic Compounds) in the remaining solvent occurs if the solvent remains in the image formed from the cured coloring ink composition. From this point of view, polymerizable compounds are used as the dispersion medium and among these, selecting a polymerizable compound with low viscosity is preferable from the viewpoint of dispersion suitability and improving a handling property of the ink composition.

An average particle diameter of the coloring agent used in the present invention is preferably 0.01 μm to 0.4 μm and more preferably is in the range of 0.02 μm to 0.2 μm since the finer the particles, the better the color forming property. The coloring agent, the dispersing agent, choice of the dispersion medium, dispersing condition, and filtering conditions are established so that the maximum particle diameter is preferably 3 μm or less and more preferably 1 μm or less. By managing the particle diameter, preservation stability, transparency and curing sensitivity of the coloring ink composition may be maintained since clogging of the head nozzle is suppressed. In the present invention, a homogenous and stable dispersion substance may be obtained by using the dispersing agent with excellent dispersibility and stability even when the coloring agent of fine particles is used.

The particle diameter of the coloring agent may be measured using well-known measuring methods. Specifically, it may be measured by a centrifugal sedimentation light transmission method, an X-ray transmission method, a laser diffraction scattering method, or a dynamic light scattering method. In the present invention, a value obtained from the measurement using the dynamic light scattering method is employed.

The content of the coloring agent is appropriately selected depending on the color and the purpose of the use, however, it is preferably 0.5 mass % to 30 mass % with regard to the mass of the total coloring ink composition, more preferably 1.0 mass % to 20 mass %, and particularly preferably 2.0 mass % to 10 mass %.

(Other Components)

The ink composition of the present invention may include a polymerization inhibitor, a sensitizing agent, a co-sensitizing agent, an ultraviolet absorber, an antioxidant, an antifading agent, conductive salts, solvent, a polymer compound, a basic compound, a leveling additive, a matting agent, a polyester resin for adjusting film properties, a polyurethane-based resin, a vinyl-based resin, an acrylic-based resin, a rubber-based resin, wax or the like. These are disclosed in JP2009-185186A and may be used in the present invention.

(Component E) Polymerization Inhibitor

The ink composition of the present invention preferably contains a polymerization inhibitor from the viewpoint of improving preservability.

When the ink composition is used as an ink composition for ink jet recording, it is preferable that it is discharged by heating in the range of 25° C. to 80° C. and lowering viscosity and adding the polymerization inhibitor in order to prevent the head clogging by thermal polymerization is preferable. The polymerization inhibitor may be used either alone or as a combination of two or more, however, using as a combination of two or more is preferable.

As the polymerization inhibitor, a nitroso-based polymerization inhibitor, hydroquinone, benzoquinone, p-methoxyphenol, TEMPO, TEMPOL, cupferron A1, a hindered amine, or the like may be included, and a nitroso-based polymerization inhibitor, a hindered amine-based polymerization inhibitor, or a phenol-based polymerization inhibitor is preferable. As the preferable combination of the polymerization inhibitor, a combination of polymerization inhibitor selected from a group consisting of the nitroso-based polymerization inhibitor, the hindered amine-based polymerization inhibitor and the phenol-based polymerization inhibitor is preferable and a combination of the hindered amine-based polymerization inhibitor and the phenol-based polymerization inhibitor is particularly preferable.

Specific examples of the nitroso-based polymerization inhibitor preferably used in the present invention are shown below, however, are not limited to these.

[Chem. 24]

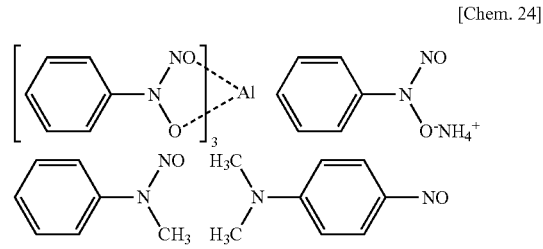

As commercially available products of the nitroso-based polymerization inhibitor, FIRSTCURE ST-1 (manufactured by First Chemical Corporation) or the like may be included. As commercially available products of the hindered amine-based polymerization inhibitor, TINUVIN292, TINUVIN770DF, TINUVIN765 or TINUVIN123 may be included. As commercially available products of the phenol-based polymerization inhibitor, MEHQ (4-methoxyphenol) may be included.

The content of the polymerization inhibitor in the ink composition of the present invention is preferably 0.01 mass % to 5 mass %, more preferably 0.1 mass % to 4 mass %, and particularly preferably 0.5 mass % to 4 mass %. If the content is within the range described above, clogging of an ink jet nozzle may be prevented since polymerization is suppressed during storage when the ink composition is prepared.

The ink composition of the present invention preferably contains a dispersing agent. Particularly when the pigment is used, it is preferable that the ink composition contain a dispersing agent in order to stably disperse the pigment in the ink composition. As the dispersing agent, a polymer dispersing agent is preferable. In addition, the "polymer dispersing agent" in the present invention means a dispersing agent with a weight average molecular weight of 1,000 or more.

The content of the dispersing agent in the ink composition, although appropriately selected depending on the purpose of use, is preferably 0.05 mass % to 15 mass % with regard to the mass of the total ink composition.

(Physical Properties of Ink)

It is preferable that the ink composition of the present invention have a viscosity of 40 mPa·s or less at 25° C. considering a discharging property. A viscosity of 5 mPa·s to 40 mPa·s is more preferable and 7 mPa·s to 30 mPa·s is even more preferable. In addition, a viscosity at a discharging temperature (preferably 25 to 80° C. and more preferably 25 to 50° C.) is preferably 3 mPa·s to 15 mPa·s and more preferably 3 mPa·s to 13 mPa·s. It is preferable that, the composition ratio of the ink composition of the present invention be adjusted for the viscosity to be within the range described above. Setting the viscosity to be high at room temperature is preferable since uncured monomers can be reduced by avoiding ink penetration into the recording medium even when a porous recording medium is used. In addition, it is preferable that quality of an image be improved as a result of suppressing smearing of the ink in the case of an ink droplet landing.

Also, viscosity is determined using an RE80 type viscometer manufactured by Toki Sangyo Co., Ltd. An RE80 type viscometer is a viscometer of a conical rotor/plate method corresponding to E type and the viscosity is measured at a revolutionary speed of 10 rpm using a rotor code No. 1 rotor. If the viscosity is higher than 60 mPa·s, the revolutionary speed was varied to 5 rpm, 2.5 rpm, 1 rpm, 0.5 rpm and the like as necessary.

A surface tension of the ink composition (preferably all the coloring ink compositions) of the present invention at 25° C. is preferably 32 mN/m to 40 mN/m. A surface tension of 35 mN/m to 38 mN/m is more preferable. Glossiness is excellent if the surface tension is within this range.

Here, surface tension is measured by a Wilhelmy method at 25° C. using commonly used surface tensiometers (for example, a surface tensiometer CBVP-Z manufactured by Kyowa Interface Science Co., Ltd.)

The coloring ink composition of the present invention contains at least the yellow ink composition, the magenta ink composition, the cyan ink composition and the black ink composition, however, it may further contain ink compositions of other colors.

Specifically, a light cyan ink composition and a light magenta ink composition being further contained is preferable, and in this case, the coloring ink composition is made of a total of six colors of the yellow ink composition, the magenta ink composition, the cyan ink composition, the black ink composition, the light cyan ink composition and the light magenta ink composition.

It should be noted that "dark-coloring ink composition" in the present invention means an ink composition in which the content of the coloring agent is greater than 1 mass % with regard to the total coloring ink composition. The coloring agent is not particularly limited and well-known coloring agents may be used, and also, pigments or dispersion dyes may be exemplified.

If the ink set of the present invention includes at least one dark-coloring ink composition and at least one light-coloring ink composition and the dark-coloring ink composition and the light-coloring ink composition use the coloring agent of similar colors, the concentration ratio of the coloring agent with the dark-coloring ink composition and the light-coloring ink composition is preferably dark-coloring ink composition: light-coloring ink composition=15:1 to 4:1 and more preferably 12:1 to 4:1 and even more preferably 10:1 to 4.5:1. A clear full-color image with less graininess is obtained if the ratio is within the range.

The ink set of the present invention may contain a white ink composition in addition to the coloring ink composition and the clear ink composition. The white ink composition is an ink composition containing a white pigment.

The white ink composition may be used as an undercoat layer of the FIG. 1 as described above. When the white ink composition is used, a printed material formed by the ink set preferably has a three-layer structure.

II. Ink Jet Recording Method

The ink set for forming a multilayer of the present invention may be used for forming two layers of the image layer and the clear ink layer. In addition, in an area where a secondary color is formed using each coloring ink composition of YMCB, an image layer in which the coloring ink is strictly made of two or more layers.

An ink jet recording method of the present invention includes an image forming step for carrying out the formation of an image by discharging the coloring ink compositions and a clear ink layer applying step for applying the clear ink composition and forming a clear ink layer. In the ink jet recording method, the clear ink composition may be applied by being discharged from a nozzle or applied by coating and the applying method is not particularly limited.

A device used for coating is not particularly limited and well-known coating devices may be appropriately selected depending on the purpose. For example, an air doctor coater, a blade coater, a lot coater, a knife coater, a squeeze coater, an impregnation coater, a reverse roll coater, a transfer roll coater, a gravure coater, a kiss roll coater, a cast coater, a spray coater, a curtain coater, an extrusion coater or the like may be included.

In addition, an order of the image forming step and the clear ink layer applying step may be appropriately decided depending on the image aimed for. In the present invention, it is preferable that the image forming step and the clear ink layer applying step be included in this order. In this case, the clear ink layer is preferably applied on top of the recorded medium and the image layer as a solid image including the whole area where the image is formed by the image forming step.

Specifically, the image forming step and the clear ink layer applying step is performed in this order for obtaining a printed material shown in FIG. 1. A step for preparing a white layer 18 on top of the transparent recording medium 12 is arbitrary.

The ink jet recording method particularly preferably used in the present invention is an ink jet recording method which includes a scanning step for moving an ink jet head having a plurality of nozzle arrays including a first nozzle array with a plurality of nozzles discharging the coloring ink compositions and a second nozzle array with a plurality of nozzles discharging the clear ink composition toward a first direction with regard to the recording medium, a relative moving step for reciprocatively moving the recording medium toward a second direction which is not parallel to the first direction, a discharge control step for dividing the nozzle arrays (the first nozzle array and the second nozzle array) into a plurality of areas along the second direction and controlling the ink discharge of the ink jet head in each of the divided nozzle areas, and an active ray irradiating step for irradiating active rays on the ink discharged from the ink jet head by the discharge control process and adhered on the recording medium, wherein the active ray irradiating step is a step in which the irradiation range of the active rays is divided into a plurality of areas corresponding to each of the divided nozzle areas, light intensity of the divided irradiation area is controlled for each area, and irradiation of the active rays is carried out.

Hereinafter, the ink jet recording method will be described in detail with reference to the drawings.

(Overall Configuration of Ink Jet Recording Device)

Figure 2:
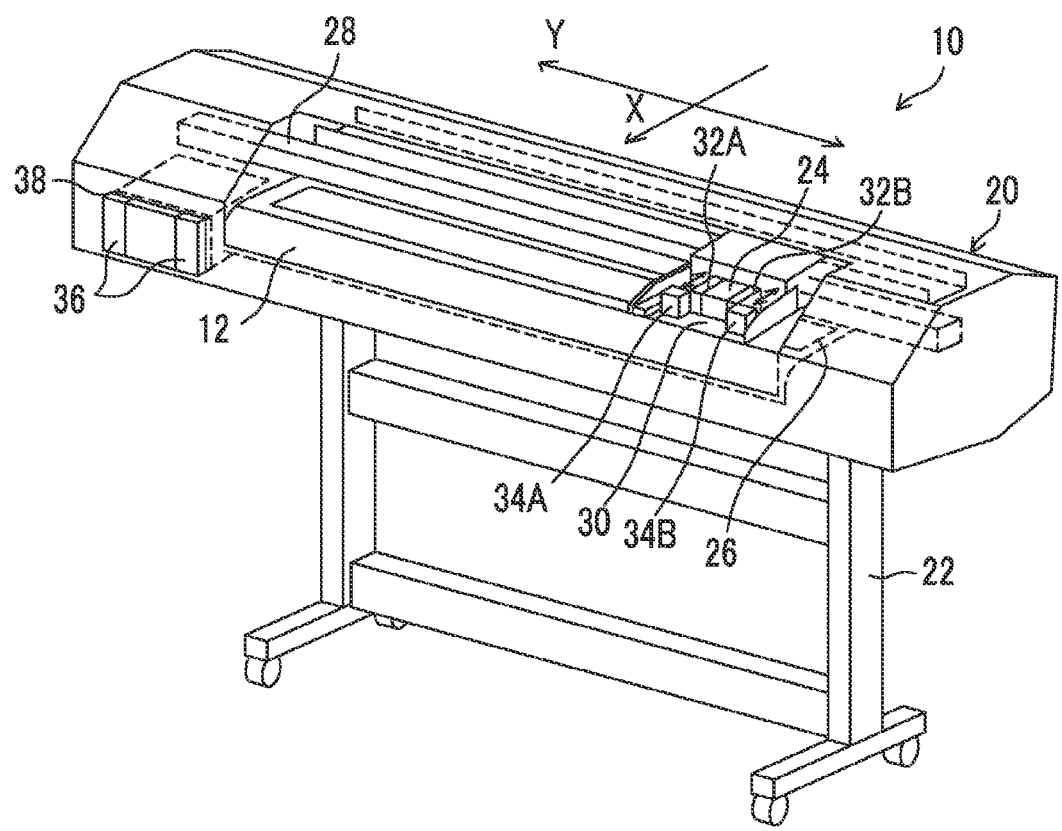
FIG. 2 is a perspective external view which shows one example of an ink jet recording device suitably used in the present invention.

FIG. 2 is an external perspective view which shows one example of an ink jet recording device 10 suitably used in the present invention. The ink jet recording device 10 is a wide format printer which forms a color image on the recording medium 12 using ultraviolet cured ink (UV cured ink). The wide format printer is a device very suitable to recording a wide range of pictures such as large posters and commercially painted walls. Here, those corresponding to A3 size or more are referred to as "wide-format".

The ink jet recording device 10 is equipped with a device main body 20, a support leg 22 for supporting the device main body 20. In the device main body 20, a drop-on-demand ink jet head 24 for discharging the ink toward the recording medium (media) 12, a platen 26 for supporting the recording medium 12, a guide mechanism 28 as a moving means (scanning means) of the head, and a carriage 30 are provided.

The guide mechanism 28 above the platen 26 is arranged to be perpendicular to the transport direction of the recording medium 12 (X direction) and so as to extend along the scanning direction (Y direction) parallel to the media support surface of the platen 26. The carriage 30 is supported to be capable of reciprocating to the Y direction along the guide mechanism 28. In the carriage 30, preliminary curing light sources (pinning light source) 32A and 32B and the main curing light sources (curing light source) 34A and 34B which irradiate ultraviolet light on the ink on the recording medium 12 were loaded, along with the ink jet head 24 being loaded.

Preliminary curing light sources 32A and 32B are light sources which irradiate ultraviolet light after the ink droplets are discharged from the ink jet head 24 and are landed on the recording medium 12 to cure the ink so as for the adjacent droplets not to be united with each other. The main curing light sources 34A and 34B are light sources which irradiate ultraviolet light to ultimately cure the ink (main curing) completely, after additional exposure is performed after the preliminary curing. Details will be described later, however, one or both of the main curing light sources 34A and 34B is configured to be movable to the X direction to be parallel to Y direction with the ink jet head 24 and the preliminary curing light sources 32A and 32B.

The ink jet head 24, the preliminary curing light sources 32A and 32B, and the main curing light sources 34A and 34B disposed on the carriage 30 move as one body (together) with the carriage 30 along the guide mechanism 28. The reciprocative moving direction of the carriage 30 (Y direction) is sometimes called "main scanning direction" and transport direction of the recording medium 12 called "sub-scanning direction" (X direction). The Y direction corresponds to a "first direction" and the X direction corresponds to a "second direction".

A variety of media may be used as the recording medium 12 regardless of materials such as paper, non-woven fabric, vinyl chloride, synthetic chemical fiber, polyethylene, polyester or tarpaulin, and also, regardless of permeable medium or impermeable medium. The recording medium 12 is fed from the rear of the device in a roll paper state (see FIG. 3) and is wound around a take-up roll (not shown in FIG. 2, sign 44 in FIG. 3) at the front side of the device after printing. Ink droplets are discharged on the recording medium 12 transported on the platen 26 from the ink jet head 24 and ultraviolet light is irradiated on the ink droplets adhered on the recording medium 12 from the preliminary curing light sources 32A and 32B, and the main curing light sources 34A and 34B.

In FIG. 2, a mounting unit 38 of the ink cartridge 36 is provided at the front of the left side toward the front of the device main body 20. The ink cartridge 36 is an ink supplier (an ink tank) which is a replaceable material for storing ultraviolet curable ink. The ink cartridge 36 is provided corresponding to each color ink used in the ink jet recording device 10 of the present example. The ink cartridge 36 of each color is connected to the ink jet head 24 by the ink supply path, which is not shown, each independently formed. The ink cartridge 36 is replaced when residual amount of the ink of each color becomes low.

In addition, although not shown, a maintenance unit of the ink jet head 24 is provided at the right side toward the front of the device main body 20. In the maintenance unit, a cap for preventing dryness of the ink jet head 24 when not printing, and a wiping member (blade, web, and the like) for cleaning the nozzle surface of the ink jet head 24 (ink discharge surface) are provided. In the cap which is capping the nozzle surface of the ink jet head 24, an ink receiver for receiving the ink droplets discharged from the nozzle is provided for maintenance.

(Description of Recording Medium Transport Path)

Figure 3:
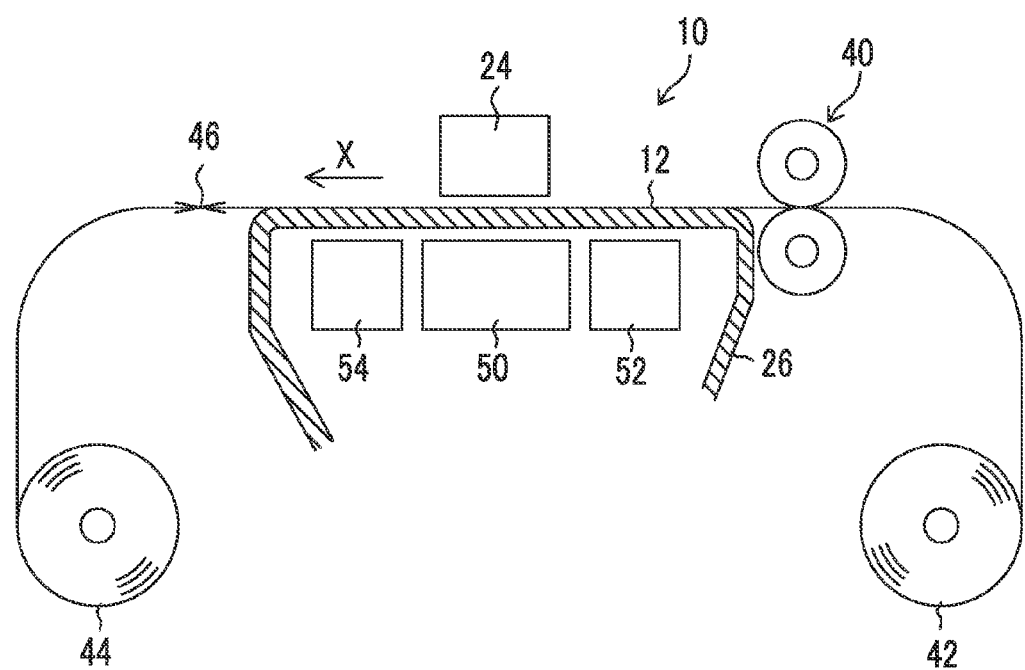
FIG. 3 is a perspective planar view which schematically shows one example of a paper transport path of the ink jet recording device shown in FIG. 2.

FIG. 3 is an explanatory diagram which schematically shows the recording medium transport path in the ink jet recording device 10. As shown in FIG. 3, the platen 26 is formed in a reverse gutter shape and the upper surface becomes a supporting surface of the recording medium 12 (medium supporting surface). At the upstream side of the recording medium transport direction (X direction) in the vicinity of the platen 26, a pair of nip rollers 40 which is recording medium transporting means for intermittently transporting the recording medium 12 is placed. This nip roller 40 moves the recording medium 12 to the recording medium transport direction on the platen 26.

The recording medium 12 sent from a roll (sending supply roll) 42 of the supply side which configures the roll-to-roll type medium transporting means is intermittently transported toward the recording medium transport direction by the pair of nip rollers 40 provided at an entrance of the printing unit (the upstream side of the recording medium transport direction of the platen 26). The recording medium 12 reaching the printing unit directly below the ink jet head 24 is printed by the ink jet head 24 and is wound around the take-up roll 44 after printing. At the downstream side of the recording medium transport direction of the printing unit, a guide 46 for the recording medium 12 is provided.

In the printing unit, a temperature control unit 50 for adjusting the temperature of the recording media 12 during printing is provided at the rear surface of the platen 26 positioned opposite to the ink jet head 24 (the surface opposite to the surface supporting the recording medium 12). If temperature of the recording medium 12 is adjusted to a predetermined temperature when printing, physical properties such as viscosity or surface tension of the ink droplets landed on the recording medium 12 becomes the value aimed for, therefore, a target dot diameter can be obtained. In addition, a pretemperature control unit 52 may be provided at the upstream side of the temperature control unit 50 and an after-temperature control unit 54 may also be prepared at the downstream side of the temperature control unit 50, if necessary.

(Description of Ink Jet Head)

Figure 4:
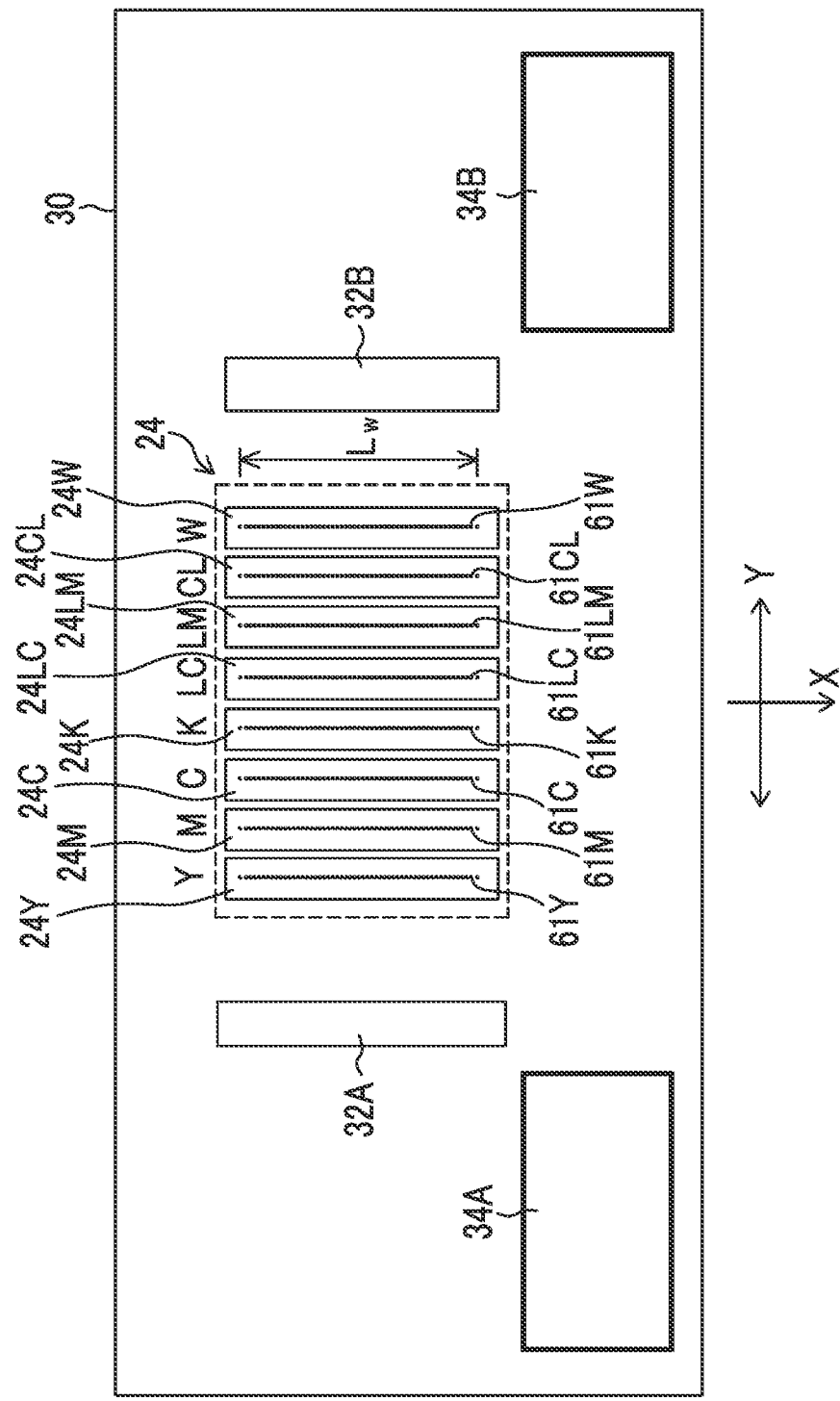
FIG. 4 is a perspective planar view which shows one example of a disposition configuration of an ink jet head and an ultraviolet irradiating unit shown in FIG. 2.

FIG. 4 is a planar perspective view which shows an example of configuration of the ink jet head 24, the preliminary curing light sources 32A and 32B, and the main curing light sources 34A and 34B disposed on the carriage 30.

In the ink jet head 24, nozzle arrays 61Y, 61M, 61C, 61K, 61LC, 61LM, 61CL, and 61W for discharging the ink of each color are provided for color ink of yellow (Y), magenta (M), cyan (C), black (K), light cyan (LC), light magenta (LM), clear (transparent) (CL), and white (W, arbitrary), respectively. The nozzle arrays are shown by the dotted line and the individual nozzle is not shown in FIG. 4. In addition, nozzle arrays are sometimes represented by a sign 61 as a collective term for 61Y, 61M, 61C, 61K, 61LC, 61LM, 61CL, and 61W in the following description.

Types of ink color (the number of colors) or a combination of colors is not limited to the present embodiment. For example, a form in which nozzle arrays of LC and LM are omitted, a form in which nozzle array of W is omitted, a form in which a nozzle array of metal ink is added, a form in which a nozzle array discharging ink of special colors (special ink) ink is added, or the like, is possible. In addition, the disposition order of nozzle arrays of each color is not particularly limited. However, the configuration to dispose the ink with low curing sensitivity to ultraviolet light closer to the preliminary light sources 32A or 32B among a plurality of ink types is preferable.

A head module is configured for a nozzle array 61 of each color, and a color ink jet head 24 in which color picture is possible may be configured by arranging these head modules. For example, an aspect in which a head module 24Y having a nozzle array 61Y discharging yellow ink, a head module 24M having a nozzle array 61M discharging magenta ink, a head module 24C having a nozzle array 61C discharging cyan ink, a head module 24K having a nozzle array 61K discharging black ink, and each head module 24LC, 24LM, 24CL and 24W having each nozzle array 61 LC, 61 LM, 61CL and 61W discharging ink of each color LC, LM, CL, and W are arranged at regular intervals to line up along the reciprocative moving direction of the carriage 30 (main scanning direction, Y direction) is possible. A module group of head modules of each color 24Y, 24M, 24C, 24K, 24LC and 24LM (a head group) may be interpreted as "ink jet head" and each module can also be interpreted as each "ink jet head". Alternatively, a configuration, in which a separate ink flow path is formed for each color inside the ink jet head 24 and a nozzle array discharging the ink of multiple colors using one head, is possible.

Each nozzle array 61 is configured of a plurality of nozzles arranged in a row (linearly) at regular intervals along the recording medium transport direction (sub-scanning direction, X direction). In the ink jet head 24 of the present example, a disposed pitch of the nozzle (a nozzle pitch) configuring each nozzle array 61 is 254 μm (100 dpi), the number of nozzles configuring one array of the nozzle array 61 is 256, and a total length of the nozzle array 61 Lw (total length of the nozzle array) is approximately 65 mm (254 μm×255=64.8 mm). In addition, discharge frequency is 15 kHz and the discharge amount of the ink droplets can be divided into three classes of 10 pl, 20 pl, 30 pl by changing the drive waveform when the ink droplets are discharged.

As an ink discharging method of the ink jet head 24, a method for causing flying of the ink droplets by a piezoelectric element (piezo actuator) (piezo jet method) is employed. As the element generating discharge energy, a method in which bubbles are generated by heating the ink using a heating body such as a heater (heating element) and use that pressure to fly the ink droplets (a thermal jet method) may also be employed, in addition to a method using the electrostatic actuator (an electrostatic actuator method). However, it is preferable that a piezo jet method with relatively high discharge power be employed when ultraviolet curable ink is used, since ultraviolet curable ink has high viscosity compared to solvent ink in general.

(Regarding Image Drawing Mode)

In the ink jet recording device 10 shown in the present example, a printing resolution can be changed by changing the number of printing paths since picture control of multi-path type is applied. For example, a drawing mode of three types of a high-production mode, a standard mode and a high-definition mode is prepared and the printing resolution is different, respectively, in each mode. The drawing mode may be selected depending on the printing purposes and applications.

In the high-production mode, printing is performed at a resolution of 600 dpi (main scanning direction)×400 dpi (sub-scanning direction). In the case of the high-production mode, the resolution of 600 dpi is achieved by two paths (scanning two times) for the main scanning direction. Dots are formed at a resolution of 300 dpi in the first scanning (outbound of the carriage 30). Dots in the second scanning (inbound) are formed so as to interpolate the middle of the dots formed in the first scanning (outbound) at 300 dpi, therefore, a resolution of 600 dpi is obtained with regard to the direction of the main scanning direction. On the other hand, with regard to the sub-scanning direction, the nozzle pitch is 100 dpi, dots are formed at a resolution of 100 dpi in the sub-scanning direction by one-time main scanning (one path). Therefore, a resolution of 400 dpi is achieved by carrying out interpolation printing by four-path printing (scanning four times). In addition, the main scanning speed of the carriage 30 in the high-production mode is 1,270 mm/sec.

In the standard mode, printing is carried out at a resolution of 600 dpi×800 dpi, and the resolution of 600 dpi×800 dpi is obtained by a two-path printing for the main scanning direction and an eight path printing for the sub-scanning direction.

In the high-definition mode, printing is carried out at a resolution of 1,200 dpi×1,200 dpi, and the resolution of 1,200 dpi×1,200 dpi is obtained by a four path printing for the main scanning direction and a twelve path printing for the sub-scanning direction.

<Regarding Swath Width by Singling Scanning>

In drawing mode of a wide-format machine, each drawing condition for separate singling (interlacing) is fixed for each resolution setting. More specifically, a swath path is different depending on the width of the nozzle array of the ink jet head and the path number of the main scanning direction and the sub-scanning direction (the divided number of interlacing) since width of the discharging nozzle array of the ink jet head Lw (length of the nozzle array) is divided by the number of paths (the repeated number of scans) and is singling drawn. Details of the singling drawing by a multi-path method, for example, are disclosed in, for example, JP2004-306617A.

As an example, the relationship between the number of paths by singling drawing and the swath width when QS-10 head (100 dpi, 256 nozzles) manufactured by FUJIFILM DIMATIX, Inc. is used is as shown in Table 5 (Equation 5). The swath width expected from the drawing is a value which divides a width of the nozzle array used by a product of the number of paths of the main scanning direction and the number of paths of the sub-scanning direction.

[Equation 5]

| Width of Nozzle Array Used (mm) | 64.8 | 64.8 | 64.8 | 64.8 |
|---|---|---|---|---|
| Number of Main Paths | 1 | 1 | 2 | 2 |
| Number of Sub-Paths | 2 | 4 | 2 | 4 |
| Swath Width (mm) | 32.4 | 16.2 | 16.2 | 8.1 |

(Disposition of Ultraviolet Irradiation Unit)

As shown in FIG. 4, the preliminary curing light sources 32A and 32B are disposed on both sides of left and right of the moving direction of the carriage of the ink jet head 24 (Y direction). In addition, the main curing light sources 34A and 34B are disposed on the downstream side of the recording medium transport direction of the ink jet head 24 (X direction). The main curing light sources 34A and 34B are disposed further outside (farther location) than the preliminary curing light sources 32A and 32B are toward the Y direction from the ink jet head 24. The main curing light sources 34A and 34B are configured to be movable toward the direction opposite to the recording medium transport direction (−X direction), therefore, can change disposition to align with the preliminary curing light sources 32A and 32B, and the ink jet head 24 along the moving direction of the carriage.

The color ink droplets discharged from the nozzle for coloring ink composition (color ink) of the ink jet head 24 (the nozzle included in the nozzle arrays 61Y, 61M, 61C, 61K, 61LC, and 61LM) and landed on the recording medium 12 is ultraviolet irradiated for preliminary curing by the preliminary curing light unit 32A (or 32B) which passes above the color ink droplets immediately after landing.

In addition, the ink droplets on the recording medium 12 which have passed through the printing area of the ink jet head 24 according to the intermittent transport of the recording medium 12 are ultraviolet irradiated for main curing by the main curing light sources 34A and 34B. In this way, landing interference may be prevented and deploying time of the dot (time for a dot to spread to a predetermined size) may be secured by first making the ink droplets be in the preliminary cured state, therefore, adhesion may be improved by facilitating interaction between the droplets and the medium as well as the height of the dot becoming uniform.

On the other hand, in the clear ink layer formed by the clear ink, a dot resolution level of the image layer is not required since the clear ink layer is an overcoat layer of the image layer.

As the banding phenomenon of the clear ink layer is examined in detail, the color ink requires pinning light for fixing the ejected position, however, in the clear ink layer, the need for pinning in the ejected position is not sufficient since the clear ink layer is making a surface layer. Rather, when the clear ink layer is formed, amount of pinning light is made to be off (0 mJ/cm$^2$). It is also preferable that the landed drops be not pinning by reducing the amount of irradiating light, and therefore, planarization and the uniformity of the layer is aimed for by creating a circumstance in which the ink is easily wet spread.

Therefore, in the present example, a configuration in which ultraviolet light is not irradiated for preliminary curing for white ink drops discharged from the nozzle for arbitrary white ink (a nozzle included in the nozzle array 61W) and landed on the recording medium 12 is used, or a configuration in which a lower amount of ultraviolet light is irradiated than in the preliminary curing of the color ink even when irradiated is used.

As a result, planarization and the uniformity of the layer may be improved by securing a time for the dot of the white ink landed on the recording medium to be spread.

In addition, in the present example, the clear ink discharged from the nozzle for the clear ink (a nozzle included in the 61CL nozzle array) and landed on the recording medium is irradiated by almost the same amount of ultraviolet light by the main curing light source 34A moved to the location in which ultraviolet radiation is possible in response to the discharge position of the clear ink.

It is preferable that a curing process in which almost the same amount of activation energy as in the main curing process is applied be performed from when a film thickness of the clear ink is small (from immediately after the landing of the clear ink on the recording medium) since ultraviolet transmittance of the clear ink layer formed by the clear ink is low.

In addition, in the preliminary light sources 32A and 32B, the two light sources may be lit at the same time during the printing operation by the ink jet head 24, however, extending the lifetime of the light sources may be achieved by lighting the preliminary curing light source alone which is the rear side in the carriage movement of the main scanning direction. In addition, in the main curing light sources 34A and 34B, the two light sources are lit at the same time during the printing operation of the ink jet recording device 10. In the drawing mode with a slow scanning speed, the other one can be turned off and timing of the first light emission of the preliminary light sources 32A and 32B and the main curing light sources 34A and 34B may be at the same time or be different.

(Description of Main Curing Light Source Movement)

Figure 5:
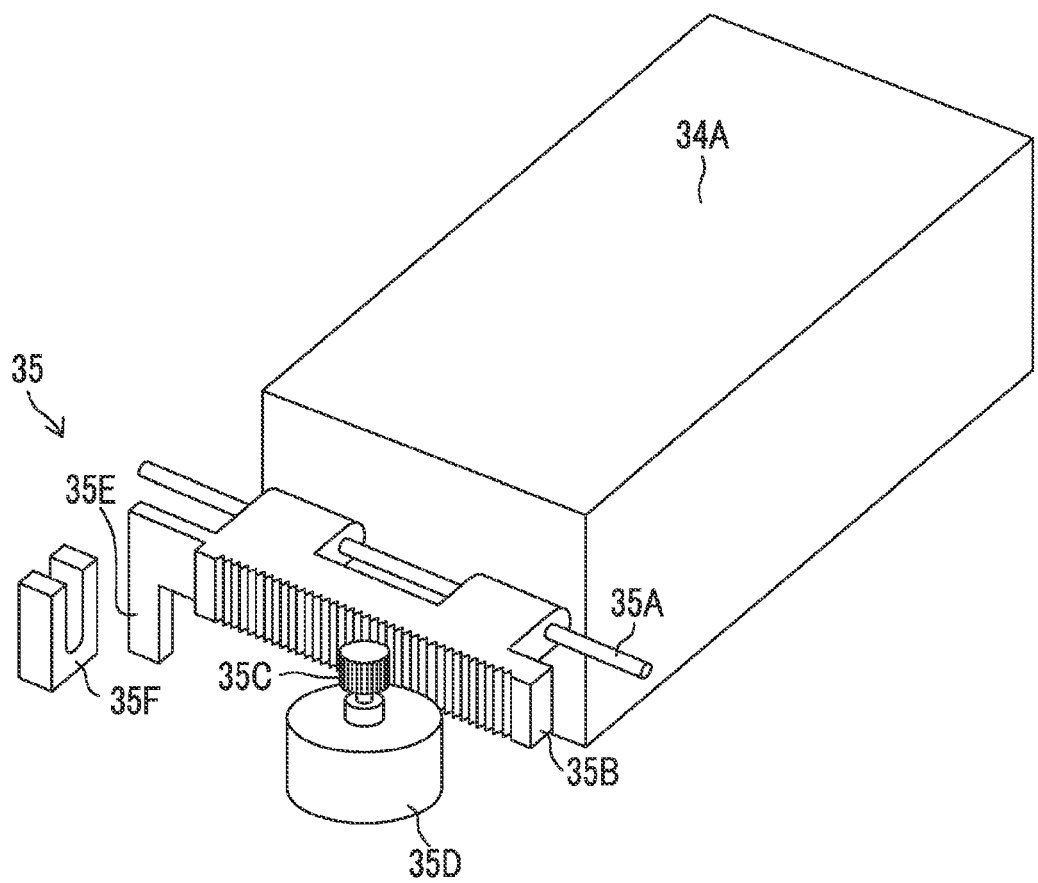
FIG. 5 is a perspective view which shows a configuration example of a light source moving unit which moves the ultraviolet irradiating unit shown in FIG. 4.

FIG. 5 is a perspective view which shows a configuration example of a moving mechanism 35 of the main curing light source 34A (light source moving unit). The light source moving unit 35 shown in the diagram adopts a linear moving mechanism of the rack and pinion type. That is, the light source moving unit 35 is equipped with a shaft 35A fixed and disposed along the recording medium transport direction which is a moving direction of the main curing light source 34A, a rack 35B mounted on the case of the main curing light source 34A and formed dentate-shaped irregularities along the shaft 35A, a drive motor 35D in which a pinion gear 35C is attached to its rotation axis, and an optical position sensor 35F which detects the detection piece 35E formed at the end of the rack.

The pinion gear 35C is rotated when the rotation axis of the drive motor 35D is rotated and the rack 35B moves along the shaft 35A by engaging the teeth of the rack 35B and the pinion gear 35C and then, the main curing light source 34A moves along the shaft 35A together with the rack 35B. When the detection piece 35E provided at the tip of the rack 35B squeezes into the detection range of the position sensor 35F, rotation of the drive motor 35D is stopped, therefore, the main curing light source 34A is stopped at a predetermined position.

In addition, the moving mechanism having the same configuration may also provided in the main curing light source 34B located at the opposite side of the main curing light source 34A across the ink jet head 24, and may be configured to be movable. A configuration in which is the main curing light source 34A moves to multiple positions by including a plurality of position sensors 35F.

(Description of Image Foaming Process)

The ink jet recording device 10 shown in the present example has a configuration in which an image of multi-layer structure is formed by stacking the image layer formed by color ink (Y, M, C, K, LC, LM and the like) (shown in FIG. 1 with a sign 14) and the clear ink layer formed by clear ink (shown in FIG. 1 with a sign 16). In addition, the amount of ultraviolet irradiation can be controlled depending on an order of layer formation and ultraviolet absorption characteristics of the ink (ink curing properties).

For example, a white ink composition of arbitrary components has a lower ultraviolet transmittance compared to that of the color ink and the clear ink since it contains titanium oxide, zinc oxide, or the like as a pigment, therefore, has a longer curing time when the same amount of ultraviolet light per unit volume as the color ink or the clear ink is irradiated. Ultraviolet irradiation is controlled so that the clear ink has more ultraviolet radiation per unit time than the color ink in order to reduce the difference in curing characteristics due to the ultraviolet transmission characteristics of the clear ink and the color ink. Specific examples of such an image formation will be described later.

In addition, the black composition ink, although classified as an ink with longer curing time from the viewpoint of ultraviolet transmittance, is classified as color ink since it is necessary to prevent ejection interference by preliminary curing immediately after ejection when used in forming the image layer.

<Regarding Surface Gloss Layer (Transparent Layer)>

In the color layer formed by the color ink (image layer), the clear ink layer which becomes the overcoat layer (overcoat layer) requires both a high-gloss mode (gloss mode) and a low-gloss mode (matt mode). The matt mode is obtained relatively simply in the conventional system of a wide-format printer in which the clear layer is cured before wet spreading using pinning light immediately after ejection. On the other hand, the overcoat layer which is the clear ink layer does not require resolution in order to achieve high gloss. As a result, a configuration in which a mechanism which is not exposed by pinning light unlike the color layer in order to promote planarization by the droplet being actively wet spread after ejection, or a mechanism which reduces the curing action by pinning light is preferable. Therefore, it is preferable that the undercoat color layer which requires high resolution or high-definition is pinning cured immediately after ejection, and the clear ink layer is either not pinning exposed immediately after ejection or is exposed with smaller amount of pinning light. In addition, in order to obtain satisfactory (smooth) clear ink surface which is a surface gloss layer, drawing two layers at one time is preferable. The ink jet head and the pinning light source are preferably separated into upstream and downstream with respect to the substrate transport direction and controlled independently in order to achieve this. However, the discharge amount of the clear ink is preferably larger than the discharge amount of the ink jet head of the normal color ink since sufficient wet spreading is necessary. Details will be described later.

According to experiment, the image layer is preferably irradiated immediately after ejection by pinning light with a light intensity of 1 mJ/cm$^2$ to 20 mJ/cm$^2$ per unit area, more preferably with 2 mJ/cm$^2$ to 6 mJ/cm$^2$. On the other hand, the clear ink layer is preferably irradiated immediately after ejection by pinning light with a light intensity of 0 mJ/cm$^2$ to 4 mJ/cm$^2$ per unit area, more preferably with 0 mJ/cm$^2$ to 2 mJ/cm$^2$.

Pinning light is exposed from once to a plurality of times by a carriage scanning in order to avoid the droplet shape from being broken by unification or interference with other ink immediately after ejection, or to avoid the droplet from moving. Curing light refers to an exposure to fully cure the ink in which image is formed. Curing light is also irradiated a plurality of times by the carriage scanning. A total accumulated amount of exposure is from 200 mJ/cm$^2$ to 1,000 mJ/cm$^2$ to 3,000 mJ/cm$^2$ by the pinning exposure from once to a plurality of times and the curing exposure a plurality of times. Ink is cured by radical polymerization or cationic polymerization, preferably by radical polymerization since the tendency of the ink sensitivity is determined from the sensitivity with regard to the irradiation wavelength and the content of the initiator and the sensitizer which are included in the ultraviolet curable ink.

In the present embodiment, an irradiated area of the preliminary curing light source is divided according to the divided nozzle area and light amount (distribution of light intensity) is adjusted for each of the irradiated areas so that appropriate pinning light in response to the picture range of the divided nozzle are which forms each layer such as a colors layer, a white paper layer, a transparent layer and the like. Details will be described later.

(Detailed Description of Image Forming Process)

Figure 6:
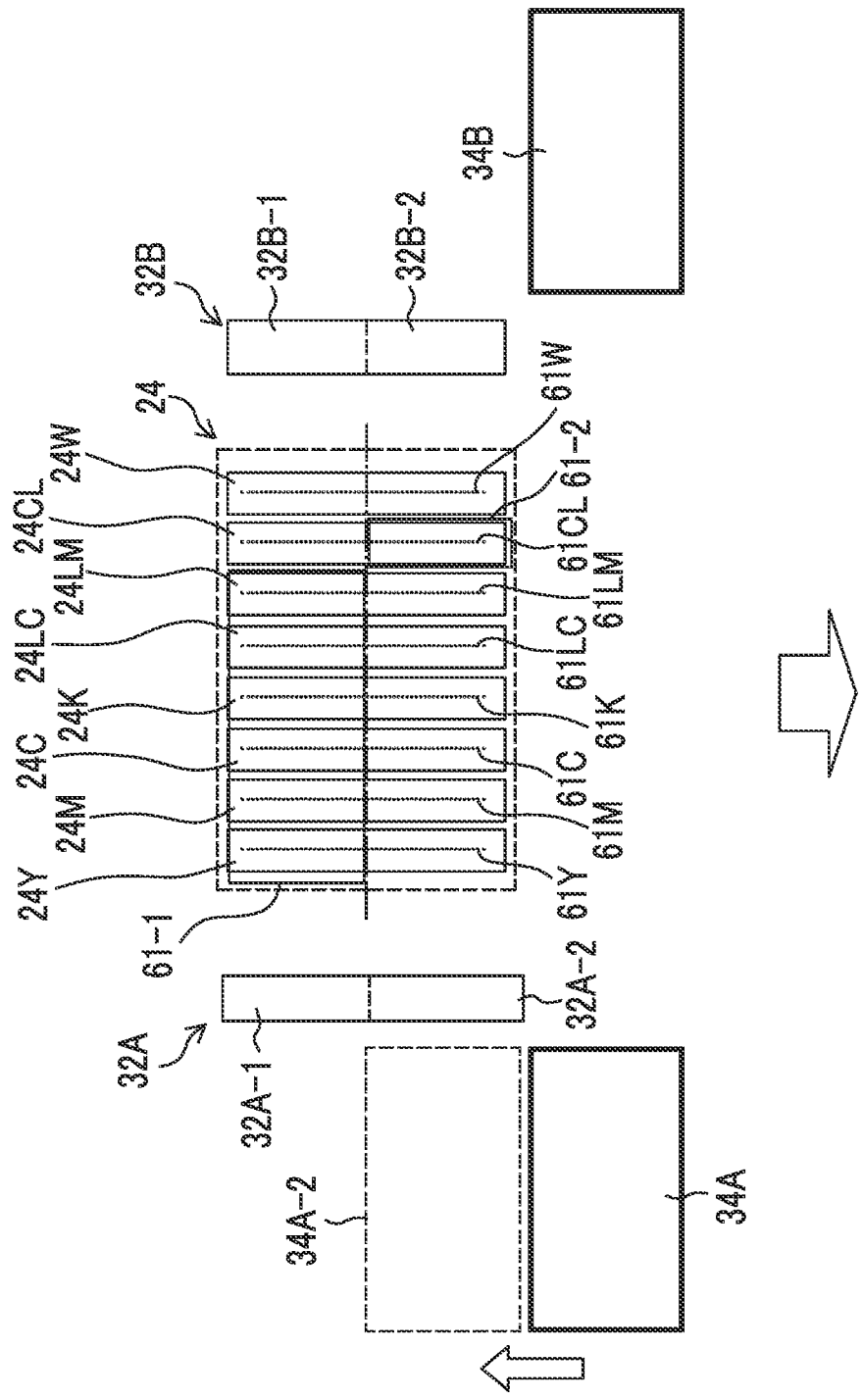
FIG. 6 is an explanatory diagram which shows a configuration example of an ink jet head and a ultraviolet irradiating unit for forming an image shown in FIG. 1.

In an image forming method applied to the ink jet recording device 10 shown in the present example with reference to FIG. 6, each nozzle array 61 is divided into a plurality of areas with respect to the recording medium transport direction, each of the color ink or the clear ink is discharged, from certain areas divided, and the image layer or the clear ink layer (transparent layer) is formed. Divided number of the nozzle array 61 is the number of the image forming layer N.

In addition, the recording medium 12 is intermittently transported in a one-way direction with a unit in which the length in the recording medium transport direction of the divided area of the nozzle array 61 is divided by the number of multi-paths (a unit calculated from (total length of the nozzle array Lw/the number of the image forming layers N)/the number of multi-paths) and is configured in which the clear ink layer discharged from the downstream side of the recording medium transport direction of the nozzle array 61 is stacked on top of the coloring ink layer discharged from the upstream side of the same. Here, the "number of multi-paths" is defined by the product of the number of paths of the carriage scanning direction and the number of paths of the recording medium transport direction.

In the following description, it is assumed that the length in the recording medium transport direction of the irradiation area of the main curing light sources 34A and 34B and the length in the recording medium transport direction of the main curing light sources 34A and 34B is are identical. The real length in the recording medium transport direction of the main curing light sources 34A and 34B is determined so that a predetermined irradiation area may be obtained with the spread of the irradiation area taking into account. In addition, "the number of image forming layers N" may sometimes be described as "divided number".

FIG. 6 is an explanatory diagram which schematically shows the configuration of the ink jet head 24 in order to form an image having a layer structure shown in FIG. 1, and a disposition of the main curing light sources 34A and 34B. In addition, a recording medium transport direction (X direction) is downward from the top shown as the top-down arrow in the diagram and the reciprocative moving direction of the carriage 30 (Y direction) is left and right direction.

As shown in FIG. 6, each nozzle array 61 is divided into two areas of an upstream side area 61-1 and a downstream side area 61-2, the coloring ink composition is discharged only from the upstream side area 61-1 of nozzle array 61Y, 61M, 61C, 61K, 61LC, and 61LM and the clear ink composition is discharged only from the downstream side area 61-2 of nozzle array 61W. If image layer 14 (see FIG. 1) is formed by the coloring ink discharged from the upstream side area 61-1, the clear ink layer 16 is formed on top of the image layer 14 formed in advance by the clear ink composition discharged from the downstream side area 61-2 by moving the recording medium 12 in the recording medium transport direction as much as a distance ((Lw/2)/the number of multi-paths).

While the clear ink layer 16 is formed on top of the image layer 14, at a discharge position of the coloring ink of the upstream side of the recording medium transport direction adjacent to the discharge position of the clear ink, coloring ink is discharged only from the upstream side area 61-1 of the nozzle array 61CL. That is, formation of the next color image progresses simultaneously with the formation of the clear ink layer 16. In addition, the multi-path method described earlier is applied for discharging the clear ink forming the clear ink layer 16 and for discharging the coloring ink forming the image layer 14.

(Configuration Example of Preliminary Curing Light Source)

Figure 7:
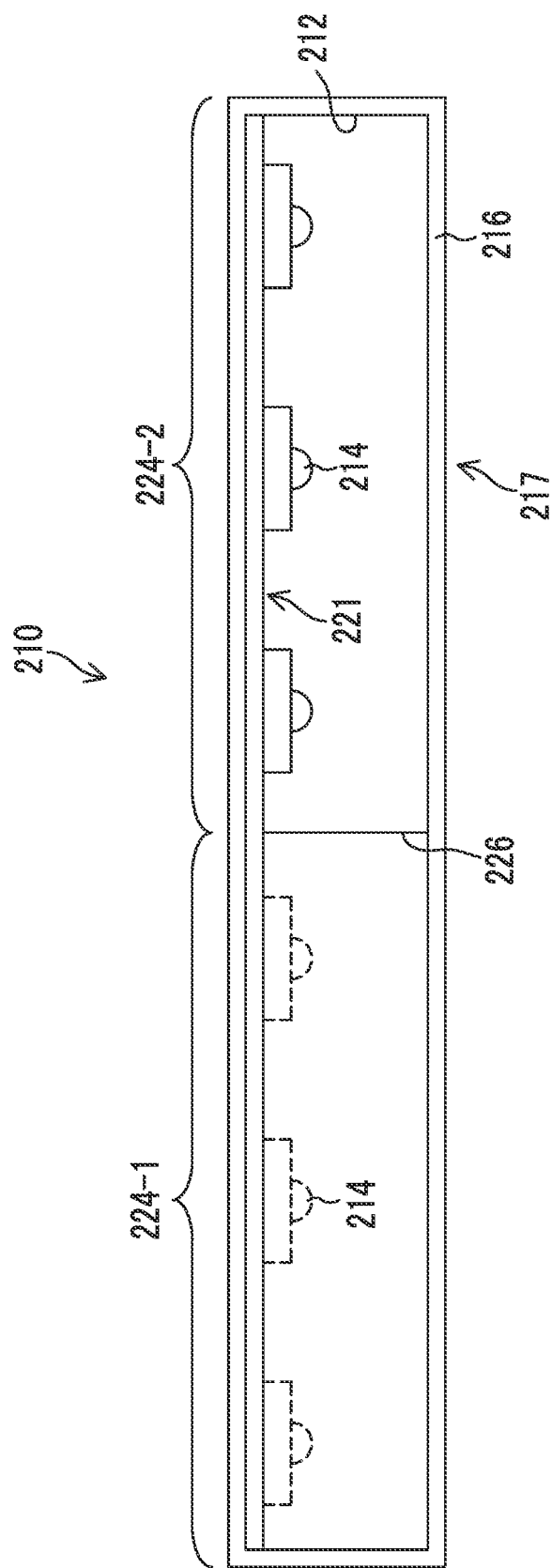
FIG. 7 is a perspective side view which shows a configuration example of a preliminary curing light source unit used as a light source for preliminary curing of the present embodiment.
Figure 8:
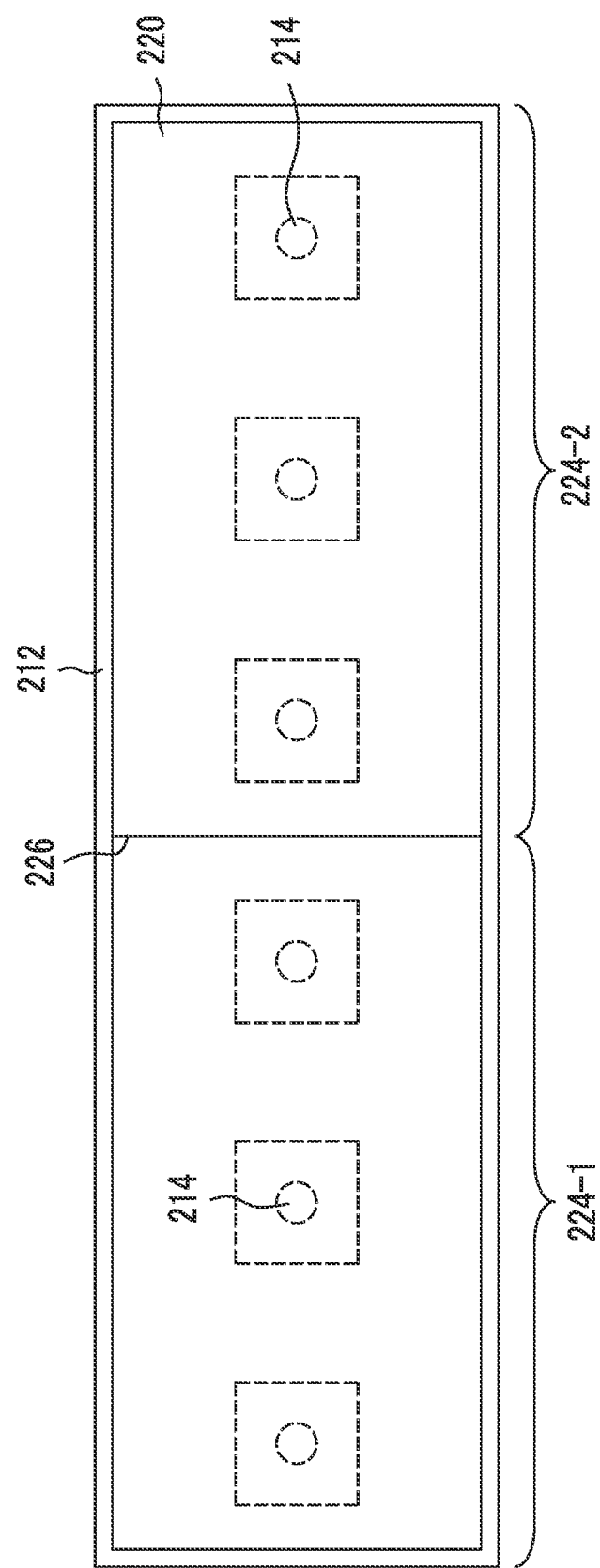
FIG. 8 is a perspective planar view which shows the preliminary curing light source unit shown in FIG. 7.

FIG. 7 is a perspective side view which shows a configuration example of a preliminary curing light source unit used as the preliminary curing light sources 32A and 32B of the present embodiment. FIG. 8 is a perspective plane view thereof. The preliminary curing light source unit 210 relating to configurations shown in FIG. 7 and FIG. 8 has a box shape of approximate rectangular parallelepiped. The preliminary curing light source unit 210 has a configuration in which a plurality of ultraviolet light emitting diode elements (hereinafter, described as "UV-LED elements") 214 are housed within a housing made of aluminum 212 (fence), and a transmission type light diffusion plate 216 is disposed at the bottom surface unit of the housing 212.

A circuit board 220 in which the UV-LED elements are mounted is disposed at the upper unit of the housing 212 with a LED mounting surface 221 facing toward the light diffusion plate 216 (a state in which light-emitting surface of the UV-LED elements 214 is facing downward in FIG. 7).

The Number of the UV-LED elements 214 mounted on the circuit board 220 is not particularly limited, however, a smallest possible number is preferable from the viewpoint of required UV irradiation width and costs. In the present example, six UV-LED elements 214 are aligned in line on the circuit board 220. Six UV-LED elements 214 are arranged side by side in the recording medium transport direction in order to obtain a UV irradiation width with which UV irradiation can be carried out at one time with regard to the nozzle array width Lw along the recording medium transport direction (X direction) of the ink jet head 24 as described in FIG. 4 and FIG. 6. The horizontal direction of FIG. 7 is the recording medium transport direction (X direction), and the recording medium 12 is made to be transported from right to left of FIG. 7.

A metal board with enhanced heat dissipation and heat resistance is used as the circuit board 220. A detailed structure of the metal board is not shown, however, an insulating layer is formed on top of a metal plate such as aluminum or copper, and the UV-LED elements 214, circuit for LED drive (anode circuit and cathode circuit) and the like are formed on top of the insulating layer. In addition, a metal base board in which a circuit is formed on the base metal may be used and a metal core board in which a metal plate is embedded inside the board may also be used.

In addition, a white resist of high reflectance having UV resistance is processed around the UV-LED elements 214 of the LED mounting surface 221 in the circuit board 220. Ultraviolet light may be reflected and scattered from the surface of the circuit board 220 and a light generated from the UV-LED elements 214 may be utilized in UV irradiation for preliminary curing by the white resist layer (not shown).

The light diffusion plate 216 is a milky white plate formed by optical materials which diffuses the light while transmitting emitted from the UV-LED elements 214. For example, as the light diffusion plate 216, a white acrylic plate in which white pigments (a light diffusion material) are dispersed is used. An optical member molded by dispersing and mixing the fine particles for light diffusion in a transparent material such as glass may also be used without limiting to the white acrylic plate. Light diffusion plates with different transmittance and diffusion properties are obtained by changing the content and the average particle diameter of the light diffusion materials (such as white pigment).

In addition, means to diffuse light as a transmission type light diffusing plate is not limited to means to disperse the silica powder to this acrylic resin, and other means such as a frosting process on the surface of the board made of fused quartz, a frosted glass process, a ground glass process, and the like may be used to easily achieve light diffusion.

The transmission type light diffusion plate 216 such as this is disposed at the bottom of the housing 212 opposed to the LED mounting surface 221 of the circuit board 220. An underside of the light diffusion plate 216 (sign 217) in FIG. 7 is a light emitting surface facing the recording medium (not shown). When all the UV-LED elements 214 (six in the present example) are lit, ultraviolet light is irradiated on the recording medium 12 from the light emitting surface 217 of the light diffusion plate 216 with a light irradiation width of the nozzle array width Lw of the ink jet head 24 or more.

In the main curing light source unit 210 of the present example, an LED array in which six UV-LED elements 214 are lined up in the X direction is divided into two areas. That is, a plurality of UV-LED elements 214 arranged along the X direction is divided into two areas of an upstream side area 224-1 of the recording medium transport direction (X direction) and a downstream side area 224-2, and each divided area of 224-1 and 224-2 includes three UV-LED elements 214 each.

A partition member 226 having a light-shielding property is provided inside the housing 212 as a range regulating member in order to partition areas of the LED element array divided into two, the housing has a structure in which light of the UV-LED element 214 of one area does not enter the area of the other. Generally, UV-LED element has a wide irradiation range and has a property to spread while propagating, however, as in the present example, irradiation area may be divided by a structure covering the periphery of the LED element by the partition member 226.

In addition, for each divided area 224-1 and 224-2, light emitting amount of the UV-LED element 214 within each area can be controlled. For example, three UV-LED elements 214 belonging to the upstream side of the area 224-1 are turned off when the clear ink layer is formed and three UV-LED elements 214 belonging to the downstream side of the area 224-2 is turned on.

By dividing the light emission range by the partition member 226 such as this and combining light emission control UV-LED elements belonging to each area 224-1 and 224-2, ultraviolet irradiation area can be divided and light amount of each divided radiation area can be individually controlled.

That is, a configuration example shown in FIG. 7 and FIG. 8 is an upward irradiation type LED light source unit in which the UV-LED element array is disposed at the upper unit of a light source box, and has a configuration to control the division point and the like in response of the irradiation lit area of LED to the divided area of the nozzle array of the ink jet head 24. Control of the amount of light includes current value control, pulse width modulation control, on-off control and the like. A configuration which includes any of current control means to control the current value, pulse width modulation control means to carry out the pulse width modulation control, and on-off control means to carry out on-off control or an appropriate combination of these.

The configuration is not limited to the configuration exemplified in FIG. 7 and FIG. 8, and, for example, by providing an aluminum plate of high reflectivity determining the irradiation area on undersurface of the housing 212 and shifting the frame of the aluminum plate, changing the irradiation area of the downstream/upstream is possible. As aspect which changes the irradiation region is also possible by replacing the frame of the aluminum plate of high reflectivity. In this case, this aluminum plate is equivalent to a "range control member" since the irradiation range is restricted by the aluminum plate of high reflectivity. Other aspects controlling the irradiation range by providing a mechanical shutter or a liquid crystal shutter which limits the light irradiation range are also possible.

SPECIFIC EXAMPLES

In the image shown in FIG. 1, the number of image forming layers is 2, the image layer 14 is formed on the reflective recording medium 12 and the clear ink layer 16 is formed on the image layer 14. In the Image having such a structure, the image layer 14 can be visually recognized with a background of the reflective recording medium 12 or arbitrary white layer 18 when viewed from the V direction.

Hereinafter, description will be made with reference to FIG. 6. In order to obtain a high gloss by stacking the clear ink layer on top of the image layer, the head used for forming the image layer uses a head of the upstream side of Y, M, C, K, LC and LM, and the light sources (32A-1 and 32B-1) on both sides thereof form the image layer with the lamp set to be ON. After that, the head used to form the clear ink layer uses a head 61CL at the downstream side of CL, and the lamp of the light sources (32A-2 and 32B-2) on both sides thereof is set to be OFF, and as a result, time for wet spreading of the clear ink needed to achieve high gloss is sufficiently secured. After that, the light sources 34A and 34B located further downstream are set to be ON, and the coloring ink and the clear ink are main cured.

On the other hand, in order to obtain a low gloss (matt) image by stacking the clear ink layer on top of the image layer, the head used for forming the image layer uses a head of the upstream side of Y, M, C, K, LC and LM, and the light sources (32A-1 and 32B-1) on both sides thereof form a color image with the lamp set to be ON. After that, the head used to form the clear ink layer uses a head 61CL at the downstream side of CL, and the lamp of the light sources (32A-2 and 32B-2) on both sides thereof is set to be ON, and as a result, ink discharged is cured before wet spreading and the surface state becomes rough resulting in an image with low glossiness. After that, the light sources 34A and 34B located further downstream are set to be ON, and the main curing is carried out.

In addition, when comparing a high-gloss mode and a low-gloss mode in general, an ink amount discharged is preferably large in case of the high-gloss mode, an ink amount discharged is preferably small in case of low-gloss mode. By varying the amount of ink in this way, intended results are easily obtained.

Hereinafter, a step to obtain an image with a high glossiness will be described in detail.

Step 1 is a forming step of the image layer 14 in FIG. 1. In FIG. 6, the preliminary curing light source on the left side is represented by a sign 32A and the main curing light source is represented by a sign 34A.

First, the coloring ink is discharged on the recording medium 12 from the upstream region, including 61-1 including nozzle arrays 24Y, 24M, 24C, 24K, 24LC, and 24LM by scanning the carriage 30 to the carriage moving direction. In addition, ultraviolet light of low light amount (1~5 mJ/cm$^2$ per one scanning of the carriage of times) is irradiated and cured from the preliminary curing light sources 32A-1 and 32B-1 located next to nozzle arrays 24Y, 24M, 24C, 24K, 24LC, and 24LM by the one-time carriage scanning on the coloring ink immediately after landed on the recording medium 12, and made to be in a gel state. As a result, landing interference of the coloring ink is prevented.

Then, the recording medium 12 is moved to the recording medium transport direction as much as a distance ((Lw/2)/the number of multi-paths).

Step 2 is a period in between the forming step of the image layer 14 and a forming step of the clear ink layer 16, and adhesion affinity with the recording medium 12 and the image layer 14 is increased by maintaining the preliminary curing state for a predetermined period of time, therefore reduction of Pyle height will be promoted along with promoting the spread of the dots of the clear ink, and the glossiness of the color image is also improved.

Step 3 is the forming step of the clear ink layer 16 clear ink layer, and at a discharge position of the clear ink (locating on the image layer 14 formed in advance) located at the downstream side as much as (Lw/2) to the recording medium transport direction from the discharge position of the color ink of the recording medium 12, the carriage 30 (see FIG. 4) is scanned to the carriage moving direction and the clear ink is discharged on top of the image layer 14 in a preliminary cured state only from downstream side area 61-2 of the nozzle array 61CL. Spreading of clear ink may be obtained by preventing preliminary curing by setting the preliminary curing light sources 32B-1 and 32B-2 located next to the nozzle array 61CL to be OFF.

Step 4 is a main curing process step and a main curing process is performed on the clear ink layer 16 and the image layer 14 using the main curing light sources 34A and 34B disposed at the downstream side of the recording medium transport direction of the ink jet head 24. Ultraviolet light amount in the curing process such as this is 10 mJ/cm$^2$ per scan of a single carriage. By main curing the clear ink layer 16 and the image layer 14, glossiness of the image layer 14 is further improved and a balance is obtained between adhesion improvement of the clear ink layer 16 and the image layer 14, and the curing of the image layer 14 with film quality.

Regarding a description of the process for obtaining an image having low gloss, detailed explanation will not be repeated since setting the preliminary curing light source to be ON after discharging the clear ink is the big difference in the process for obtaining an image having low gloss. The present invention has an advantage of obtaining color images with different degrees of gloss depending on whether or not preliminary curing is carried out after discharging the clear ink.

(Ink Supply System)

Figure 9:
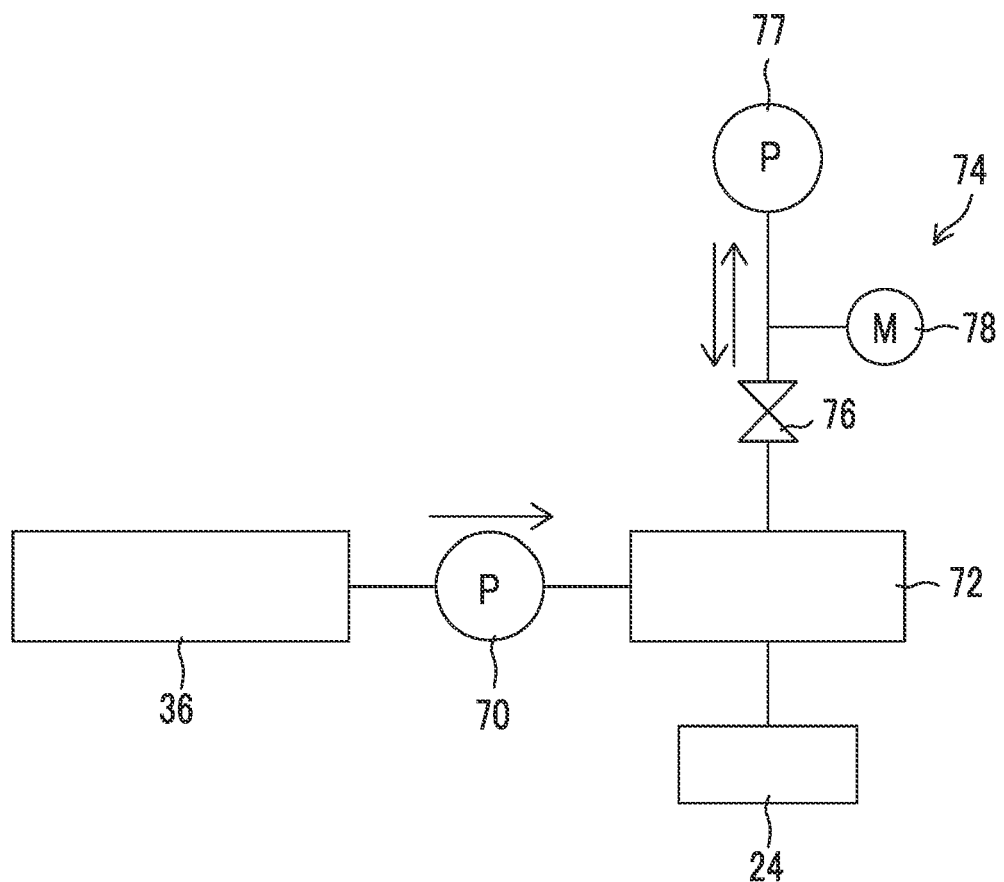
FIG. 9 is a block diagram which shows a configuration example of an ink supply system of an ink jet recording device.

FIG. 9 is a block diagram which shows a configuration of an ink supply system of the ink jet recording device 10. As shown in the diagram, the ink accommodated in the ink cartridge 36 is absorbed by a pump 70 and then sent to the ink jet head 24 through a sub-tank 72. In the sub-tank 72, a pressure adjusting unit 74 for adjusting the internal ink pressure is provided. The pressure adjusting unit 74 is equipped with a vacuum pump 77 which communicates with the sub tank 72 through a valve 76, and a pressure gauge 78 provided between the valve 76 and the vacuum pump 77.

In normal printing, the vacuum pump 77 moves to the direction which absorbs the ink in the sub-tank 72, and internal pressure of the ink jet head 24 and internal pressure of the sub-tank 72 are maintained at negative pressure. On the other hand, in the maintenance of the ink jet head 24, the vacuum pump 77 moves to the direction which pressurizes the ink in the sub-tank 72, and interior of the ink jet head 24 and interior of the sub-tank 72 are pressurized by force, therefore, the ink in the ink jet head 24 is discharged through a nozzle. Ink discharged from the ink jet head 24 by force is accommodated in the ink receiver of the cap described above (not shown).

(Description of Control System of Ink Jet Recording Device)

Figure 10:
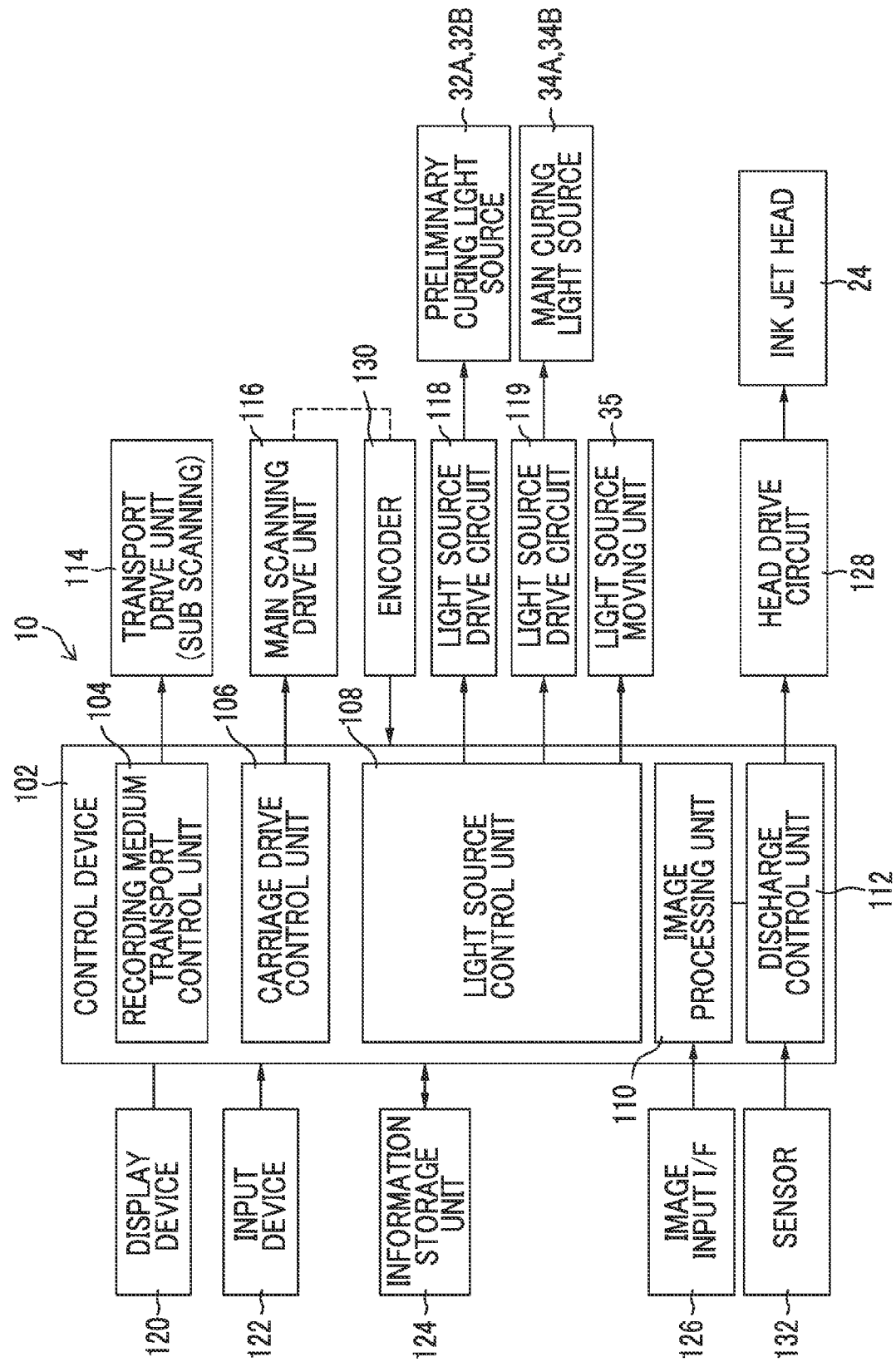
FIG. 10 is a block diagram which shows a configuration of an ink jet recording device.

FIG. 10 is a block diagram which shows a configuration of the ink jet recording device 10. As shown in the diagram, a control unit 102 is provided in the ink jet recording device 10 as controlling means. As the control device 102, for example, a computer with central processing unit (CPU) or the like may be used. The control unit 102 functions as an operational unit which performs the various operations as well as functions as a control device which controls the whole of the ink jet recording device 10 according to a predetermined program. The control device 102 includes a recording medium transport control unit 104, a carriage drive control unit 106, a light source control unit 108, an image processing unit 110, a discharge control unit 112. Each of these parts is realized by a hardware circuit or software, or a combination of these.

The recording medium transport control unit 104 controls a transport drive unit 114 for transporting the recording medium 12 (see FIG. 2). The transport drive unit 114 includes a drive motor which drives the nip rollers 40 shown in FIG. 3 and the drive circuit thereof. The recording medium 12 transported on the platen 26 (see FIG. 2) is intermittently transported to the sub-scanning direction in units of the swath width, in accordance with the reciprocative scanning to the main scanning direction (movement of the print path) by the ink jet head 24.

The carriage drive control unit 106 shown in FIG. 10 controls a main scan drive unit 116 for moving the carriage 30 (see FIG. 2) to the main scanning direction. The main scan drive unit 116 includes a drive motor connecting to the moving mechanism of the carriage 30 and a control circuit thereof. The light source control unit 108 is control means to control the light emission of the main curing light sources 34A and 34B through a light source drive circuit 119 as well as to control the light emission of the preliminary curing light sources 32A and 32B through a light source drive circuit 118. As the preliminary curing light sources 32A and 32B, and the main curing light sources 34A and 34B, a UV-LED element (an ultraviolet LED element) or a UV lamp such as a metal halide lamp is applied.

An input device 120 such as an operation panel and a display device 122 are connected to the control device 102. The input device 120 is means to input hand-operated external operation signals to the control device 102, and may employ various forms such as, for example, a keyboard, a mouse, a touch panel, and an operation button. As the display device 122, various forms such as a liquid crystal display, an organic EL display, and a CRT may be employed. An operator may select a drawing mode, input printing conditions, input and edit affiliated information by operating the input device 120, and may confirm a variety of information such as entries, search results and the like, through the display of the display device 122.

In addition, an information storage unit 124 which stores a variety of information and an image input interface 126 which captures image data for printing are provided in the ink jet recording device 10. As the image input interface, a serial interface or a parallel interface may be applied. This part may have a buffer memory (not shown) for faster communication.

Image data which is input through the image input interface 126 is converted to data for printing (dot data) by the image processing unit 110. Dot data, in general, is generated by a color conversion process and a halftone process performed for multi-gradation image data. The color conversion process is a process to convert image data expressed in sRGB (for example, 8-bit image data for each color of RGB) to color data of each color ink used in the ink jet recording device 10.

The halftone process is a process to convert the color data of each color ink generated by the color conversion process to dot data of each color by a process such as an error diffusion method or a threshold matrix. As means of halftone process, a variety of well-known means such as an error diffusion method, a dither method, a threshold matrix method, a density pattern method or the like may be applied. The halftone process generally converts a gray scale image data having a gray scale value of 3 or more to a gray scale image data having a gray scale value less than the original gray scale value. Converting to the binary dot image data (on-off dots) is the simplest case, however, performing multi-level quantization is also possible in response to the types of the dot size (for example, three types such as large dot, medium dot, and the small dot) in the halftone process.

Binary or multi-level image data (dot data) obtained in this way is used either as drive (on)/non-drive (off) of each nozzle, or as ink discharge data (ejection control data) to control the amount of droplets (dot size) in case of the multi-level.

The discharge control unit 112 generates a discharge control signal with regard to a head drive circuit 128 based on dot data generated in the image processing unit 110. In addition, the discharge control unit 112 includes a drive waveform generating unit (not shown). The drive waveform generating unit is means which generates drive voltage signals for driving a discharge energy generating element (in this example, a piezoelectric element) corresponding to each nozzle of the ink jet head 24. The waveform data of the drive voltage signal is stored in the information storage unit 124 in advance, and the waveform data used is output as necessary. The output signal from the drive waveform generating unit (drive waveform) is supplied to the head drive circuit 128. In addition, the output signal from the drive waveform generating unit may be digital waveform data or an analog voltage signal.

By applying a common drive voltage signal and then by switching on and off of the switch element (not shown) connected to individual electrode of each energy generating element depending on the discharge timing of each nozzle with regard to each discharge energy generating element of the ink jet head 24 through the head drive circuit 128, ink is discharged from the corresponding nozzle.

The information storage unit 124 stores a program executed by CPU of the control device 102, a variety of data necessary for controlling and the like. The information storage unit 124 stores setting information of resolution depending on the drawing mode, the number of paths (the repetitions number of the scan), control information of the preliminary curing light sources 32A and 32B, and the main curing light sources 34A and 34B, and the like.

An encoder 130 is mounted to the motor for driving of the main scan drive unit 116 and a motor for driving of the transport drive unit 114, outputs a pulse signal corresponding to the amount of rotation and the speed of rotation of the drive motor, and the pulse signal is sent to the control unit 102. A position of the carriage 30 and the position of the recording medium 12 is found based on the pulse signal output from the encoder 130.

A sensor 132 is mounted to the carriage 30, the width of the recording medium 12 is found based on the sensor signal obtained from the sensor 132.

The control unit 102 controls the operation of the light source moving unit 35 of the main curing light sources 34A and 34B. For example, when selected information of the image forming process or position information of the main curing light sources 34A and 34B is fed from the input device 120, the main curing light source 34A (34B) is moved to the position in response to the image forming process.

According to the ink jet recording device and the image forming method having configurations as described above, appropriate curing process can be performed for each ink layer since the pinning exposure area can be separately controlled corresponding to the divided area of the nozzle array. Therefore, a banding phenomenon occurred in clear ink layer can be avoided. That is, spread of clear ink drops may be promoted, and planarization and the uniformity of the layer may be achieved by setting the pinning exposure to be off or lowering the amount of light for the discharge area of the clear ink. As a result, a circumstance of periodic stripes for each swath being visible (occurrence of banding) may be avoided.

In addition, according to the present embodiment, for the clear ink in which high gloss is required, high smoothness is achieved by not substantially curing by setting the pinning light amount to be off or irradiating ultraviolet light with small light amount from the preliminary curing light sources 32A and 32B immediately after discharge, therefore, securing sufficient time for wet spreading, and as a result, high glossiness is obtained. Then, ultraviolet light of high intensity is irradiated by the main curing light sources 34A and 34B and cured, therefore, the amount of ultraviolet light amount (the amount of irradiation energy) is optimized by ink used in the drawing image, and as a result, an image formation in which two or more ink with different sensitivities are overlapped as a layer becomes possible.

Specifically, the clear ink is preliminary cured by being irradiated with ultraviolet light of small light amount from the preliminary curing light sources 32A and 32B immediately after discharge (landing on the recording medium), and is main cured by being irradiated with ultraviolet light of high intensity from the main curing light source 34A (34B) after dot spreading time is passed and after uniformization of the Pyle height is achieved. Therefore, taking larger dot gain is possible by taking the dot spreading time between the preliminary curing and the main curing, and graininess of the image is also further improved the by taking the time to uniformize the Pyle height.

In addition, at least one of the main curing light sources 34A and 34B may be selectively disposed at discharge positions of the ink with low sensitivity to ultraviolet light and slow curing, as well as configured to be movable parallel to the recording medium transport direction. Furthermore, ultraviolet light of high intensity is selectively irradiated on the ink with low sensitivity to ultraviolet light and slow curing since an irradiation area of the main curing light sources 34A and 34B may be determined in response to discharge range of the ink with low sensitivity to ultraviolet light and slow curing (total length of the nozzle array Lw/the number of image forming layer (divided number) N)), therefore, problems due to different curing time taken for each ink may be avoided.

The recording medium used in the present invention is not particularly limited, and well-known recording media may be used. For example, a paper, a plastic (for example, polyethylene, polypropylene, polystyrene or the like) laminated paper, a metal plate (for example, aluminum, zinc, copper, or the like), a plastic film (for example, polyvinyl chloride, diacetate cellulose, triacetate cellulose, propionate cellulose, butyrate cellulose, acetate butyrate cellulose, nitrate cellulose, polyethylene terephthalate, polyethylene, polystyrene, polypropylene, polycarbonate, polyvinyl acetal, or the like), a paper or a plastic film in which the metal described above is laminated or deposited. As the recording medium of the present invention, a non-absorbent recording medium is preferable and a plastic film or a paper is more preferable among others.

In the present invention, a minimum droplet volume of the nozzle from which the coloring ink composition is discharged is preferably greater than or equal to 5 pL and less than 20 pL, and a minimum droplet volume of the nozzle from which the clear ink composition is discharged is preferably greater than or equal to 20 pL and less than or equal to 60 pL.

As described above, the clear ink composition is intended to form an undercoat layer or an overcoat layer, therefore, high resolution is not required. On the other hand, the coloring ink composition requires high resolution since a color image is formed. By increasing the minimum droplet volume of the nozzle from which the clear ink composition is discharged comparing to the minimum droplet volume of the nozzle from which the coloring ink composition is discharged, high productivity may be obtained.

In the present invention, an image forming device which may carry out insulation and heating may be preferably used from the ink composition supply tank to the ink jet head part in terms that maintaining the ink composition discharged at a constant temperature is preferable. A temperature control method is not particularly limited, however, for example, heating control depending on the flow of the ink composition and ambient temperature by providing a plurality of temperature sensors in each pipe site is preferable. The temperature sensor may be provided in the vicinity of the ink composition supply tank and the nozzle of the ink jet head. In addition, it is preferable that the head unit to be heated be shut out thermally or insulated so as for the device main body not to be affected by the temperature from outside air. Alternatively, it is preferable that the heat capacity of entire heating unit be smaller along with insulating from other sites, in order to shorten the printer start-up time required for heating, or to reduce the loss of heat energy.

Radiation curable ink composition such as the ink composition of the present invention normally has higher viscosity than aqueous ink composition used as conventional ink composition for ink jet recording, therefore, viscosity variation due to temperature variation at the time of discharge is large. The viscosity variation of the ink composition has a significant impact on the change in the droplet size and change in rate of droplet discharge and, furthermore, causes degradation of the image quality. Therefore, it is preferable that temperature of the ink composition at the time of discharge be maintained at a constant temperature as possible. Therefore, the control width of the temperature of the ink composition is preferably ±5° C. of the set temperature, more preferably ±2° C. of the set temperature, even more preferably ±1° C. of the set temperature.

The ink compositions of the present invention has sufficient sensitivity, therefore, is cured sufficiently even with active radiation of low power. Specifically, light intensity of the preliminary curing light source described above is preferably in the range of 100 mW/cm$^2$ to 800 mW/cm$^2$. In addition, light intensity of the main curing light source is preferably 800 mW/cm$^2$ to 1,600 mW/cm$^2$. If the light intensity is within the range, quality and productivity of image formed are excellent.

The ink compositions of the present invention is preferably irradiated by ultraviolet light described above for 0.01 seconds to 2 seconds, more preferably 0.1 seconds to 1.5 seconds, and even more preferably 0.3 seconds to 1 seconds.

Irradiation of active radiation is performed for a certain period of time (preferably 0.01 seconds to 0.5 seconds, more preferably 0.01 seconds to 0.3 seconds, even more preferably 0.01 seconds to 0.15 seconds) after landing of the ink composition. By controlling the time from landing of the ink composition to irradiation to a very short time, smearing of the ink composition landed on the recording medium before curing can be prevented. In addition, it is preferable in terms that remaining of the residual unreacted monomers may be suppressed since exposure can be carried out to the deep unit where the light source does not reach before the ink composition penetrates even for porous recording media.

EXAMPLES

Hereinafter, examples and comparative examples are shown and the present invention is described in more detail. However, the present invention is not limited to these examples. In addition, "parts" represents "parts by mass" and "%" represents "mass %" unless otherwise specified.

(Preparation of Yellow Mill Base)
Yellow pigment: NOVOPERM YELLOW H2G (manufactured by Clariant International Ltd.) 30 parts by mass
SR9003 (propoxylated (2) neopentyl glycol diacrylate (a compound in which 2 mol adduct of neopentyl glycol propylene oxide is diacrylated), manufactured by SARTOMER Company) 30 parts by mass
BYK168 (a dispersing agent, manufactured by BYK-Chemie GmbH) 40 parts by mass The components described above were stirred and a yellow mill base was obtained. In addition, preparation of the pigment mill base was made by placing the yellow mill base in a disperser motor mill M50 (manufactured by EIGER Machinery, Inc.) and dispersing at peripheral speed of 9 m/s for 8 hours using zirconia beads with diameters of 0.65 mm.

(Preparation of Magenta Mill Base)
Magenta pigment: CINQUASIA MAGENTA RT-355D (manufactured by BASF Japan Ltd.) 30 parts by mass
SR9003 30 parts by mass
BYK168 40 parts by mass The components described above were stirred under the same dispersion conditions as those in the preparation of the yellow mill base and a magenta mill base was obtained.

(Preparation of Cyan Mill Base)
Cyan pigment: IRGALITE BLUE GLVO (manufactured by BASF Japan Ltd.) 30 parts by mass
SR9003 30 parts by mass
BYK168 40 parts by mass The components described above were stirred under the same dispersion conditions as those in the preparation of the yellow mill base and a cyan mill base was obtained.

(Preparation of Black Mill Base)
Black pigment: SPECIAL BLACK 250 (manufactured by BASF Japan Ltd.) 30 parts by mass
SR9003 30 parts by mass
BYK168 40 parts by mass The components described above were stirred under the same dispersion conditions as those in the preparation of the yellow mill base and a black mill base was obtained.

EXAMPLES AND COMPARATIVE EXAMPLES

Preparation Method of Ink Composition

Each ink composition was obtained by mixing and stirring the materials listed in Table 1 to Table 8. The figures in the tables represent a blending amount (parts by mass) of each component. In addition, the "monofunctional radical polymerizable compound" used in the present invention is referred to as the "monofunctional monomer" in the tables.

Each component listed in Table 1 to Table 8 is as follows.
NVC: N-vinyl caprolactam (VCAP trade name, manufactured by ISP)
NVF: N-vinyl formamide
CTFA: cyclic trimethylolpropane formal acrylate (SR-531 trade name, manufactured by Sartomer Company)
PEA: phenoxy ethyl acrylate (SR-339 trade name, manufactured by Sartomer Company)
FA-512: dicyclopentanyloxyethyl acrylate (FA-512A product name, manufactured by Hitachi Chemical Co., Ltd.)
THFA: tetrahydrofurfuryl acrylate (SR285, manufactured by Sartomer Company)
TMPTA: trimethylolpropane triacrylate (SR351S, manufactured by Sartomer Company)
EOTMPTA: ethoxylated (3) trimethylolpropane triacrylate (SR454, manufactured by Sartomer Company)
DPGDA: dipropylene glycol diacrylate (SR508 trade name, manufactured by Sartomer Company)
SR-833: tricyclodecane dimethanol diacrylate (manufactured by Sartomer Company)
NPGPODA: propoxylated (2) neopentyl glycol diacrylate (SR9003 trade name, manufactured by Sartomer Company)
DVE-3: the following structure (RapicureDVE trade name)
IBOA: isobornyl acrylate (manufactured by Sartomer Company)

[Chem. 25]

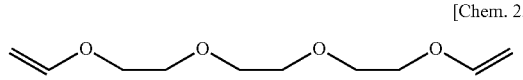

HDDA: 1,6-hexanediol diacrylate (SF238F, manufactured by Sartomer Company)
DPHA: dipentaerythritol hexaacrylate (KAYARAD DPHA, manufactured by Nippon Kayaku Co., Ltd.)

CN964A85 (urethane acrylate oligomer, an average number of functional groups is 2, manufactured by Sartomer Company)

CN962 (urethane acrylate oligomer, an average number of functional groups is 2, manufactured by Sartomer Company)

IRG369; 2-benzyl-2-dimethylamino-1-(4-morpholinophenyl)-butan-1-one (IRGACURE 369, manufactured by BASF Japan Ltd.)

IRG184; 1-hydroxy-cyclohexyl-phenyl ketone (IRGACURE 184, manufactured by BASF Japan Ltd.)

IRG819; bis(2,4,6-trimethylbenzoyl)phenylphosphine oxide (IRGACURE 819, manufactured by BASF Japan Ltd.)

TPO; 2,4,6-trimethylbenzoyl diphenylphosphine oxide (Darocur TPO, manufactured by BASF Japan Ltd.)

ITX: isopropyl thioxanthone (Firstcure ITX, manufactured by BASF Japan Ltd.)

UV-12: (FLORSTAB UV-12, manufactured by KromaChem, Ltd.)

TINUVIN770DF: (manufactured by BASF Japan Ltd.)

MEHQ (4-methoxyphenol)

KF-353: surfactant (modified silicone oil, manufactured by Shin-Etsu Chemical Co., Ltd.)

TEGORAD2500: surfactant (manufactured by Evonik Degussa GmbH)

TEGORAD2100: surfactant (manufactured by Evonik Degussa GmbH)

<Ink Jet Recording Method>

The ink composition obtained was ejected on a sheet of coated paper (OK-TOP), irradiated by being passed under the light of ultraviolet light emitting diode (UV-LED), the ink was cured, and the printed material was obtained. In the present examples, an ink jet recording device having a piezo type ink jet head Q-class Sapphire QS-256/10 (manufactured by FUJIFILM DIMATIX, Inc, the number of nozzles is 256, the volume of droplet is 10 pL, 50 kHz, ink-affinity process: silicon oxide) was used to discharge the color ink and NC4U134 manufactured by Nichia Corporation was used as the light emitting diode (UV-LED) for curing. The LED outputs ultraviolet light with the wavelength of 385 nm from one chip.

In addition, in order to overlap the clear ink layer on top of the color layer, the head and the LED light source were separated and used so that the upstream side was to form the color layer and the downstream side was to form the clear ink layer with respect to the direction of the substrate being sent, as shown in FIG. 6. The color layer was exposed by fixing the intensity of light on the substrate surface at 0.8 W/cm$^2$ immediately after landing, and by setting the exposure amount when one lamp passes through the upper part at 10 mJ/cm$^2$ by varying the transporting speed. Furthermore, in the present embodiment, the color layer was exposed after approximately 0.5 seconds from landing. Regarding the clear ink layer, the light source of 32B-2 was not actually lit and the clear ink layer was cured with light source of 34 alone. The clear layer was exposed by fixing the intensity of light on the substrate surface at 1,200 W/cm$^2$ and by setting the exposure amount when one lamp passes through the upper part at 30 mJ/cm$^2$ by varying the transporting speed.

The following evaluations were performed on the images obtained.

<Evaluation of Blocking Resistance>

100 sheets of coated paper of the same size as the printed image (OK-TOP: 128 g/m$^2$) were stacked on the printing surface and placed in a container with high humidity of 30% and high temperature of 40 degrees for 16 hours. Then, evaluation of the printing surface was performed. Blocking resistance of the image of the color layer alone (blocking resistance without the clear layer), and the image of the clear ink layer overlapped on top of the color layer (blocking resistance with the clear layer) were both evaluated.

A: There were no ink transfer marks on the printing surface.

B: There was a very slight trace of transfer of white background on coated paper stacked on the printing surface, however, it was a level that there was no problem in practical use.

C: There was a trace of transfer of white background on coated paper stacked on the printing surface and it was a level that there might be problems in practical use.

The inventors examined the results and found that a blocking property tends to be inferior when the clear layer is present. In the present embodiment, satisfactory blocking resistance was shown even for an image where the clear ink layer is overlapped on top of the color layer.

<Evaluation of Glossiness>

Glossiness was evaluated using a Tri glossmeter manufactured by BYK-Chemie GmbH. Drawing was carried out by forming two layers per one pass so that the clear ink layer was overlapped with regard to the undercoat of the color layer of 9 colors made of Y, M, C, K, R, B, 3CG (3 color gray made of YMC), 4CG (4 color gray made of YMCK). Drawing conditions of the color layer was resolution: 600×400 dpi, the number of paths: 8 path, printing mode: bi-direction. In addition, a discharge amount of ink in the ink layer was 30 picoliters and a discharge amount of ink in the clear ink layer was 50 picoliters. Also, conditions were appropriately adjusted so that the target amount of ink was discharged to all the lattices separated by a resolution. Glossiness was evaluated by averaging the gloss values of the clear ink layer on top of each 9 color.

A: Measuring value of 60 degrees gloss was 90 or more and it was a level that there was no problem in practical use.

B: Measuring value of 60 degrees gloss was 75 or more and it was a level that there was no problem in practical use.

C: Measuring value of 60 degrees gloss was less than 75 and it was a level that there might be problems in practical use.

<Evaluation of Surface Condition>

The sample of which glossiness was measured above was wound around a stick of 10 cm in diameter, and the reflection of fluorescent light (image clarity) was evaluated visually.

A: Fluorescent light was clearly reflected and ideally smooth surface of the sample was obtained.

B: The edges of fluorescent light looked slightly blurred, however, fluorescent light was reflected and it was a level that there was no problem in practical use.

C: Reflection of fluorescent light looked blurred, the surface of the sample was rough and it was a level that there might be problems in practical use.

<Evaluation of Color>

The image quality was evaluated by a sensory evaluation by deciding the overall color changes in the manner shown below.

Regarding evaluation of the color changes, same images were drawn twice at an interval of 20 minutes and it was visually confirmed whether there were color changes or not.

A: No color changes were observed.

B: Slight color changes were observed, however, it was a level that there was no problem in practical use.

C: Color changes were observed and it was a level that there might be slight problems in practical use.

D: Color changes were evident and it was a level that there are clear problems in practical use.

TABLE 1

| | | Examples | | | | | | | | | | | |
|---|---|---|---|---|---|---|---|---|---|---|---|---|---|
| | | Ink Set 1 | | | | | Ink Set 2 | | | | | | |
| | | Y | M | C | K | CL | Y | M | C | K | Lm | Lc | CL |
| Component List | | | | | | | | | | | | | |
| Mill Base | Yellow Mill Base | 8.00 | — | — | — | — | 8.00 | — | — | — | — | — | — |
| | Magenta Mill Base | — | 13.00 | — | — | — | — | 13.00 | — | — | 4.00 | — | — |
| | Cyan Mill Base | — | — | 8.00 | — | — | — | — | 8.00 | — | — | 2.00 | — |
| | Black Mill Base | — | — | — | 8.00 | — | — | — | — | 8.00 | — | — | — |
| Monomer | NVC | 13.00 | 13.00 | 13.00 | 13.00 | 10.00 | 23.00 | 23.00 | 23.00 | 23.00 | 23.00 | 23.00 | — |
| | NVF | 10.00 | 10.00 | 10.00 | 10.00 | — | — | — | — | — | — | — | — |
| | CTFA | 32.00 | 32.00 | 32.00 | 31.50 | — | 30.00 | 30.00 | 30.00 | 30.00 | 33.70 | 33.70 | — |
| | PEA | 13.00 | 10.00 | 14.00 | 12.00 | — | 9.00 | 4.00 | 9.00 | 8.50 | 13.50 | 13.50 | 11.95 |
| | FA-512 | 5.00 | 5.00 | 5.00 | 5.50 | — | 7.00 | 7.00 | 7.00 | 7.00 | 5.00 | 5.00 | — |
| | THFA | — | — | — | — | 14.00 | — | — | — | — | — | — | — |
| | IBOA | — | — | — | — | — | — | — | — | — | — | — | — |
| | TMPTA | 5.00 | 5.00 | 5.00 | 5.00 | — | 5.00 | 5.00 | 5.00 | 5.00 | 7.00 | 7.00 | — |
| | EOTMPTA | — | — | — | — | — | — | — | — | — | — | — | — |
| | DPGDA | — | — | — | — | 47.85 | — | — | — | — | — | — | 47.00 |
| | SR-833 | — | — | — | — | 10.00 | — | — | — | — | — | — | 20.00 |
| | NPGPODA | — | — | — | — | — | — | — | — | — | — | — | — |
| | DVE-3 | — | — | — | — | — | — | — | — | — | — | — | — |
| | HDDA | 3.00 | 3.00 | 3.00 | 3.00 | — | 3.00 | 3.00 | 3.00 | 3.00 | 5.00 | 5.00 | — |
| | DPHA | — | — | — | — | — | — | — | — | — | — | — | 5.00 |
| Oligomer | CN964A85 | — | — | — | — | 3.00 | 3.00 | 3.00 | 3.00 | 3.00 | 3.00 | 5.00 | — |
| | CN962 | 3.00 | 3.00 | 3.00 | 3.00 | — | — | — | — | — | — | — | — |
| Initiator | IRG369 | 2.00 | 1.50 | 2.00 | 2.00 | — | — | — | — | — | — | — | — |
| | IRG184 | — | — | — | — | — | — | — | — | — | — | — | — |
| | IRG819 | 2.00 | 1.50 | 2.00 | 3.00 | — | 6.00 | 6.00 | 6.00 | 6.50 | 3.00 | 3.00 | — |
| | TPO | — | — | — | — | 14.00 | 2.00 | 2.00 | 2.00 | 2.00 | 1.00 | 1.00 | 14.00 |
| | ITX | 3.00 | 2.00 | 2.00 | 3.00 | 0.05 | 3.00 | 3.00 | 3.00 | 3.00 | 0.80 | 0.80 | 0.05 |
| Additive | UV-12 | 1.00 | 1.00 | 1.00 | 1.00 | — | 1.00 | 1.00 | 1.00 | 1.00 | 1.00 | 1.00 | 1.00 |
| | MEHQ | — | — | — | — | — | — | — | — | — | — | — | — |
| | TINUVIN770DF | — | — | — | — | 0.10 | — | — | — | — | — | — | — |
| Surfactant | KF-353 | — | — | — | — | — | — | — | — | — | — | — | — |
| | TEGORAD 2500 | — | — | — | — | — | — | — | — | — | — | — | 1.00 |
| | TEGORAD 2100 | — | — | — | — | 1.00 | — | — | — | — | — | — | — |
| | Sum [Mass] | 100 | 100 | 100 | 100 | 100 | 100 | 100 | 100 | 100 | 100 | 100 | 100 |
| | Surface Tension [mN/m] | 38.0 | 37.0 | 38.0 | 38.0 | 38.0 | 38.0 | 36.0 | 37.0 | 37.0 | 37.0 | 37.0 | 38.0 |
| | Sum of Monofunctional Monomers [Mass] | 73.00 | 70.00 | 74.00 | 72.00 | 24.00 | 69.00 | 64.00 | 69.00 | 68.50 | 75.20 | 75.20 | 11.95 |
| | Sum of Initiators [Mass] | 7.00 | 5.00 | 6.00 | 8.00 | 14.05 | 11.00 | 11.00 | 11.00 | 11.50 | 4.80 | 4.80 | 14.05 |
| | Ratio of the Amount of the Initiator of Each Color and the Amount of the Initiator of the Clear Ink | 0.50 | 0.36 | 0.57 | 0.57 | — | 0.78 | 0.78 | 0.78 | 0.82 | 0.34 | 0.34 | — |
| Evaluation Results | | | | | | | | | | | | | |
| Blocking Resistance of Each Color (Without Clear Layer) | | A | A | A | B | | A | A | A | B | | | |
| Blocking Resistance of Each Color (With Clear Layer) | | A | A | A | A | | A | A | B | B | | | |
| Glossiness of Each Color | | A | A | A | A | | A | A | B | B | | | |
| Surface Condition of Each Color | | A | A | A | A | | A | A | A | B | | | |
| Color Change of Each Color | | B | B | B | B | | A | A | A | A | | | |

TABLE 2

| | | Examples | | | | | | |
|---|---|---|---|---|---|---|---|---|
| | | Ink Set 3 | | | | | | |
| | | Y | M | C | K | Lm | Lc | CL |
| Component List | | | | | | | | |
| Mill Base | Yellow Mill Base | 8.00 | — | — | — | — | — | — |
| | Magenta Mill Base | — | 13.00 | — | — | 4.00 | — | — |
| | Cyan Mill Base | — | — | 8.00 | — | — | 2.00 | — |
| | Black Mill Base | — | — | — | 8.00 | — | — | — |
| Monomer | NVC | 23.00 | 23.00 | 23.00 | 23.00 | 23.00 | 23.00 | — |
| | NVF | — | — | — | — | — | — | — |
| | CTFA | 40.00 | 40.00 | 40.00 | 40.00 | 45.00 | 45.00 | — |
| | PEA | — | — | — | — | — | — | — |
| | FA-512 | 8.00 | 5.00 | 9.00 | 7.00 | 6.20 | 6.20 | — |

TABLE 2-continued

|  |  |  |  |  |  |  |  |
|---|---|---|---|---|---|---|---|
|  | THFA | — | — | — | — | — | — | — |
|  | IBOA | — | — | — | — | — | — | — |
|  | TMPTA | 5.00 | 5.00 | 5.00 | 5.00 | 7.00 | 7.00 | — |
|  | EOTMPTA | — | — | — | — | — | — | — |
|  | DPGDA | — | — | — | — | — | — | 47.00 |
|  | SR-833 | — | — | — | — | — | — | 21.00 |
|  | NPGPODA | — | — | — | — | — | — | 16.00 |
|  | DVE-3 | — | — | — | — | — | — | — |
|  | HDDA | 3.00 | 3.00 | 3.00 | 3.00 | 5.00 | 5.00 | — |
|  | DPHA | — | — | — | — | — | — | — |
| Oligomer | CN964A85 | 3.00 | 3.00 | 3.00 | 3.00 | 3.00 | 5.00 | — |
|  | CN962 | — | — | — | — | — | — | — |
| Initiator | IRG369 | — | — | — | — | — | — | — |
|  | IRG184 | — | — | — | — | — | — | — |
|  | IRG819 | 4.00 | 3.00 | 4.00 | 5.00 | 3.00 | 3.00 | — |
|  | TPO | 2.00 | 2.00 | 2.00 | 2.00 | 2.00 | 2.00 | 14.00 |
|  | ITX | 3.00 | 2.00 | 2.00 | 3.00 | 0.80 | 0.80 | 0.00 |
| Additive | UV-12 | 1.00 | 1.00 | 1.00 | 1.00 | 1.00 | 1.00 | 1.00 |
|  | MEHQ | — | — | — | — | — | — | — |
|  | TINUVIN770DF | — | — | — | — | — | — | — |
| Surfactant | KF-353 | — | — | — | — | — | — | — |
|  | TEGORAD 2500 | — | — | — | — | — | — | — |
|  | TEGORAD 2100 | — | — | — | — | — | — | 1.00 |
|  | Sum [Mass] | 100 | 100 | 100 | 100 | 100 | 100 | 100 |
|  | Surface Tension [mN/m] | 36.3 | 35.0 | 35.0 | 35.9 | 36.1 | 36.0 | 35.6 |
|  | Sum of Monofunctional Monomers [Mass] | 71.00 | 68.00 | 72.00 | 70.00 | 74.20 | 74.20 | — |
|  | Sum of Initiators [Mass] | 9.00 | 7.00 | 8.00 | 10.00 | 5.80 | 5.80 | 14.00 |
|  | Ratio of the Amount of the Initiator of Each Color and the Amount of the Initiator of the Clear Ink | 0.64 | 0.50 | 0.57 | 0.71 | 0.41 | 0.41 | — |
|  | Evaluation Results |  |  |  |  |  |  |  |
|  | Blocking Resistance of Each Color (Without Clear Layer) | A | A | A | A |  |  |  |
|  | Blocking Resistance of Each Color (With Clear Layer) | A | B | B | B |  |  |  |
|  | Glossiness of Each Color | A | A | A | A |  |  |  |
|  | Surface Condition of Each Color | A | A | A | A |  |  |  |
|  | Color Change of Each Color | A | A | A | A |  |  |  |

|  |  | Examples Ink Set 4 | | | | | | |
|---|---|---|---|---|---|---|---|---|
|  |  | Y | M | C | K | Lm | Lc | CL |
|  | Component List |  |  |  |  |  |  |  |
| Mill Base | Yellow Mill Base | 8.00 | — | — | — | — | — | — |
|  | Magenta Mill Base | — | 13.00 | — | — | 4.00 | — | — |
|  | Cyan Mill Base | — | — | 8.00 | — | — | 2.00 | — |
|  | Black Mill Base | — | — | — | 8.00 | — | — | — |
| Monomer | NVC | 23.00 | 23.00 | 23.00 | 23.00 | 23.00 | 23.00 | — |
|  | NVF | — | — | — | — | — | — | — |
|  | CTFA | 40.00 | 40.00 | 40.00 | 40.00 | 45.00 | 45.00 | — |
|  | PEA | — | — | — | — | — | — | — |
|  | FA-512 | 8.00 | 5.00 | 9.00 | 7.00 | 6.20 | 6.20 | — |
|  | THFA | — | — | — | — | — | — | — |
|  | IBOA | — | — | — | — | — | — | — |
|  | TMPTA | 5.00 | 5.00 | 5.00 | 5.00 | 7.00 | 7.00 | — |
|  | EOTMPTA | — | — | — | — | — | — | — |
|  | DPGDA | — | — | — | — | — | — | 47.00 |
|  | SR-833 | — | — | — | — | — | — | 20.00 |
|  | NPGPODA | — | — | — | — | — | — | 16.95 |
|  | DVE-3 | — | — | — | — | — | — | — |
|  | HDDA | 3.00 | 3.00 | 3.00 | 3.00 | 5.00 | 5.00 | — |
|  | DPHA | — | — | — | — | — | — | — |
| Oligomer | CN964A85 | 3.00 | 3.00 | 3.00 | 3.00 | 3.00 | 5.00 | — |
|  | CN962 | — | — | — | — | — | — | — |
| Initiator | IRG369 | — | — | — | — | — | — | — |
|  | IRG184 | — | — | — | — | — | — | — |
|  | IRG819 | 4.00 | 3.00 | 4.00 | 5.00 | 3.00 | 3.00 | — |
|  | TPO | 2.00 | 2.00 | 2.00 | 2.00 | 2.00 | 2.00 | 14.00 |
|  | ITX | 3.00 | 2.00 | 2.00 | 3.00 | 0.80 | 0.80 | 0.05 |
| Additive | UV-12 | 1.00 | 1.00 | 1.00 | 1.00 | 1.00 | 1.00 | 1.00 |
|  | MEHQ | — | — | — | — | — | — | — |
|  | TINUVIN770DF | — | — | — | — | — | — | — |

TABLE 2-continued

| Surfactant | KF-353 | — | — | — | — | — | — | — |
|---|---|---|---|---|---|---|---|---|
| | TEGORAD 2500 | — | — | — | — | — | — | — |
| | TEGORAD 2100 | — | — | — | — | — | — | 1.00 |
| | Sum [Mass] | 100 | 100 | 100 | 100 | 100 | 100 | 100 |
| | Surface Tension [mN/m] | 36.3 | 35.0 | 35.0 | 35.9 | 36.1 | 36.0 | 35.6 |
| | Sum of Monofunctional Monomers [Mass] | 71.00 | 68.00 | 72.00 | 70.00 | 74.20 | 74.20 | — |
| | Sum of Initiators [Mass] | 9.00 | 7.00 | 8.00 | 10.00 | 5.80 | 5.80 | 14.05 |
| | Ratio of the Amount of the Initiator of Each Color and the Amount of the Initiator of the Clear Ink | 0.64 | 0.50 | 0.57 | 0.71 | 0.41 | 0.41 | — |
| Evaluation Results | | | | | | | | |
| Blocking Resistance of Each Color (Without Clear Layer) | | A | A | A | A | | | |
| Blocking Resistance of Each Color (With Clear Layer) | | A | B | B | B | | | |
| Glossiness of Each Color | | A | A | A | A | | | |
| Surface Condition of Each Color | | A | A | A | A | | | |
| Color Change of Each Color | | A | A | A | A | | | |

TABLE 3

| | | Examples Ink Set 5 | | | | | | |
|---|---|---|---|---|---|---|---|---|
| | | Y | M | C | K | Lm | Lc | CL |
| Component List | | | | | | | | |
| Mill Base | Yellow Mill Base | 8.00 | — | — | — | — | — | — |
| | Magenta Mill Base | — | 13.00 | — | — | 4.00 | — | — |
| | Cyan Mill Base | — | — | 8.00 | — | — | 2.00 | — |
| | Black Mill Base | — | — | — | 8.00 | — | — | — |
| Monomer | NVC | 27.00 | 22.50 | 27.00 | 26.00 | 31.20 | 31.20 | — |
| | NVF | — | — | — | — | — | — | — |
| | CTFA | 49.00 | 48.00 | 48.50 | 49.00 | 49.80 | 49.80 | — |
| | PEA | — | — | — | — | — | — | — |
| | FA-512 | — | — | — | — | — | — | — |
| | THFA | — | — | — | — | — | — | — |
| | IBOA | — | — | — | — | — | — | — |
| | TMPTA | — | — | — | — | — | — | — |
| | EOTMPTA | 3.00 | 3.00 | 3.00 | 3.00 | 5.00 | 5.00 | — |
| | DPGDA | — | — | — | — | — | — | 47.85 |
| | SR-833 | — | — | — | — | — | — | 20.00 |
| | NPGPODA | — | — | — | — | — | — | — |
| | DVE-3 | — | — | — | — | — | — | 14.00 |
| | HDDA | — | — | — | — | — | — | — |
| | DPHA | — | — | — | — | — | — | — |
| Oligomer | CN964A85 | 3.00 | 3.00 | 3.00 | 3.00 | 3.00 | 5.00 | 3.00 |
| | CN962 | — | — | — | — | — | — | — |
| Initiator | IRG369 | — | — | — | — | — | — | — |
| | IRG184 | — | — | — | — | — | — | — |
| | IRG819 | 4.00 | 4.00 | 4.00 | 5.00 | 3.00 | 3.00 | — |
| | TPO | 2.00 | 3.00 | 3.00 | 2.00 | 2.00 | 2.00 | 14.00 |
| | ITX | 3.00 | 2.50 | 2.50 | 3.00 | 1.00 | 1.00 | 0.05 |
| Additive | UV-12 | 1.00 | 1.00 | 1.00 | 1.00 | 1.00 | 1.00 | — |
| | MEHQ | — | — | — | — | — | — | — |
| | TINUVIN770DF | — | — | — | — | — | — | 0.10 |
| Surfactant | KF-353 | — | — | — | — | — | — | — |
| | TEGORAD 2500 | — | — | — | — | — | — | — |
| | TEGORAD 2100 | — | — | — | — | — | — | 1.00 |
| | Sum [Mass] | 100 | 100 | 100 | 100 | 100 | 100 | 100 |
| | Surface Tension [mN/m] | 36.0 | 35.0 | 35.0 | 35.0 | 37.0 | 35.0 | 24.0 |
| | Sum of Monofunctional Monomers [Mass] | 76.00 | 70.50 | 75.50 | 75.00 | 81.00 | 81.00 | — |
| | Sum of Initiators [Mass] | 9.00 | 9.50 | 9.50 | 10.00 | 6.00 | 6.00 | 14.05 |
| | Ratio of the Amount of the Initiator of Each Color and the Amount of the Initiator of the Clear Ink | 0.64 | 0.68 | 0.68 | 0.71 | 0.43 | 0.43 | — |
| Evaluation Results | | | | | | | | |
| Blocking Resistance of Each Color (Without Clear Layer) | | A | A | A | A | | | |

TABLE 3-continued

| | | | | | |
|---|---|---|---|---|---|
| Blocking Resistance of Each Color (With Clear Layer) | A | A | A | A |
| Glossiness of Each Color | A | A | A | A |
| Surface Condition of Each Color | A | A | A | A |
| Color Change of Each Color | A | A | A | A |

| | | Examples Ink Set 6 | | | | | | |
|---|---|---|---|---|---|---|---|---|
| | | Y | M | C | K | Lm | Lc | CL |
| Component List | | | | | | | | |
| Mill Base | Yellow Mill Base | 8.00 | — | — | — | — | — | — |
| | Magenta Mill Base | — | 13.00 | — | — | 4.00 | — | — |
| | Cyan Mill Base | — | — | 8.00 | — | — | 2.00 | — |
| | Black Mill Base | — | — | — | 8.00 | — | — | — |
| Monomer | NVC | 23.00 | 23.00 | 23.00 | 23.00 | 23.00 | 23.00 | — |
| | NVF | — | — | — | — | — | — | — |
| | CTFA | 45.00 | 42.50 | 43.50 | 45.00 | 49.80 | 49.80 | — |
| | PEA | — | — | — | — | — | — | — |
| | FA-512 | — | — | — | — | — | — | — |
| | THFA | — | — | — | — | — | — | — |
| | IBOA | — | — | — | — | — | — | — |
| | TMPTA | — | — | — | — | — | — | — |
| | EOTMPTA | 3.00 | 3.00 | 3.00 | 3.00 | 5.00 | 5.00 | — |
| | DPGDA | — | — | — | — | — | — | 39.85 |
| | SR-833 | — | — | — | — | — | — | 30.00 |
| | NPGPODA | — | — | — | — | — | — | — |
| | DVE-3 | — | — | — | — | — | — | 14.00 |
| | HDDA | 8.00 | 5.00 | 9.00 | 7.00 | 8.20 | 8.20 | — |
| | DPHA | — | — | — | — | — | — | — |
| Oligomer | CN964A85 | 3.00 | 3.00 | 3.00 | 3.00 | 3.00 | 5.00 | 1.00 |
| | CN962 | — | — | — | — | — | — | — |
| Initiator | IRG369 | — | — | — | — | — | — | — |
| | IRG184 | — | — | — | — | — | — | — |
| | IRG819 | 4.00 | 4.00 | 4.00 | 5.00 | 3.00 | 3.00 | — |
| | TPO | 2.00 | 3.00 | 3.00 | 2.00 | 2.00 | 2.00 | 14.00 |
| | ITX | 3.00 | 2.50 | 2.50 | 3.00 | 1.00 | 1.00 | 0.05 |
| Additive | UV-12 | 1.00 | 1.00 | 1.00 | 1.00 | 1.00 | 1.00 | — |
| | MEHQ | — | — | — | — | — | — | — |
| | TINUVIN770DF | — | — | — | — | — | — | 0.10 |
| Surfactant | KF-353 | — | — | — | — | — | — | — |
| | TEGORAD 2500 | — | — | — | — | — | — | — |
| | TEGORAD 2100 | — | — | — | — | — | — | 1.00 |
| | Sum [Mass] | 100 | 100 | 100 | 100 | 100 | 100 | 100 |
| Surface Tension [mN/m] | | 36.0 | 35.0 | 35.0 | 35.0 | 37.0 | 35.0 | 24.0 |
| Sum of Monofunctional Monomers [Mass] | | 68.00 | 65.50 | 66.50 | 68.00 | 72.82 | 72.80 | — |
| Sum of Initiators [Mass] | | 9.00 | 9.50 | 9.50 | 10.00 | 6.00 | 6.00 | 14.05 |
| Ratio of the Amount of the Initiator of Each Color and the Amount of the Initiator of the Clear Ink | | 0.64 | 0.68 | 0.68 | 0.71 | 0.43 | 0.43 | — |
| Evaluation Results | | | | | | | | |
| Blocking Resistance of Each Color (Without Clear Layer) | | A | A | A | A | | | |
| Blocking Resistance of Each Color (With Clear Layer) | | A | A | A | A | | | |
| Glossiness of Each Color | | A | A | A | A | | | |
| Surface Condition of Each Color | | A | A | A | A | | | |
| Color Change of Each Color | | A | A | A | A | | | |

TABLE 4

| | | Examples Ink Set 7 | | | | | | |
|---|---|---|---|---|---|---|---|---|
| | | Y | M | C | K | Lm | Lc | CL |
| Component List | | | | | | | | |
| Mill Base | Yellow Mill Base | 8.00 | — | — | — | — | — | — |
| | Magenta Mill Base | — | 13.00 | — | — | 4.00 | — | — |
| | Cyan Mill Base | — | — | 8.00 | — | — | 2.00 | — |
| | Black Mill Base | — | — | — | 8.00 | — | — | — |

TABLE 4-continued

|  |  |  |  |  |  |  |  |  |
|---|---|---|---|---|---|---|---|---|
| Monomer | NVC | 23.00 | 23.00 | 23.00 | 23.00 | 23.00 | 23.00 | — |
|  | NVF | — | — | — | — | — | — | — |
|  | CTFA | 45.00 | 42.50 | 43.50 | 45.00 | 49.80 | 49.80 | — |
|  | PEA | — | — | — | — | — | — | — |
|  | FA-512 | — | — | — | — | — | — | — |
|  | THFA | — | — | — | — | — | — | — |
|  | IBOA | — | — | — | — | — | — | — |
|  | TMPTA | 3.00 | 3.00 | 3.00 | 3.00 | 5.00 | 5.00 | — |
|  | EOTMPTA | — | — | — | — | — | — | — |
|  | DPGDA | — | — | — | — | — | — | 47.85 |
|  | SR-833 | — | — | — | — | — | — | 20.00 |
|  | NPGPODA | — | — | — | — | — | — | — |
|  | DVE-3 | — | — | — | — | — | — | 14.00 |
|  | HDDA | 8.00 | 5.00 | 9.00 | 7.00 | 8.20 | 8.20 | — |
|  | DPHA | — | — | — | — | — | — | — |
| Oligomer | CN964A85 | 3.00 | 3.00 | 3.00 | 3.00 | 3.00 | 5.00 | 3.00 |
|  | CN962 | — | — | — | — | — | — | — |
| Initiator | IRG369 | — | — | — | — | — | — | — |
|  | IRG184 | — | — | — | — | — | — | — |
|  | IRG819 | 4.00 | 4.00 | 4.00 | 5.00 | 3.00 | 3.00 | — |
|  | TPO | 2.00 | 3.00 | 3.00 | 2.00 | 2.00 | 2.00 | 14.00 |
|  | ITX | 3.00 | 2.50 | 2.50 | 3.00 | 1.00 | 1.00 | 0.05 |
| Additive | UV-12 | 1.00 | 1.00 | 1.00 | 1.00 | 1.00 | 1.00 | — |
|  | MEHQ | — | — | — | — | — | — | — |
|  | TINUVIN770DF | — | — | — | — | — | — | 0.10 |
| Surfactant | KF-353 | — | — | — | — | — | — | — |
|  | TEGORAD 2500 | — | — | — | — | — | — | 1.00 |
|  | TEGORAD 2100 | — | — | — | — | — | — | — |
|  | Sum [Mass] | 100 | 100 | 100 | 100 | 100 | 100 | 100 |
|  | Surface Tension [mN/m] | 37.0 | 35.9 | 36.2 | 36.2 | 36.0 | 36.3 | 24.0 |
|  | Sum of Monofunctional Monomers [Mass] | 68.00 | 65.50 | 66.50 | 68.00 | 72.80 | 72.80 | — |
|  | Sum of Initiators [Mass] | 9.00 | 9.50 | 9.50 | 10.00 | 6.00 | 6.00 | 14.05 |
|  | Ratio of the Amount of the Initiator of Each Color and the Amount of the Initiator of the Clear Ink | 0.64 | 0.68 | 0.68 | 0.71 | 0.43 | 0.43 | — |
|  | Evaluation Results |  |  |  |  |  |  |  |
|  | Blocking Resistance of Each Color (Without Clear Layer) | A | A | A | A |  |  |  |
|  | Blocking Resistance of Each Color (With Clear Layer) | A | A | A | A |  |  |  |
|  | Glossiness of Each Color | A | A | B | B |  |  |  |
|  | Surface Condition of Each Color | A | A | A | B |  |  |  |
|  | Color Change of Each Color | A | A | A | A |  |  |  |

|  |  | Examples Ink Set 8 | | | | | | |
|---|---|---|---|---|---|---|---|---|
|  |  | Y | M | C | K | Lm | Lc | CL |
| Component List |  |  |  |  |  |  |  |  |
| Mill Base | Yellow Mill Base | 8.00 | — | — | — | — | — | — |
|  | Magenta Mill Base | — | 13.00 | — | — | 4.00 | — | — |
|  | Cyan Mill Base | — | — | 8.00 | — | — | 2.00 | — |
|  | Black Mill Base | — | — | — | 8.00 | — | — | — |
| Monomer | NVC | 23.00 | 23.00 | 23.00 | 23.00 | 23.00 | 23.00 | — |
|  | NVF | — | — | — | — | — | — | — |
|  | CTFA | 45.00 | 42.50 | 43.50 | 45.00 | 49.80 | 49.80 | — |
|  | PEA | — | — | — | — | — | — | — |
|  | FA-512 | — | — | — | — | — | — | — |
|  | THFA | — | — | — | — | — | — | — |
|  | IBOA | — | — | — | — | — | — | — |
|  | TMPTA | 3.00 | 3.00 | 3.00 | 3.00 | 5.00 | 5.00 | — |
|  | EOTMPTA | — | — | — | — | — | — | — |
|  | DPGDA | — | — | — | — | — | — | 47.85 |
|  | SR-833 | — | — | — | — | — | — | 20.00 |
|  | NPGPODA | — | — | — | — | — | — | — |
|  | DVE-3 | — | — | — | — | — | — | 14.00 |
|  | HDDA | 8.00 | 5.00 | 9.00 | 7.00 | 8.20 | 8.20 | — |
|  | DPHA | — | — | — | — | — | — | — |
| Oligomer | CN964A85 | 3.00 | 3.00 | 3.00 | 3.00 | 3.00 | 5.00 | 3.00 |
|  | CN962 | — | — | — | — | — | — | — |
| Initiator | IRG369 | — | — | — | — | — | — | — |
|  | IRG184 | — | — | — | — | — | — | — |
|  | IRG819 | 4.00 | 4.00 | 4.00 | 5.00 | 3.00 | 3.00 | — |
|  | TPO | 2.00 | 3.00 | 3.00 | 2.00 | 2.00 | 2.00 | 14.00 |
|  | ITX | 3.00 | 2.50 | 2.50 | 3.00 | 1.00 | 1.00 | 0.05 |

TABLE 4-continued

|  |  | Y | M | C | K | Lm | Lc | CL |
|---|---|---|---|---|---|---|---|---|
| Additive | UV-12 | 1.00 | 1.00 | 1.00 | 1.00 | 1.00 | 1.00 | — |
|  | MEHQ | — | — | — | — | — | — | — |
|  | TINUVIN770DF | — | — | — | — | — | — | 0.10 |
| Surfactant | KF-353 | — | — | — | — | — | — | 1.00 |
|  | TEGORAD 2500 | — | — | — | — | — | — | — |
|  | TEGORAD 2100 | — | — | — | — | — | — | — |
|  | Sum [Mass] | 100 | 100 | 100 | 100 | 100 | 100 | 100 |
|  | Surface Tension [mN/m] | 37.0 | 35.9 | 36.2 | 36.2 | 36.0 | 36.3 | 21.0 |
|  | Sum of Monofunctional Monomers [Mass] | 68.00 | 65.50 | 66.50 | 68.00 | 72.80 | 72.80 | — |
|  | Sum of Initiators [Mass] | 9.00 | 9.50 | 9.50 | 10.00 | 6.00 | 6.00 | 14.05 |
|  | Ratio of the Amount of the Initiator of Each Color and the Amount of the Initiator of the Clear Ink | 0.64 | 0.68 | 0.68 | 0.71 | 0.43 | 0.43 | — |
|  | Evaluation Results |  |  |  |  |  |  |  |
|  | Blocking Resistance of Each Color (Without Clear Layer) | A | A | A | A |  |  |  |
|  | Blocking Resistance of Each Color (With Clear Layer) | B | B | B | B |  |  |  |
|  | Glossiness of Each Color | A | A | B | B |  |  |  |
|  | Surface Condition of Each Color | A | A | A | B |  |  |  |
|  | Color Change of Each Color | A | A | A | A |  |  |  |

TABLE 5

|  |  | Example Ink Set 9 | | | | | | |
|---|---|---|---|---|---|---|---|---|
|  |  | Y | M | C | K | Lm | Lc | CL |
|  | Component List |  |  |  |  |  |  |  |
| Mill Base | Yellow Mill Base | 6.40 | — | — | — | — | — | — |
|  | Magenta Mill Base | — | 16.40 | — | — | 3.25 | — | — |
|  | Cyan Mill Base | — | — | 8.65 | — | — | 1.13 | — |
|  | Black Mill Base | — | — | — | 8.05 | — | — | — |
| Monomer | NVC | 22.50 | 24.00 | 24.00 | 23.00 | 24.00 | 24.00 | — |
|  | NVF | — | — | — | — | — | — | — |
|  | CTFA | 53.00 | 51.00 | 51.35 | 50.60 | 55.00 | 55.00 | — |
|  | PEA | — | — | — | — | — | — | — |
|  | FA-512 | — | — | — | — | — | — | — |
|  | THFA | — | — | — | — | — | — | — |
|  | IBOA | — | — | — | — | — | — | 14.00 |
|  | TMPTA | — | — | — | — | — | — | 5.00 |
|  | EOTMPTA | 3.50 | — | 2.90 | 2.80 | 4.05 | 6.17 | — |
|  | DPGDA | — | — | — | — | — | — | 44.00 |
|  | SR-833 | — | — | — | — | — | — | 20.00 |
|  | NPGPODA | — | — | — | — | — | — | — |
|  | DVE-3 | — | — | — | — | — | — | — |
|  | HDDA | — | — | — | — | — | — | — |
|  | DPHA | — | — | — | — | — | — | — |
| Oligomer | CN964A85 | 4.80 | — | 4.00 | 3.75 | 5.00 | 5.00 | — |
|  | CN962 | — | — | — | — | — | — | — |
| Initiator | IRG369 | — | — | — | — | — | — | — |
|  | IRG184 | — | — | — | — | 1.60 | 1.60 | — |
|  | IRG819 | 3.00 | 2.80 | 2.80 | 5.00 | 2.80 | 2.80 | — |
|  | TPO | 2.80 | 2.80 | 2.80 | 2.80 | 2.90 | 2.90 | 14.00 |
|  | ITX | 3.00 | 2.00 | 2.00 | 3.00 | 0.40 | 0.40 | — |
| Additive | UV-12 | 1.00 | 1.00 | 1.00 | 1.00 | 1.00 | 1.00 | 1.00 |
|  | MEHQ | — | — | 0.50 | — | — | — | 1.00 |
|  | TINUVIN770DF | — | — | — | — | — | — | — |
| Surfactant | KF-353 | — | — | — | — | — | — | — |
|  | TEGORAD 2500 | — | — | — | — | — | — | — |
|  | TEGORAD 2100 | — | — | — | — | — | — | 1.00 |
|  | Sum [Mass] | 100 | 100 | 100 | 100 | 100 | 100 | 100 |
|  | Surface Tension [mN/m] | 36.0 | 35.0 | 35.0 | 35.0 | 37.0 | 35.0 | 25.5 |
|  | Sum of Monofunctional Monomers [Mass] | 75.50 | 75.00 | 75.35 | 73.60 | 79.00 | 79.00 | — |

TABLE 5-continued

|  | Example Ink Set 9 | | | | | | |
| --- | --- | --- | --- | --- | --- | --- | --- |
|  | Y | M | C | K | Lm | Lc | CL |
| Sum of Initiators [Mass] | 8.80 | 7.60 | 7.60 | 10.80 | 7.70 | 7.70 | 14.00 |
| Ratio of the Amount of the Initiator of Each Color and the Amount of the Initiator of the Clear Ink | 0.63 | 0.54 | 0.54 | 0.77 | 0.55 | 0.55 | — |
| Evaluation Results | | | | | | | |
| Blocking Resistance of Each Color (Without Clear Layer) | A | A | A | A | | | |
| Blocking Resistance of Each Color (With Clear Layer) | A | A | A | A | | | |
| Glossiness of Each Color | A | A | A | A | | | |
| Surface Condition of Each Color | A | A | A | A | | | |
| Color Change of Each Color | A | A | A | A | | | |

TABLE 6

|  |  | Comparative Example Ink Set 1 | | | | |
| --- | --- | --- | --- | --- | --- | --- |
|  |  | Y | M | C | K | CL |
| Component List | | | | | | |
| Mill Base | Yellow Mill Base | 8.00 | — | — | — | — |
|  | Magenta Mill Base | — | 13.00 | — | — | — |
|  | Cyan Mill Base | — | — | 8.00 | — | — |
|  | Black Mill Base | — | — | — | 8.00 | — |
| Monomer | NVC | — | — | — | — | — |
|  | NVF | — | — | — | — | — |
|  | CTFA | 30.00 | 30.00 | 30.00 | 30.00 | — |
|  | PEA | 36.00 | 33.00 | 37.00 | 35.00 | — |
|  | FA-512 | 5.00 | 5.00 | 5.00 | 5.50 | — |
|  | TMPTA | 5.00 | 5.00 | 5.00 | 5.00 | — |
|  | EOTMPTA | — | — | — | — | — |
|  | DPGDA | — | — | — | — | 47.85 |
|  | SR-833 | — | — | — | — | 20.00 |
|  | HDDA | 3.00 | 3.00 | 3.00 | 3.00 | — |
|  | DVE-3 | — | — | — | — | 14.00 |
| Oligomer | CN964A85 | — | — | — | — | 3.00 |
|  | CN962 | 3.00 | 3.00 | 3.00 | 3.00 | — |
| Initiator | IRG369 | 2.00 | 2.00 | 2.00 | 1.50 | — |
|  | IRG819 | 4.00 | 3.00 | 4.00 | 5.00 | 2.00 |
|  | TPO | — | — | — | — | 12.00 |
|  | ITX | 3.00 | 2.00 | 2.00 | 3.00 | 0.05 |
| Additive | UV-12 | 1.00 | 1.00 | 1.00 | 1.00 | — |
|  | TINUVIN770DF | — | — | — | — | 0.10 |
| Surfactant | TEGORAD2100 | — | — | — | — | 1.00 |
|  | Sum [Mass] | 100 | 100 | 100 | 100 | 100 |
|  | Sum of Monofunctional Monomers [Mass] | 71.00 | 68.00 | 72.00 | 70.50 | — |
|  | Sum of Initiators [Mass] | 9.00 | 7.00 | 8.00 | 9.50 | 14.05 |
|  | Ratio of the Amount of the Initiator of Each Color and the Amount of the Initiator of the Clear Ink | 0.64 | 0.50 | 0.57 | 0.68 | — |
| Evaluation Results | | | | | | |
| Blocking Resistance of Each Color (With Clear Layer) | | C | C | C | C | |
| Glossiness of Each Color | | A | A | A | A | |
| Surface Condition of Each Color | | B | B | B | B | |
| Color Change of Each Color | | C | C | C | C | |

TABLE 7

| | | Comparative Examples | | | | | | | | | | | |
|---|---|---|---|---|---|---|---|---|---|---|---|---|
| | | Ink Set 2 | | | | | Ink Set 3 | | | | | | |
| | | Y | M | C | K | CL | Y | M | C | K | Lm | Lc | Cl |
| Component List | | | | | | | | | | | | | |
| Mill Base | Yellow Mill Base | 8.00 | — | — | — | — | 8.00 | — | — | — | — | — | — |
| | Magenta Mill Base | — | 13.00 | — | — | — | — | 13.00 | — | — | 4.00 | — | — |
| | Cyan Mill Base | — | — | 8.00 | — | — | — | — | 8.00 | — | — | 2.00 | — |
| | Black Mill Base | — | — | — | 8.00 | — | — | — | — | 8.00 | — | — | — |
| Monomer | NVC | 13.00 | 13.00 | 13.00 | 13.00 | — | 27.00 | 22.50 | 27.00 | 26.00 | 31.20 | 31.20 | — |
| | NVF | 10.00 | 10.00 | 10.00 | 10.00 | — | — | — | — | — | — | — | — |
| | CTFA | 28.00 | 27.00 | 28.00 | 28.00 | — | 49.00 | 48.00 | 48.50 | 49.00 | 49.80 | 49.80 | — |
| | PEA | 13.00 | 10.00 | 14.00 | 12.00 | — | — | — | — | — | — | — | — |
| | FA-512 | 5.00 | 5.00 | 5.00 | 5.50 | — | — | — | — | — | — | — | — |
| | TMPTA | 5.00 | 5.00 | 5.00 | 5.00 | — | — | — | — | — | — | — | — |
| | EOTMPTA | — | — | — | — | — | 3.00 | 3.00 | 3.00 | 3.00 | 5.00 | 5.00 | — |
| | DPGDA | — | — | — | — | 50.00 | — | — | — | — | — | — | 40.85 |
| | SR-833 | — | — | — | — | 22.85 | — | — | — | — | — | — | 16.00 |
| | HDDA | 3.00 | 3.00 | 3.00 | 3.00 | — | — | — | — | — | — | — | — |
| | DVE-3 | — | — | — | — | 14.00 | — | — | — | — | — | — | 14.00 |
| | CN964A85 | — | — | — | — | 3.00 | 3.00 | 3.00 | 3.00 | 3.00 | 3.00 | 5.00 | 1.00 |
| | CN962 | 3.00 | 3.00 | 3.00 | 3.00 | — | — | — | — | — | — | — | — |
| Oligomer | IRG369 | 2.00 | 2.00 | 2.00 | 1.50 | — | — | — | — | — | — | — | — |
| | IRG819 | 4.00 | 4.00 | 4.00 | 5.00 | — | 4.00 | 4.00 | 4.00 | 5.00 | 3.00 | 3.00 | — |
| | TPO | — | — | — | — | 9.00 | 2.00 | 3.00 | 3.00 | 2.00 | 2.00 | 2.00 | 14.00 |
| | ITX | 5.00 | 4.00 | 4.00 | 5.00 | 0.05 | 3.00 | 2.50 | 2.50 | 3.00 | 1.00 | 1.00 | 0.05 |
| Initiator | UV-12 | 1.00 | 1.00 | 1.00 | 1.00 | — | 1.00 | 1.00 | 1.00 | 1.00 | 1.00 | 1.00 | — |
| | TINUVIN770DF | — | — | — | — | 0.10 | — | — | — | — | — | — | 0.10 |
| Surfactant | TEGORAD 2100 | — | — | — | — | 1.00 | — | — | — | — | — | — | — |
| | Sum [Mass] | 100 | 100 | 100 | 100 | 100 | 100 | 100 | 100 | 100 | 100 | 100 | 100 |
| | Sum of Monofunctional Monomers [Mass] | 69.00 | 65.00 | 70.00 | 68.50 | — | 76.00 | 70.50 | 75.50 | 75.00 | 1.00 | 1.00 | — |
| | Sum of Initiators [Mass] | 11.00 | 10.00 | 10.00 | 11.50 | 9.05 | 9.00 | 9.50 | 9.50 | 10.00 | 1.00 | 1.00 | 14.05 |
| | Ratio of the Amount of the Initiator of Each Color and the Amount of the Initiator of the Clear Ink | 1.22 | 1.10 | 1.10 | 1.27 | — | 0.64 | 0.68 | 0.68 | 0.71 | 0.07 | 0.07 | — |
| Evaluation Results | | | | | | | | | | | | | |
| | Blocking Resistance of Each Color (With Clear Layer) | A | A | B | C | | C | C | C | C | | | |
| | Glossiness of Each Color | A | A | A | C | | A | A | A | A | | | |
| | Surface Condition of Each Color | C | C | C | C | | C | C | C | C | | | |
| | Color Change of Each Color | B | B | B | B | | C | C | C | C | | | |

TABLE 8

| | | Comparative Example Ink Set 4 | | | | | | |
|---|---|---|---|---|---|---|---|---|
| | | Y | M | C | K | Lm | Lc | CL |
| Component List | | | | | | | | |
| Mill Base | Yellow Mill Base | 8.00 | — | — | — | — | — | — |
| | Magenta Mill Base | — | 13.00 | — | — | 4.00 | — | — |
| | Cyan Mill Base | — | — | 8.00 | — | — | 2.00 | — |
| | Black Mill Base | — | — | — | 8.00 | — | — | — |
| Monomer | NVC | 27.00 | 22.50 | 27.00 | 26.00 | 31.20 | 31.20 | — |
| | NVF | — | — | — | — | — | — | — |
| | CTFA | 49.00 | 48.00 | 48.50 | 49.00 | 49.80 | 49.80 | — |
| | PEA | — | — | — | — | — | — | — |
| | FA-512 | — | — | — | — | — | — | — |
| | TMPTA | — | — | — | — | — | — | — |
| | EOTMPTA | 3.00 | 3.00 | 3.00 | 3.00 | 5.00 | 5.00 | — |
| | DPGDA | — | — | — | — | — | — | 40.85 |
| | SR-833 | — | — | — | — | — | — | 30.00 |
| | HDDA | — | — | — | — | — | — | — |
| | DVE-3 | — | — | — | — | — | — | 14.00 |
| Oligomer | CN964A85 | 3.00 | 3.00 | 3.00 | 3.00 | 3.00 | 5.00 | 1.00 |
| | CN962 | — | — | — | — | — | — | — |
| Initiator | IRG369 | — | — | — | — | — | — | — |
| | IRG819 | 4.00 | 4.00 | 4.00 | 5.00 | 3.00 | 3.00 | — |

TABLE 8-continued

|  |  | Comparative Example Ink Set 4 | | | | | | |
|---|---|---|---|---|---|---|---|---|
|  |  | Y | M | C | K | Lm | Lc | CL |
| Additive | TPO | 2.00 | 3.00 | 3.00 | 2.00 | 2.00 | 2.00 | 14.00 |
|  | ITX | 3.00 | 2.50 | 2.50 | 3.00 | 1.00 | 1.00 | 0.05 |
|  | UV-12 | 1.00 | 1.00 | 1.00 | 1.00 | 1.00 | 1.00 | — |
|  | TINUVIN770DF | — | — | — | — | — | — | 0.10 |
| Surfactant | TEGORAD 2100 | — | — | — | — | — | — | — |
|  | Sum [Mass] | 100 | 100 | 100 | 100 | 100 | 100 | 100 |
|  | Sum of Monofunctional Monomers [Mass] | 76.00 | 70.50 | 75.50 | 75.00 | 81.00 | 81.00 | — |
|  | Sum of Initiators [Mass] | 9.00 | 9.50 | 9.50 | 10.00 | 6.00 | 6.00 | 14.05 |
|  | Ratio of the Amount of the Initiator of Each Color and the Amount of the Initiator of the Clear Ink | 0.64 | 0.68 | 0.71 | 0.71 | 0.43 | 0.43 | — |
|  | Evaluation Results |  |  |  |  |  |  |  |
| Blocking Resistance of Each Color (Without Clear Layer) |  | A | A | B | C |  |  |  |
| Blocking Resistance of Each Color (With Clear Layer) |  | C | C | C | C |  |  |  |
| Glossiness of Each Color |  | A | A | A | A |  |  |  |
| Surface Condition of Each Color |  | C | C | C | C |  |  |  |
| Color Change of Each Color |  | A | A | A | A |  |  |  |

This application claims priority under 35 U.S.C. §119 of Japanese Patent application JP 2011-197566, filed on Sep. 9, 2011 and Japanese Patent application JP 2012-009628, filed on Jan. 20, 2012, the entire contents of which are hereby incorporated by reference.

What is claimed is:

1. An ink set for forming a multilayer comprising:
a group of coloring ink compositions which include a yellow ink composition, a magenta ink composition, a cyan ink composition and a black ink composition, and, a clear ink composition,
wherein each of the coloring ink compositions contain,
a (component A) radical polymerizable compound;
a (component B) radical polymerization initiator; and
a (component D) coloring agent,
a (component A-1) N-vinyl compound and a (component A-2) compound represented by Formula (a-2) as the component A,
the clear ink composition contains a (component $A^2$) radical polymerizable compound, a (component $B^2$) acylphosphine oxide-based radical polymerization initiator and a (component C) surfactant,
the relation of Formula (1) is satisfied when the content of the radical polymerization initiator in the clear ink composition is X and the content of the radical polymerization initiator included in the magenta ink composition is Y, and

[Chem. 1]

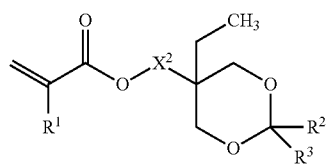

(a-2)

in Formula (a-2), $R^1$, $R^2$ and $R^3$, each independently, represent a hydrogen atom, a methyl group, or an ethyl group, $X^2$ represents a single bond or a divalent linking group

[Equation 1]

$$0.1 \leq \frac{Y}{X} < 1. \qquad (1)$$

2. The ink set for forming a multilayer according to claim 1, wherein the relation of Formula (2) is satisfied when the content of the radical polymerization initiator in the clear ink composition is X and the content of the radical polymerization initiator included in the magenta ink composition is Y.

[Equation 2]

$$0.3 \leq \frac{Y}{X} < 1. \qquad (2)$$

3. The ink set for forming a multilayer according to claim 1, wherein the component A-1 is N-vinyl caprolactam.

4. The ink set for forming a multilayer according to claim 1, wherein the content of the radical polymerization initiator in the magenta ink composition is greater than or equal to 3 mass % and less than 12 mass % with regard to the total amount of the magenta ink composition and the content of the radical polymerization initiator in the clear ink composition is greater than or equal to 12 mass % and less than 20 mass % with regard to the total amount of the clear ink composition.

5. The ink set for forming a multilayer according to claim 1, wherein each of the coloring ink compositions includes 50 mass % to 90 mass % of a monofunctional radical polymerization compound with regard to the total amount of the (component A) radical polymerization compound.

6. The ink set for forming a multilayer according to claim 1,
wherein the magenta ink composition contains a bisacylphosphine oxide or a monoacylphosphine oxide as the (component B) radical polymerization initiator and the clear ink composition contains a monoacylphosphine oxide as the (component $B^2$) radical polymerization initiator.

7. The ink set for forming a multilayer according to claim 1,
wherein the surface tension of all the coloring ink compositions is 32 mN/m to 40 mN/m.

8. The ink set for forming a multilayer according to claim 1,
wherein the clear ink composition contains 10 mass % to 80 mass % of a polyfunctional acrylate compound which contains one or more of an alkylene oxy group in a structural unit of the polyfunctional acrylate compound.

9. An ink jet recording method using the ink set for forming a multilayer according to claim 1, comprising the steps in the sequence set forth:
an image forming step for applying each of the coloring ink compositions on a recording medium and forming color images; and
a clear ink layer applying step for applying the clear ink composition and forming a clear ink layer.

10. The ink jet recording method according to claim 9, further comprising:
a scanning step for moving an ink jet head having a plurality of nozzle arrays including a first nozzle array with a plurality of nozzles discharging each of the coloring ink compositions are arranged and a second nozzle array with a plurality of nozzles discharging the clear ink composition are arranged toward a first direction with regard to the recording medium,
a relative moving step for reciprocatively moving the recording medium toward a second direction which is not parallel to the first direction,
a discharge control step for dividing the nozzle arrays into a plurality of areas along the second direction and controlling the ink discharge of the ink jet head in each of the divided nozzle areas formed by the dividing of the nozzle arrays; and
an active ray irradiating step for irradiating active rays on the ink discharged from the ink jet head by the discharge control step and adhered on the recording medium,
wherein the active ray irradiating step is a step in which the irradiation range of the active rays is divided into a plurality of areas corresponding to each of the divided nozzle areas, light intensity of the divided irradiation area formed by the dividing of the irradiation range is controlled for each area, and irradiation of the active rays is carried out.

11. The ink jet recording method according to claim 10,
wherein the irradiation range of the active rays is divided into two areas, intensity of the irradiation light source in the first area is 100 $mW/cm^2$ to 800 $mW/cm^2$ and intensity of the irradiation light source in the second area is 800 $mW/cm^2$ to 1,600 $mW/cm^2$.

12. The ink jet recording method according to claim 10,
wherein a minimum droplet volume of the nozzle discharging each of the coloring ink compositions is greater than or equal to 5 pL and less than 20 pL, and a minimum droplet volume of the nozzle discharging the clear ink composition is greater than or equal to 20 pL and less than or equal to 60 pL.

13. A printed material obtained using the method according to claim 9.

* * * * *